United States Patent
Kelly

(10) Patent No.: US 11,736,648 B2
(45) Date of Patent: Aug. 22, 2023

(54) PROGRESSIVE IMAGE COMPRESSION AND RESTORATION PROVIDING A HIGH SPATIAL QUALITY INTERMEDIATE IMAGE

(71) Applicant: PANAMORPH, INC., Colorado Springs, CO (US)

(72) Inventor: Shawn L. Kelly, Colorado Springs, CO (US)

(73) Assignee: PANAMORPH, INC., Colorado Springs, CO (US)

( * ) Notice: Subject to any disclaimer, the term of this patent is extended or adjusted under 35 U.S.C. 154(b) by 528 days.

(21) Appl. No.: 17/086,400

(22) Filed: Oct. 31, 2020

(65) Prior Publication Data

US 2021/0051243 A1    Feb. 18, 2021

Related U.S. Application Data

(63) Continuation of application No. PCT/US2019/031627, filed on May 9, 2019.

(60) Provisional application No. 62/934,460, filed on Nov. 12, 2019, provisional application No. 62/669,306, filed on May 9, 2018.

(51) Int. Cl.
*H04N 1/413* (2006.01)
*G06T 3/40* (2006.01)
*H04N 1/00* (2006.01)

(52) U.S. Cl.
CPC .......... *H04N 1/413* (2013.01); *G06T 3/4092* (2013.01); *H04N 1/00244* (2013.01)

(58) Field of Classification Search
CPC .. H04N 1/413; H04N 1/00244; H04N 19/186; H04N 19/30; G06T 3/4092
See application file for complete search history.

(56) References Cited

U.S. PATENT DOCUMENTS

| 5,121,448 A | 6/1992 | Katayama et al. |
| 5,444,491 A | 8/1995 | Lim |
| 5,621,660 A | 4/1997 | Chaddha et al. |
| 5,668,646 A | 9/1997 | Katayama et al. |
| 5,881,176 A | 3/1999 | Keith et al. |

(Continued)

FOREIGN PATENT DOCUMENTS

| WO | 2009052772 A2 | 7/2008 |
| WO | 2013036972 A1 | 3/2013 |

(Continued)

OTHER PUBLICATIONS

Taubman et al. "JPEG2000: Standard for interactive imaging." In: Proceedings of the IEEE 90.8. Aug. 2002 (Aug. 2002).

(Continued)

*Primary Examiner* — Maurice L. McDowell, Jr.
(74) *Attorney, Agent, or Firm* — Kurt L. VanVoorhies

(57) ABSTRACT

A high-definition image is preprocessed to generate a substantially losslessly-reconstructable set of image components that include a relatively low-resolution base image and a plurality of extra-data images that provide for progressively substantially losslessly reconstructing the high-definition image from the base image, wherein a single primary-color component of the extra-data images provides for relatively quickly reconstructing full-resolution intermediate images during the substantially lossless-reconstruction process.

16 Claims, 33 Drawing Sheets

(56) References Cited

U.S. PATENT DOCUMENTS

| | | | |
|---|---|---|---|
| 6,025,882 | A | 2/2000 | Geshwind |
| 6,184,935 | B1 | 2/2001 | Iaquinto et al. |
| 6,510,177 | B1 | 1/2003 | De Bonet et al. |
| 6,925,249 | B1 | 8/2005 | Meier et al. |
| 7,305,174 | B2 | 12/2007 | Meier et al. |
| 7,580,577 | B2 | 8/2009 | Enokida et al. |
| 7,956,930 | B2 | 6/2011 | Sullivan |
| 8,798,136 | B2 | 8/2014 | Kelly |
| 8,855,195 | B1 | 10/2014 | Kelly |
| 9,253,013 | B1 | 2/2016 | Kolam et al. |
| 9,509,764 | B1 | 11/2016 | Kolam |
| 9,584,701 | B2 | 2/2017 | Kelly |
| 9,774,761 | B2 | 9/2017 | Kelly |
| 9,953,014 | B1 | 4/2018 | Reshadi et al. |
| 10,009,439 | B1 | 6/2018 | Kolam |
| 10,178,147 | B1 | 1/2019 | Kolam |
| 10,462,495 | B2 | 10/2019 | Hachfeld |
| 10,554,856 | B2 | 2/2020 | Kelly |
| 11,089,338 | B2 | 8/2021 | Hachfeld |
| 2002/0057850 | A1* | 5/2002 | Sirohey ............... H04N 19/146 375/E7.199 |
| 2004/0230613 | A1 | 11/2004 | Goldstein et al. |
| 2006/0071825 | A1 | 4/2006 | Demos |
| 2008/0008252 | A1 | 1/2008 | Xu et al. |
| 2008/0144962 | A1 | 6/2008 | Jung et al. |
| 2008/0219575 | A1* | 9/2008 | Wittenstein ............ H04N 19/90 382/238 |
| 2008/0232452 | A1 | 9/2008 | Sullivan et al. |
| 2009/0002397 | A1 | 1/2009 | Forlines et al. |
| 2009/0110054 | A1* | 4/2009 | Kim ...................... H04N 19/33 375/240.1 |
| 2010/0008595 | A1 | 1/2010 | Riley et al. |
| 2010/0034287 | A1* | 2/2010 | Roman .................. H04N 19/93 375/240.21 |
| 2010/0046612 | A1 | 2/2010 | Sun et al. |
| 2010/0142811 | A1 | 6/2010 | Okamoto et al. |
| 2011/0143811 | A1 | 6/2011 | Rodriguez |
| 2011/0194024 | A1 | 8/2011 | Stefanoski et al. |
| 2013/0162678 | A1 | 6/2013 | Harris |
| 2013/0229436 | A1 | 9/2013 | Freyhult et al. |
| 2014/0119670 | A1* | 5/2014 | Arai ..................... G06T 3/4092 382/233 |
| 2014/0286588 | A1 | 9/2014 | Kelly |
| 2015/0178946 | A1 | 6/2015 | Krishnaswamy et al. |
| 2015/0178951 | A1 | 6/2015 | Kelly |
| 2015/0237382 | A1 | 8/2015 | Nishida et al. |
| 2015/0346969 | A1 | 12/2015 | Strabbing et al. |
| 2016/0373613 | A1 | 12/2016 | Kelly |
| 2018/0188372 | A1 | 7/2018 | Wheeler |
| 2019/0052913 | A1 | 2/2019 | Hachfeld |
| 2019/0340730 | A1 | 11/2019 | Dimitrov et al. |
| 2020/0029099 | A1 | 1/2020 | Hachfeld |
| 2020/0177767 | A1 | 6/2020 | Kelly |
| 2021/0051244 | A1 | 2/2021 | Kelly |

FOREIGN PATENT DOCUMENTS

| | | |
|---|---|---|
| WO | 2015103646 A1 | 7/2015 |
| WO | 2019217756 A1 | 11/2019 |
| WO | 2019217756 A4 | 11/2019 |

OTHER PUBLICATIONS

PCT-ISA/US, International Search Report and Written Opinion of International Searching Authority & Search History in International Application No. PCT/US2019/031627, dated Sep. 4, 2019, 18 pages.

USPTO Notice of Allowance and Fee(s) Due in U.S. Appl. No. 17/086,400, including Examiner's statement of reasons for the indication of allowable subject matter in respect of claims 1-23 , wherein claims 12-23 are part of U.S. Appl. No. 17/086,400 (the instant application), dated Jan. 14, 2022, 13 pp.

Schwarz, Heiko, Marpe, Detlev and Wiegand, Thomas, "Overview of the Scalable Video Coding Extension of the H.264/AVC Standard", IEE Transactions on Circuits and Systems for Video Technology, vol. 17, No. 9, Sep. 9, 2007, pp. 1103-1120.

Unknown author(s), "Scalable Video Coding", Wikipedia, May 4, 2011, downloaded from www.wikipedia.org on Sep. 29, 2011, 5 pages.

Unknown author(s), "H.264/MPEG-4 AVC", Wikipedia, Sep. 22, 2011, downloaded from www.wikipedia.org on Sep. 29, 2011, 5 pages.

Unknown author(s), "PALplus", Wikipedia, Jun. 10, 2012, downloaded from www.wikipedia.org on Aug. 21, 2012, 5 pages.

\* cited by examiner

Horizontal Compaction
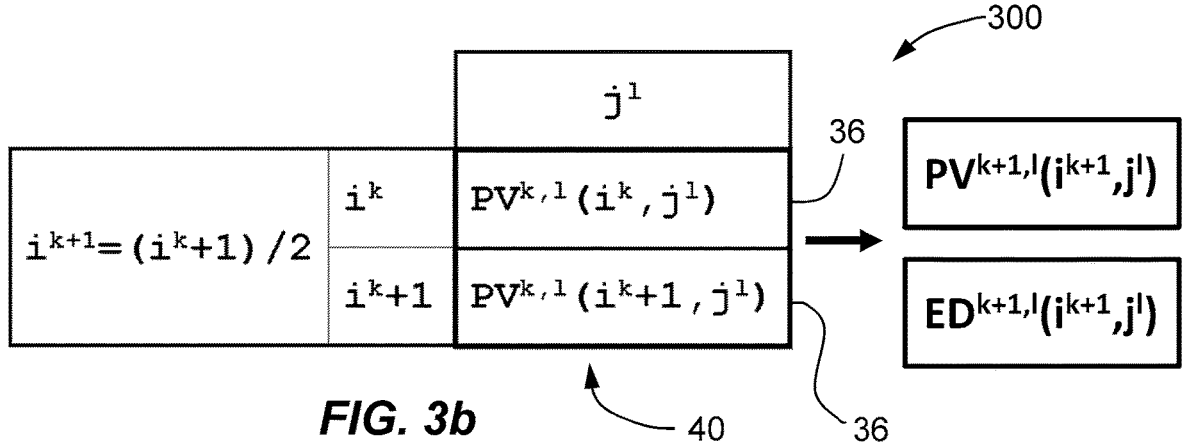
FIG. 3a
FIG. 3b
Vertical Compaction
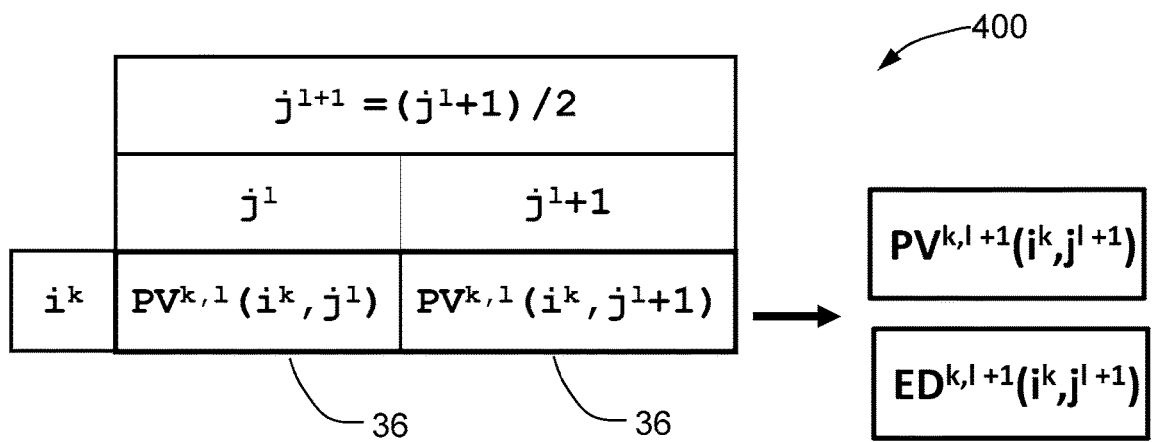
FIG. 4a
FIG. 4b

| IMG$^{1,1}$ | | 1 | | $j^2$ | | $j^2+1$ | | $N^2=4$ |
|---|---|---|---|---|---|---|---|---|
| | | 1 | 2 | $j^1$ | $j^1+1$ | 5 | 6 | 7 | $N^1=8$ |
| 1 | 1 | | | | | | | | |
| | 2 | | | | | | | | |
| $i^2$ | $i^1$ | | | $R^{1,1}(i^1,j^1)$ $G^{1,1}(i^1,j^1)$ $B^{1,1}(i^1,j^1)$ $\alpha^{1,1}(i^1,j^1)$ | $R^{1,1}(i^1,j^1+1)$ $G^{1,1}(i^1,j^1+1)$ $B^{1,1}(i^1,j^1+1)$ $\alpha^{1,1}(i^1,j^1+1)$ | | | | |
| | $i^1+1$ | | | $R^{1,1}(i^1+1,j^1)$ $G^{1,1}(i^1+1,j^1)$ $B^{1,1}(i^1+1,j^1)$ $\alpha^{1,1}(i^1+1,j^1)$ | $R^{1,1}(i^1+1,j^1+1)$ $G^{1,1}(i^1+1,j^1+1)$ $B^{1,1}(i^1+1,j^1+1)$ $\alpha^{1,1}(i^1+1,j^1+1)$ | | | | |
| $i^2+1$ | 5 | | | | | | | | |
| | 6 | | | | | | | | |
| $M^2=4$ | 7 | | | | | | | | |
| | $M^1=8$ | | | | | | | | |

FIG. 7a

| ED$^{1,1}$ | | 1 | | $j^2$ | | $j^2+1$ | | $N^2=4$ |
|---|---|---|---|---|---|---|---|---|
| | | 1 | 2 | $j^1$ | $j^1+1$ | 5 | 6 | 7 | $N^1=8$ |
| 1 | 1 | | | | | | | | |
| | 2 | | | | | | | | |
| $i^2$ | $i^1$ | | | $ER^{1,1}(i^1,j^1)$ $EG^{1,1}(i^1,j^1)$ $EB^{1,1}(i^1,j^1)$ $E\alpha^{1,1}(i^1,j^1)$ | $ER^{1,1}(i^1,j^1+1)$ $EG^{1,1}(i^1,j^1+1)$ $EB^{1,1}(i^1,j^1+1)$ $E\alpha^{1,1}(i^1,j^1+1)$ | | | | |
| | $i^1+1$ | | | $ER^{1,1}(i^1+1,j^1)$ $EG^{1,1}(i^1+1,j^1)$ $EB^{1,1}(i^1+1,j^1)$ $E\alpha^{1,1}(i^1+1,j^1)$ | $ER^{1,1}(i^1+1,j^1+1)$ $EG^{1,1}(i^1+1,j^1+1)$ $EB^{1,1}(i^1+1,j^1+1)$ $E\alpha^{1,1}(i^1+1,j^1+1)$ | | | | |
| $i^1+1$ | 5 | | | | | | | | |
| | 6 | | | | | | | | |
| $M^2=4$ | 7 | | | | | | | | |
| | $M^1=8$ | | | | | | | | |

FIG. 7b

Bidirectional Compaction $$\left(PV^{k+1,l+1}\left(i^{k+1},j^{k+1}\right),ED^{k+1,k+1}\left(i^{k+1},j^{k+1}\right)\right)=$$
$$CB\left\{PV^{k,k}\left(i^k,j^k\right),PV^{k,k}\left(i^k+1,j^k\right),PV^{k,k}\left(i^k,j^k+1\right)PV^{k,k}\left(i^k+1,j^k+1\right)\right\}$$

$$PV^{k+1,l+1}\left(i^k,j^k\right)=\frac{PV^{k,k}\left(i^k,j^k\right)+PV^{k,k}\left(i^k+1,j^k\right)+PV^{k,k}\left(i^k,j^k+1\right)+PV^{k,k}\left(i^k+1,j^k+1\right)}{4}$$

$$ED^{k+1,k+1,1}\left(i^k,j^k+1\right)=\frac{PV^{k,k}\left(i^k,j^k+1\right)-PV^{k,k}\left(i^k,j^k\right)+\gamma}{2}$$

$$ED^{k+1,k+1,2}\left(i^k,j^k+1\right)=\frac{PV^{k,k}\left(i^k+1,j^k+1\right)-PV^{k,k}\left(i^k+1,j^k\right)+\gamma}{2}$$

$$ED^{k+1,k+1,1}\left(i^k,j^k+1\right)=\frac{PV^{k,k}\left(i^k+1,j^k+1\right)-PV^{k,k}\left(i^k,j^k\right)+\gamma}{2}$$

FIG. 8a

| $i^{k+1}$ | | $j^{k+1}=(j^k+1)/2$ | |
|---|---|---|---|
| | | $j^k$ | $j^k+1$ |
| | $i^k$ | $PV^{k,1}(i^k,j^k)$ | $PV^{k,1}(i^k,j^k+1)$ |
| | $i^k+1$ | $PV^{k,1}(i^k+1,j^k)$ | $PV^{k,1}(i^k+1,j^k+1)$ |

| IMG$^{1,1}$ | | 1 | 2 | $j^1$ | $j^1+1$ | 5 | 6 | 7 | $N^1=8$ |
|---|---|---|---|---|---|---|---|---|---|
| | | 1 | $j^2$ | | | $j^2+1$ | | | $N^2=4$ |
| 1 | 1 | | | | | | | | |
| | 2 | | | | | | | | |
| $i^2$ | $i^1$ | | | $R^{1,1}(i^1,j^1)$ $G^{1,1}(i^1,j^1)$ $B^{1,1}(i^1,j^1)$ $\alpha^{1,1}(i^1,j^1)$ | $R^{1,1}(i^1,j^1+1)$ $G^{1,1}(i^1,j^1+1)$ $B^{1,1}(i^1,j^1+1)$ $\alpha^{1,1}(i^1,j^1+1)$ | | | | |
| | $i^1+1$ | | | $R^{1,1}(i^1+1,j^1)$ $G^{1,1}(i^1+1,j^1)$ $B^{1,1}(i^1+1,j^1)$ $\alpha^{1,1}(i^1+1,j^1)$ | $R^{1,1}(i^1+1,j^1+1)$ $G^{1,1}(i^1+1,j^1+1)$ $B^{1,1}(i^1+1,j^1+1)$ $\alpha^{1,1}(i^1+1,j^1+1)$ | | | | |
| $i^2+1$ | 5 | | | | | | | | |
| | 6 | | | | | | | | |
| $M^2=4$ | 7 | | | | | | | | |
| | $M^1=8$ | | | | | | | | |

FIG. 9b

| ED$^{1,1}$ | | 1 | 2 | $j^1$ | $j^1+1$ | 5 | 6 | 7 | $N^1=8$ |
|---|---|---|---|---|---|---|---|---|---|
| | | 1 | $j^2$ | | | $j^2+1$ | | | $N^2=4$ |
| 1 | 1 | | | | | | | | |
| | 2 | | | | | | | | |
| $i^2$ | $i^1$ | | | $ER^{1,1,1}(i^1,j^1)$ $EG^{1,1,1}(i^1,j^1)$ $EB^{1,1,1}(i^1,j^1)$ $E\alpha^{1,1,1}(i^1,j^1)$ $ER^{1,1,2}(i^1,j^1)$ $EG^{1,1,2}(i^1,j^1)$ $EB^{1,1,2}(i^1,j^1)$ $E\alpha^{1,1,2}(i^1,j^1)$ $ER^{1,1,3}(i^1,j^1)$ $EG^{1,1,3}(i^1,j^1)$ $EB^{1,1,3}(i^1,j^1)$ $E\alpha^{1,1,3}(i^1,j^1)$ | $ER^{1,1,1}(i^1,j^1+1)$ $EG^{1,1,1}(i^1,j^1+1)$ $EB^{1,1,1}(i^1,j^1+1)$ $E\alpha^{1,1,1}(i^1,j^1+1)$ $ER^{1,1,2}(i^1,j^1+1)$ $EG^{1,1,2}(i^1,j^1+1)$ $EB^{1,1,2}(i^1,j^1+1)$ $E\alpha^{1,1,2}(i^1,j^1+1)$ $ER^{1,1,3}(i^1,j^1+1)$ $EG^{1,1,3}(i^1,j^1+1)$ $EB^{1,1,3}(i^1,j^1+1)$ $E\alpha^{1,1,3}(i^1,j^1+1)$ | | | | |
| | $i^1+1$ | | | $ER^{1,1,1}(i^1+1,j^1)$ $EG^{1,1,1}(i^1+1,j^1)$ $EB^{1,1,1}(i^1+1,j^1)$ $E\alpha^{1,1,1}(i^1+1,j^1)$ $ER^{1,1,2}(i^1+1,j^1)$ $EG^{1,1,2}(i^1+1,j^1)$ $EB^{1,1,2}(i^1+1,j^1)$ $E\alpha^{1,1,2}(i^1+1,j^1)$ $ER^{1,1,3}(i^1+1,j^1)$ $EG^{1,1,3}(i^1+1,j^1)$ $EB^{1,1,3}(i^1+1,j^1)$ $E\alpha^{1,1,3}(i^1+1,j^1)$ | $ER^{1,1,1}(i^1+1,j^1+1)$ $EG^{1,1,1}(i^1+1,j^1+1)$ $EB^{1,1,1}(i^1+1,j^1+1)$ $E\alpha^{1,1,1}(i^1+1,j^1+1)$ $ER^{1,1,2}(i^1+1,j^1+1)$ $EG^{1,1,2}(i^1+1,j^1+1)$ $EB^{1,1,2}(i^1+1,j^1+1)$ $E\alpha^{1,1,2}(i^1+1,j^1+1)$ $ER^{1,1,3}(i^1+1,j^1+1)$ $EG^{1,1,3}(i^1+1,j^1+1)$ $EB^{1,1,3}(i^1+1,j^1+1)$ $E\alpha^{1,1,3}(i^1+1,j^1+1)$ | | | | |
| $i^1+1$ | 5 | | | | | | | | |
| | 6 | | | | | | | | |
| $M^2=4$ | 7 | | | | | | | | |
| | $M^1=8$ | | | | | | | | |

FIG. 10a

| IMG$^{2,1}$ | 1 | 2 | $j^1$ | $j^1+1$ | 5 | 6 | 7 | $N^1=8$ |
|---|---|---|---|---|---|---|---|---|
| | | | | $j^2$ | | | $j^2+1$ | $N^2=4$ |
| 1 | | | | | | | | |
| $i^2$ | | | $R^{2,1}(i^2,j^1)$<br>$G^{2.1}(i^2,j^1)$<br>$B^{2.1}(i^2,j^1)$<br>$\alpha^{2,1}(i^2,j^1)$ | $R^{2,1}(i^2,j^1+1)$<br>$G^{2,1}(i^2,j^1+1)$<br>$B^{2,1}(i^2,j^1+1)$<br>$\alpha^{2,1}(i^2,j^1+1)$ | | | | |
| $i^2+1$ | | | $R^{2,1}(i^2+1,j^1)$<br>$G^{2,1}(i^2+1,j^1)$<br>$B^{2,1}(i^2+1,j^1)$<br>$\alpha^{2,1}(i^2+1,j^1)$ | $R^{2,1}(i^2+1,j^1+1)$<br>$G^{2,1}(i^2+1,j^1+1)$<br>$B^{2,1}(i^2+1,j^1+1)$<br>$\alpha^{2,1}(i^2+1,j^1+1)$ | | | | |
| $M^2=4$ | | | | | | | | |

FIG. 10b

| ED$^{2,1}$ | 1 | 2 | $j^1$ | $j^1+1$ | 5 | 6 | 7 | $N^1=8$ |
|---|---|---|---|---|---|---|---|---|
| | | | | $j^2$ | | | $j^2+1$ | $N^2=4$ |
| 1 | | | | | | | | |
| $i^2$ | | | $ER^{2,1}(i^2,j^1)$<br>$EG^{2,1}(i^2,j^1)$<br>$EB^{2,1}(i^2,j^1)$<br>$E\alpha^{2,1}(i^2,j^1)$ | $ER^{2,1}(i^2,j^1+1)$<br>$EG^{2,1}(i^2,j^1+1)$<br>$EB^{2,1}(i^2,j^1+1)$<br>$E\alpha^{2,1}(i^2,j^1+1)$ | | | | |
| $i^2+1$ | | | $ER^{2,1}(i^2+1,j^1)$<br>$EG^{2,1}(i^2+1,j^1)$<br>$EB^{2,1}(i^2+1,j^1)$<br>$E\alpha^{2,1}(i^2+1,j^1)$ | $ER^{2,1}(i^2+1,j^1+1)$<br>$EG^{2,1}(i^2+1,j^1+1)$<br>$EB^{2,1}(i^2+1,j^1+1)$<br>$E\alpha^{2,1}(i^2+1,j^1+1)$ | | | | |
| $M^2=4$ | | | | | | | | |

FIG. 11a

| IMG$^{2,2}$ | 1 | $j^2$ | $j^2+1$ | $N^2=4$ |
|---|---|---|---|---|
| 1 | | | | |
| $i^2$ | | $R^{2,2}(i^2,j^2)$<br>$G^{2.1}(i^2,j^2)$<br>$B^{2.1}(i^2,j^2)$<br>$\alpha^{2,2}(i^2,j^2)$ | $R^{2,2}(i^2,j^2+1)$<br>$G^{2,2}(i^2,j^2+1)$<br>$B^{2,2}(i^2,j^2+1)$<br>$\alpha^{2,2}(i^2,j^2+1)$ | |
| $i^2+1$ | | $R^{2,2}(i^2+1,j^2)$<br>$G^{2,2}(i^2+1,j^2)$<br>$B^{2,2}(i^2+1,j^2)$<br>$\alpha^{2,2}(i^2+1,j^2)$ | $R^{2,2}(i^2+1,j^2+1)$<br>$G^{2,2}(i^2+1,j^2+1)$<br>$B^{2,2}(i^2+1,j^2+1)$<br>$\alpha^{2,2}(i^2+1,j^2+1)$ | |
| $M^2=4$ | | | | |

FIG. 11b

| ED$^{2,2}$ | 1 | $j^2$ | $j^2+1$ | $N^2=4$ |
|---|---|---|---|---|
| 1 | | | | |
| $i^2$ | | $ER^{2,2}(i^2,j^2)$<br>$EG^{2.1}(i^2,j^2)$<br>$EB^{2.1}(i^2,j^2)$<br>$E\alpha^{2,2}(i^2,j^2)$ | $ER^{2,2}(i^2,j^2+1)$<br>$EG^{2,2}(i^2,j^2+1)$<br>$EB^{2,2}(i^2,j^2+1)$<br>$E\alpha^{2,2}(i^2,j^2+1)$ | |
| $i^2+1$ | | $ER^{2,2}(i^2+1,j^2)$<br>$EG^{2,2}(i^2+1,j^2)$<br>$EB^{2,2}(i^2+1,j^2)$<br>$E\alpha^{2,2}(i^2+1,j^2)$ | $ER^{2,2}(i^2+1,j^2+1)$<br>$EG^{2,2}(i^2+1,j^2+1)$<br>$EB^{2,2}(i^2+1,j^2+1)$<br>$E\alpha^{2,2}(i^2+1,j^2+1)$ | |
| $M^2=4$ | | | | |

Lossless Vertical Reconstruction

$$\left(X^{k,l}(i^k,j^l), X^{k,l}(i^k,j^l+1)\right) = RV\left\{X^{k,l+1}(i^k,j^{l+1}), EX^{k,l+1}(i^k,j^{l+1})\right\}$$

$$X^{k,l}(i^k,j^l) = X^{k,l+1}(i^k,j^{l+1}) + EX^{k,l+1}(i^k,j^{l+1}) - \frac{\gamma}{2}$$

$$X^{k,l}(i^k,j^l+1) = X^{k,l+1}(i^k,j^{l+1}) - EX^{k,l+1}(i^k,j^{l+1}) + \frac{\gamma}{2}$$

| | $j^{l+1} = (j^l+1)/2$ | |
|---|---|---|
| | $j^l$ | $j^l+1$ |
| $i^k$ | PV$^{k,l}$(i$^k$,j$^l$) | PV$^{k,l}$(i$^k$,j$^l$) |

PV$^{k,l+1}$(i$^k$,j$^{l+1}$)

ED$^{k,l+1}$(i$^k$,j$^{l+1}$)

$$\left(R^{k,l}(i^k,j^l), R^{k,l}(i^k,j^l+1)\right) = RV\left\{R^{k,l+1}(i^k,j^{l+1}), ER^{k,l+1}(i^k,j^{l+1})\right\}$$

$$\left(G^{k,l}(i^k,j^l), G^{k,l}(i^k,j^l+1)\right) = RV\left\{G^{k,l+1}(i^k,j^{l+1}), EG^{k,l+1}(i^k,j^{l+1})\right\}$$

$$\left(B^{k,l}(i^k,j^l), B^{k,l}(i^k,j^l+1)\right) = RV\left\{B^{k,l+1}(i^k,j^{l+1}), EB^{k,l+1}(i^k,j^{l+1})\right\}$$

$$\left(\alpha^{k,l}(i^k,j^l), \alpha^{k,l}(i^k,j^l+1)\right) = RV\left\{\alpha^{k,l+1}(i^k,j^{l+1}), E\alpha^{k,l+1}(i^k,j^{l+1})\right\}$$

Lossless Horizontal Reconstruction

$$\left(X^{k,l}(i^k,j^l), X^{k,l}(i^k+1,j^l)\right) = RH\left\{X^{k+1,l}(i^{k+1},j^l), EX^{k+1,l}(i^{k+1},j^l)\right\}$$

$$X^{k,l}(i^k,j^l) = X^{k+1,l}(i^{k+1},j^l) + EX^{k+1,l}(i^{k+1},j^l) - \frac{\gamma}{2}$$

$$X^{k,l}(i^k+1,j^l) = X^{k+1,l}(i^{k+1},j^l) - EX^{k+1,l}(i^{k+1},j^l) + \frac{\gamma}{2}$$

| | | $j^l$ |
|---|---|---|
| | $i^k$ | PV$^{k,l}$(i$^k$,j$^l$) |
| $i^{k+1}=(i^k+1)/2$ | $i^k+1$ | PV$^{k,l}$(i$^k$+1,j$^l$) |

PV$^{k+1,l}$(i$^{k+1}$,j$^l$)

ED$^{k+1,l}$(i$^{k+1}$,j$^l$)

$$\left(R^{k,l}(i^k,j^l), R^{k,l}(i^k+1,j^l)\right) = RH\left\{R^{k+1,l}(i^{k+1},j^l), ER^{k+1,l}(i^{k+1},j^l)\right\}$$

$$\left(G^{k,l}(i^k,j^l), G^{k,l}(i^k+1,j^l)\right) = RH\left\{G^{k+1,l}(i^{k+1},j^l), EG^{k+1,l}(i^{k+1},j^l)\right\}$$

$$\left(B^{k,l}(i^k,j^l), B^{k,l}(i^k+1,j^l)\right) = RH\left\{B^{k+1,l}(i^{k+1},j^l), EB^{k+1,l}(i^{k+1},j^l)\right\}$$

$$\left(\alpha^{k,l}(i^k,j^l), \alpha^{k,l}(i^k+1,j^l)\right) = RH\left\{\alpha^{k+1,l}(i^{k+1},j^l), E\alpha^{k+1,l}(i^{k+1},j^l)\right\}$$

Lossless Bidirectional Reconstruction $$\left(X^{k,k}\left(i^k,j^k\right), X^{k,k}\left(i^k+1,j^k\right), X^{k,k}\left(i^k,j^k+1\right), X^{k,k}\left(i^k+1,j^k+1\right)\right) =$$
$$RB\left\{X^{k+1,k+1}\left(i^{k+1},j^{k+1}\right), EX^{k+1,k+1,1}\left(i^{k+1},j^{k+1}\right), EX^{k+1,k+1,2}\left(i^{k+1},j^{k+1}\right), EX^{k+1,k+1,3}\left(i^{k+1},j^{k+1}\right)\right\}$$

$$X^{k,k}\left(i^k,j^k\right) = X^{k+1,k+1}\left(i^{k+1},j^{k+1}\right)$$
$$-\frac{1}{2}EX^{k+1,k+1,1}\left(i^{k+1},j^{k+1}\right) + \frac{1}{2}EX^{k+1,k+1,2}\left(i^{k+1},j^{k+1}\right) - EX^{k+1,k+1,3}\left(i^{k+1},j^{k+1}\right) + \frac{\gamma}{2}$$

$$X^{k,k}\left(i^k+1,j^k\right) = X^{k+1,k+1}\left(i^{k+1},j^{k+1}\right)$$
$$-\frac{1}{2}EX^{k+1,k+1,1}\left(i^{k+1},j^{k+1}\right) - \frac{3}{2}EX^{k+1,k+1,2}\left(i^{k+1},j^{k+1}\right) + EX^{k+1,k+1,3}\left(i^{k+1},j^{k+1}\right) + \frac{\gamma}{2}$$

$$X^{k,k}\left(i^k,j^k+1\right) = X^{k+1,k+1}\left(i^{k+1},j^{k+1}\right)$$
$$+\frac{3}{2}EX^{k+1,k+1,1}\left(i^{k+1},j^{k+1}\right) + \frac{1}{2}EX^{k+1,k+1,2}\left(i^{k+1},j^{k+1}\right) - EX^{k+1,k+1,3}\left(i^{k+1},j^{k+1}\right) - \frac{\gamma}{2}$$

$$X^{k,k}\left(i^k+1,j^k+1\right) = X^{k+1,k+1}\left(i^{k+1},j^{k+1}\right)$$
$$-\frac{1}{2}EX^{k+1,k+1,1}\left(i^{k+1},j^{k+1}\right) + \frac{1}{2}EX^{k+1,k+1,2}\left(i^{k+1},j^{k+1}\right) + EX^{k+1,k+1,3}\left(i^{k+1},j^{k+1}\right) - \frac{\gamma}{2}$$

| | | j$^{k+1}$ = (j$^k$+1)/2 | |
|---|---|---|---|
| | | j$^k$ | j$^k$+1 |
| i$^{k+1}$ | i$^k$ | PV$^{k,1}$(i$^k$,j$^k$) | PV$^{k,1}$(i$^k$,j$^k$+1) |
| | i$^k$+1 | PV$^{k,1}$(i$^k$+1,j$^k$) | PV$^{k,1}$(i$^k$+1,j$^k$+1) |

$$\left(R^{k,k}\left(i^k,j^k\right),R^{k,k}\left(i^k+1,j^k\right),R^{k,k}\left(i^k,j^k+1\right),R^{k,k}\left(i^k+1,j^k+1\right)\right)=$$
$$RB\left\{R^{k+1,k+1}\left(i^{k+1},j^{k+1}\right),ER^{k+1,k+1,1}\left(i^{k+1},j^{k+1}\right),ER^{k+1,k+1,2}\left(i^{k+1},j^{k+1}\right),ER^{k+1,k+1,3}\left(i^{k+1},j^{k+1}\right)\right\}$$

← 1400

$$\left(G^{k,k}\left(i^k,j^k\right),G^{k,k}\left(i^k+1,j^k\right),G^{k,k}\left(i^k,j^k+1\right),G^{k,k}\left(i^k+1,j^k+1\right)\right)=$$
$$RB\left\{G^{k+1,k+1}\left(i^{k+1},j^{k+1}\right),EG^{k+1,k+1,1}\left(i^{k+1},j^{k+1}\right),EG^{k+1,k+1,2}\left(i^{k+1},j^{k+1}\right),EG^{k+1,k+1,3}\left(i^{k+1},j^{k+1}\right)\right\}$$

← 1400

$$\left(B^{k,k}\left(i^k,j^k\right),B^{k,k}\left(i^k+1,j^k\right),B^{k,k}\left(i^k,j^k+1\right),B^{k,k}\left(i^k+1,j^k+1\right)\right)=$$
$$RB\left\{B^{k+1,k+1}\left(i^{k+1},j^{k+1}\right),EB^{k+1,k+1,1}\left(i^{k+1},j^{k+1}\right),EB^{k+1,k+1,2}\left(i^{k+1},j^{k+1}\right),EB^{k+1,k+1,3}\left(i^{k+1},j^{k+1}\right)\right\}$$

← 1400

$$\left(\alpha^{k,k}\left(i^k,j^k\right),\alpha^{k,k}\left(i^k+1,j^k\right),\alpha^{k,k}\left(i^k,j^k+1\right),\alpha^{k,k}\left(i^k+1,j^k+1\right)\right)=$$
$$RB\left\{\alpha^{k+1,k+1}\left(i^{k+1},j^{k+1}\right),E\alpha^{k+1,k+1,1}\left(i^{k+1},j^{k+1}\right),E\alpha^{k+1,k+1,2}\left(i^{k+1},j^{k+1}\right),E\alpha^{k+1,k+1,3}\left(i^{k+1},j^{k+1}\right)\right\}$$

|   | 1 | 2 | 3 | 4 | 5 | 6 | 7 | 8 | 9 |
|---|---|---|---|---|---|---|---|---|---|
| 1 | O(1,1) | O(1,2) | O(1,3) | O(1,4) | O(1,5) | O(1,6) | O(1,7) | O(1,8) | O(1,9) |
| 2 | O(2,1) | O(2,2) | O(2,3) | O(2,4) | O(2,5) | O(2,6) | O(2,7) | O(2,8) | O(2,9) |
| 3 | O(3,1) | O(3,2) | O(3,3) | O(3,4) | O(3,5) | O(3,6) | O(3,7) | O(3,8) | O(3,9) |
| 4 | O(4,1) | O(4,2) | O(4,3) | O(4,4) | O(4,5) | O(4,6) | O(4,7) | O(4,8) | O(4,9) |
| 5 | O(5,1) | O(5,2) | O(5,3) | O(5,4) | O(5,5) | O(5,6) | O(5,7) | O(5,8) | O(5,9) |
| 6 | O(6,1) | O(6,2) | O(6,3) | O(6,4) | O(6,5) | O(6,6) | O(6,7) | O(6,8) | O(6,9) |
| 7 | O(7,1) | O(7,2) | O(7,3) | O(7,4) | O(7,5) | O(7,6) | O(7,7) | O(7,8) | O(7,9) |
| 8 | O(8,1) | O(8,2) | O(8,3) | O(8,4) | O(8,5) | O(8,6) | O(8,7) | O(8,8) | O(8,9) |
| 9 | O(9,1) | O(9,2) | O(9,3) | O(9,4) | O(9,5) | O(9,6) | O(9,7) | O(9,8) | O(9,9) |

FIG. 33

|   | 1 | 2 | 3 | 4 | 5 | 6 | 7 | 8 | 9 |
|---|---|---|---|---|---|---|---|---|---|
| 1 | O*(1,1) | S(1,2) | S(1,3) | S(1,4) | O*(1,5) | S(1,6) | S(1,7) | S(1,8) | O*(1,9) |
| 2 | S(2,1) | S(2,2) | S(2,3) | S(2,4) | S(2,5) | S(2,6) | S(2,7) | S(2,8) | S(2,9) |
| 3 | S(3,1) | S(3,2) | S(3,3) | S(3,4) | S(3,5) | S(3,6) | S(3,7) | S(3,8) | S(3,9) |
| 4 | S(4,1) | S(4,2) | S(4,3) | S(4,4) | S(4,5) | S(4,6) | S(4,7) | S(4,8) | S(4,9) |
| 5 | O*(5,1) | S(5,2) | S(5,3) | S(5,4) | O*(5,5) | S(5,6) | S(5,7) | S(5,8) | O*(5,9) |
| 6 | S(6,1) | S(6,2) | S(6,3) | S(6,4) | S(6,5) | S(6,6) | S(6,7) | S(6,8) | S(6,9) |
| 7 | S(7,1) | S(7,2) | S(7,3) | S(7,4) | S(7,5) | S(7,6) | S(7,7) | S(7,8) | S(7,9) |
| 8 | S(8,1) | S(8,2) | S(8,3) | S(8,4) | S(8,5) | S(8,6) | S(8,7) | S(8,8) | S(8,9) |
| 9 | O*(9,1) | S(9,2) | S(9,3) | S(9,4) | O*(9,5) | S(9,6) | S(9,7) | S(9,8) | O*(9,9) |

|   | 1 | 5 | 9 |
|---|---|---|---|
| 1 | D0(1,1) | D0(1,5) | D0(1,9) |
| 5 | D0(5,1) | D0(5,5) | D0(5,9) |
| 9 | D0(9,1) | D0(9,5) | D0(9,9) |

|   | 1 | 3 | 5 | 7 | 9 |
|---|---|---|---|---|---|
| 1 |   | D1(1,3) |   | D1(1,7) |   |
| 3 | D1(3,1) | D1(3,3) | D1(3,5) | D1(3,7) | D1(3,9) |
| 5 |   | D1(5,3) |   | D1(5,7) |   |
| 7 | D1(7,1) | D1(7,3) | D1(7,5) | D1(7,7) | D1(7,9) |
| 9 |   | D1(9,3) |   | D1(9,7) |   |

|   | 1 | 2 | 3 | 4 | 5 | 6 | 7 | 8 | 9 |
|---|---|---|---|---|---|---|---|---|---|
| 1 |   | D2(1,2) |   | D2(1,4) |   | D2(1,6) |   | D2(1,8) |   |
| 2 | D2(2,1) | D2(2,2) | D2(2,3) | D2(2,4) | D2(2,5) | D2(2,6) | D2(2,7) | D2(2,8) | D2(2,9) |
| 3 |   | D2(3,2) |   | D2(3,4) |   | D2(3,6) |   | D2(3,8) |   |
| 4 | D2(4,1) | D2(4,2) | D2(4,3) | D2(4,4) | D2(4,5) | D2(4,6) | D2(4,7) | D2(4,8) | D2(4,9) |
| 5 |   | D2(5,2) |   | D2(5,4) |   | D2(5,6) |   | D2(5,8) |   |
| 6 | D2(6,1) | D2(6,2) | D2(6,3) | D2(6,4) | D2(6,5) | D2(6,6) | D2(6,7) | D2(6,8) | D2(6,9) |
| 7 |   | D2(7,2) |   | D2(7,4) |   | D2(7,6) |   | D2(7,8) |   |
| 8 | D2(8,1) | D2(8,2) | D2(8,3) | D2(8,4) | D2(8,5) | D2(8,6) | D2(8,7) | D2(8,8) | D2(8,9) |
| 9 |   | D2(9,2) |   | D2(9,4) |   | D2(9,6) |   | D2(9,8) |   |

PROGRESSIVE IMAGE COMPRESSION AND RESTORATION PROVIDING A HIGH SPATIAL QUALITY INTERMEDIATE IMAGE

CROSS-REFERENCE TO RELATED APPLICATIONS

The instant application is a continuation-in-part of International Application No. PCT/US2019/031627 filed on 9 May 2019, with claims divided from International Application No. PCT/US2019/031627, the latter of which claims the benefit of prior U.S. Provisional Application Ser. No. 62/669,306 filed on 9 May 2018. The instant application also claims the benefit of prior U.S. Provisional Application Ser. No. 62/934,460 filed on 12 Nov. 2019. Each of the above-identified applications is incorporated herein by reference in its entirety.

BRIEF DESCRIPTION OF THE DRAWINGS

FIG. 3a illustrates the equations of a process for horizontally compacting a pair of vertically-adjacent image cells of a source image, so that the resulting compacted image has half the number of rows as the source image when the process is applied to the entire source image, and so as to generate a corresponding extra-data image in one-to-one pixel correspondence with the resulting compacted image;

FIG. 3b illustrates the compaction of a pair of image pixels in accordance with the horizontal-compaction process illustrated in FIG. 3a;

FIG. 4a illustrates the equations of a process for vertically compacting a pair of horizontally-adjacent image cells of a source image, so that the resulting compacted image has half the number of columns as the source image when the process is applied to the entire source image, and so as to generate a corresponding extra-data image in one-to-one pixel correspondence with the resulting compacted image;

FIG. 4b illustrates the compaction of a pair of image pixels in accordance with the vertical-compaction process illustrated in FIG. 4a;

FIG. 5 illustrates a portion of a high-definition source image comprising M=16 rows and N=16 columns of image pixels, and the associated image-pixel elements of four adjacent image pixels associated with a pair of adjacent rows, and a corresponding pair of adjacent columns, of the source image;

FIG. 6a illustrates a horizontal compaction of the high-definition source image illustrated in FIG. 5, in accordance with the horizontal-compaction process illustrated in FIGS. 3a and 3b;

FIG. 6b illustrates the extra-data image resulting from the horizontal-compaction process as applied to the high-definition source image illustrated in FIG. 5, to generate the horizontally-compacted image illustrated in FIG. 6a, wherein the image-pixel elements of the extra-data image illustrated in FIG. 6b are in one-to-one correspondence with those of the horizontally-compacted image illustrated in FIG. 6a;

FIG. 7a illustrates a vertical compaction of the horizontally-compacted image illustrated in FIG. 6a, in accordance with the vertical-compaction process illustrated in FIGS. 4a and 4b;

FIG. 7b illustrates the extra-data image resulting from the vertical-compaction process as applied to the horizontally-compacted image illustrated in FIG. 6a, to generate the vertically-compacted image illustrated in FIG. 7a, wherein the image-pixel elements of the extra-data image illustrated in FIG. 7b are in one-to-one correspondence with those of the vertically-compacted image illustrated in FIG. 7a;

FIG. 8a illustrates the equations of a process for bidirectionally compacting a quad of image cells from a pair of adjacent rows and a pair of adjacent columns of a source image, so that the resulting compacted image has half the number of rows and half the number of columns as the source image when the process is applied to the entire source image, and so as to generate a corresponding extra-data image that has three extra-data pixel elements corresponding to each corresponding pixel element in the resulting compacted image;

FIG. 8b illustrates the compaction of a quad of image pixels in accordance with the process illustrated in FIG. 8a;

FIG. 9a illustrates a bidirectional compaction of the high-definition source image illustrated in FIG. 5, in accordance with the bidirectional-compaction process illustrated in FIGS. 8a and 8b;

FIG. 9b illustrates the extra-data image resulting from the bidirectional-compaction process as applied to the high-definition source image of illustrated in FIG. 5, to generate the bidirectionally-compacted image illustrated in FIG. 9a, wherein for each pixel element in the bidirectionally-compacted image illustrated in FIG. 9a, there are three corresponding image-pixel elements in the extra-data image illustrated in FIG. 9b;

FIG. 10a illustrates a horizontal compaction of the bidirectionally-compacted image illustrated in FIGS. 7a and 9a, in accordance with the horizontal-compaction process illustrated in FIGS. 3a and 3b;

FIG. 10b illustrates the extra-data image resulting from the horizontal-compaction process as applied to the high-definition source image of illustrated in FIGS. 7a and 9a, to generate the horizontally-compacted image illustrated in FIG. 10a, wherein the image-pixel elements of the extra-data image illustrated in FIG. 10b are in one-to-one correspondence with those of the horizontally-compacted image illustrated in FIG. 10a;

FIG. 11a illustrates a vertical compaction of the horizontally-compacted image illustrated in FIG. 10a, in accordance with the vertical-compaction process illustrated in FIGS. 4a and 4b;

FIG. 11b illustrates the extra-data image resulting from the vertical-compaction process as applied to the horizontally-compacted image illustrated in FIG. 10a, to generate the vertically-compacted image illustrated in FIG. 11a, wherein the image-pixel elements of the extra-data image illustrated in FIG. 11b are in one-to-one correspondence with those of the vertically-compacted image illustrated in FIG. 11a;

FIG. 12a illustrates the equations of a process for losslessly vertically reconstructing a pair of horizontally-adjacent image cells of a source image from a corresponding value of a corresponding image cell of a corresponding vertically-compacted image in combination with a corresponding value of a corresponding extra-data image cell of a corresponding extra-data image;

FIG. 12b illustrates a lossless vertical reconstruction of a pair of horizontally-adjacent image pixels in accordance with the lossless vertical-reconstruction process illustrated in FIG. 12a;

FIG. 12c illustrates application of the lossless vertical reconstruction process illustrated in FIG. 12a, as applied to the Red (R), Green (G), Blue (B) and transparency (a) image-pixel elements of a vertically-compacted image pixel to generate corresponding image-pixel elements of corresponding horizontally-adjacent image pixels of a corresponding source image;

FIG. 13a illustrates the equations of a process for losslessly horizontally reconstructing a pair of vertically-adjacent image cells of a source image from a corresponding value of a corresponding image cell of a corresponding horizontally-compacted image in combination with a corresponding value of a corresponding extra-data image cell of a corresponding extra-data image;

FIG. 13b illustrates a lossless horizontal reconstruction of a pair of vertically-adjacent image pixels in accordance with the lossless horizontal-reconstruction process illustrated in FIG. 13a;

FIG. 13c illustrates application of the lossless horizontal reconstruction process illustrated in FIG. 13a, as applied to the Red (R), Green (G), Blue (B) and transparency (a) image-pixel elements of a horizontally-compacted image pixel to generate corresponding image-pixel elements of corresponding vertically-adjacent image pixels of a corresponding source image;

FIG. 14a illustrates the equations of a process for losslessly bidirectionally reconstructing a quad of image cells from a pair of adjacent rows and a pair of adjacent columns of a source image, from a corresponding value of a corresponding image cell of a corresponding bidirectionally-compacted image in combination with corresponding values of corresponding extra-data image cells of a corresponding extra-data image;

FIG. 14b illustrates a lossless bidirectional reconstruction of a quad of image cells from a pair of adjacent rows and a pair of adjacent columns of a source image in accordance with the lossless bidirectional-reconstruction process illustrated in FIG. 14a;

FIG. 14c illustrates application of the lossless bidirectional reconstruction process illustrated in FIG. 14a, as applied to the Red (R), Green (G), Blue (B) and transparency (a) image-pixel elements of a bidirectionally-compacted image pixel to generate corresponding image-pixel elements of corresponding quad of image cells from a pair of adjacent rows and a pair of adjacent columns of a source image;

FIG. 32 illustrates an example of a high-definition image used to illustrate the processes illustrated in FIGS. 31 and 39;

FIG. 33 illustrates a scaled image that is generated from a base image associated with the high-definition image of FIG. 32, which includes an associated subset of image pixels defining the base image;

FIG. 36 illustrates a base subset of difference-image pixels of the difference image illustrated in FIG. 34;

FIG. 37 illustrates a first subset of non-base difference-image pixels of the difference image illustrated in FIG. 34;

FIG. 38 illustrates a second subset of non-base difference-image pixels of the difference image illustrated in FIG. 34;

FIG. 40 illustrates a portion of an image including a first portion that is being displayed on a display in accordance with the process illustrated in FIG. 22-28, 29-30, or 39 of reconstructing a high-definition image from a compacted image that had been compacted in accordance with the process illustrated in FIG. 2, and remaining surrounding portions that are sequentially processed in accordance with the process illustrated in FIG. 22-28, 29-30, or 39, for a display that is not being panned by the user viewing the display;

FIG. 41 illustrates a portion of an image including a first portion that is being displayed on a display in accordance with the process illustrated in FIG. 22-28, 29-30, or 39 of reconstructing a high-definition image from a compacted image that had been compacted in accordance with the process illustrated in FIG. 2, and remaining portions that are sequentially processed in accordance with the process illustrated in FIG. 22-28, 29-30, or 39, for a display that is being panned by the user viewing the display, wherein the remaining portions of the image are selected responsive to the direction in which the display is being panned.

DESCRIPTION OF EMBODIMENT(S)

Figure 1:
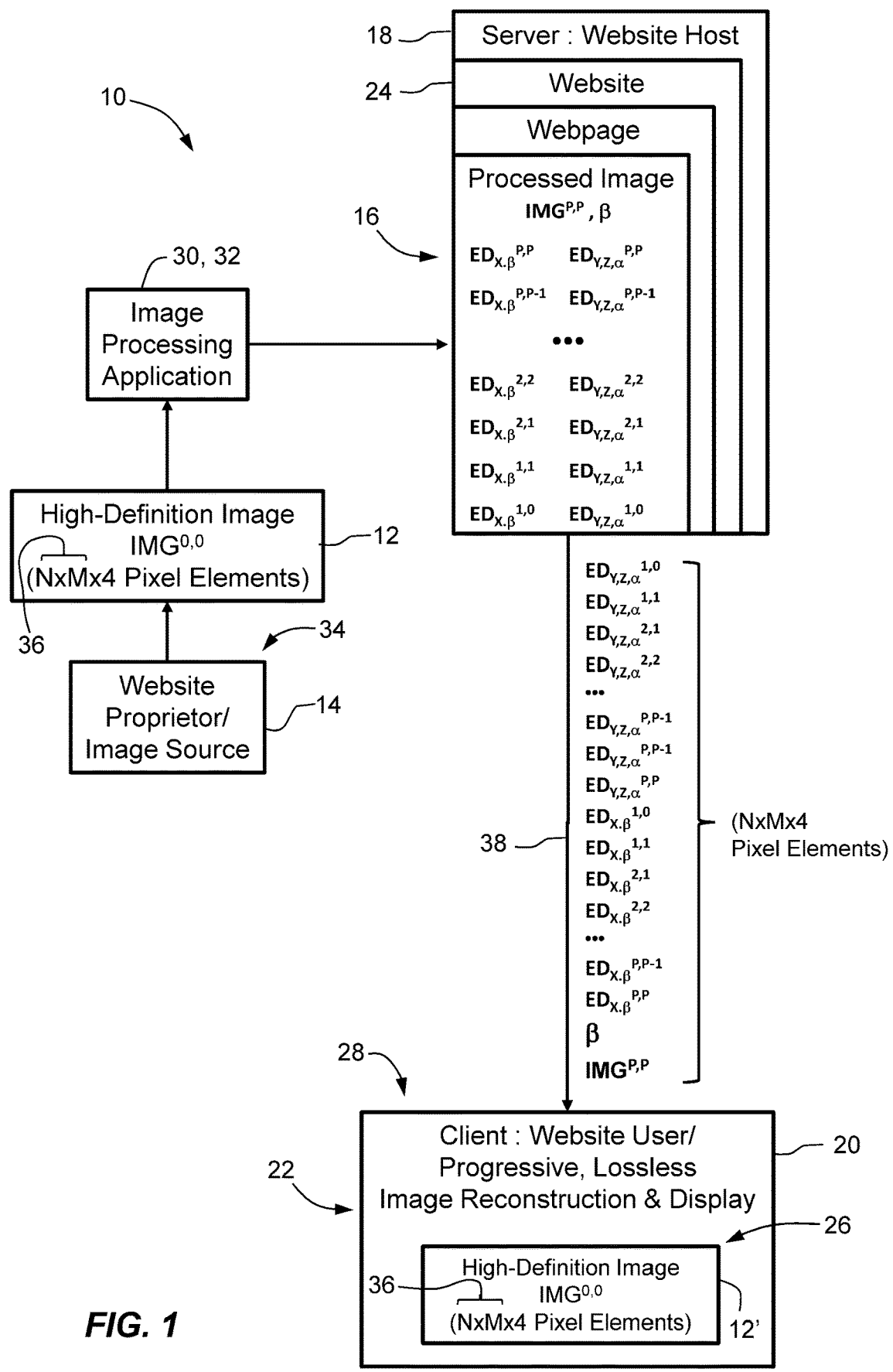
FIG. 1 illustrates an image processing system that provides for preprocessing a high-definition image to provide for a progressive, accelerated download from an internet server of components thereof in a form that provides for a progressive lossless reconstruction of the high-definition image on a client system.
Figure 2:
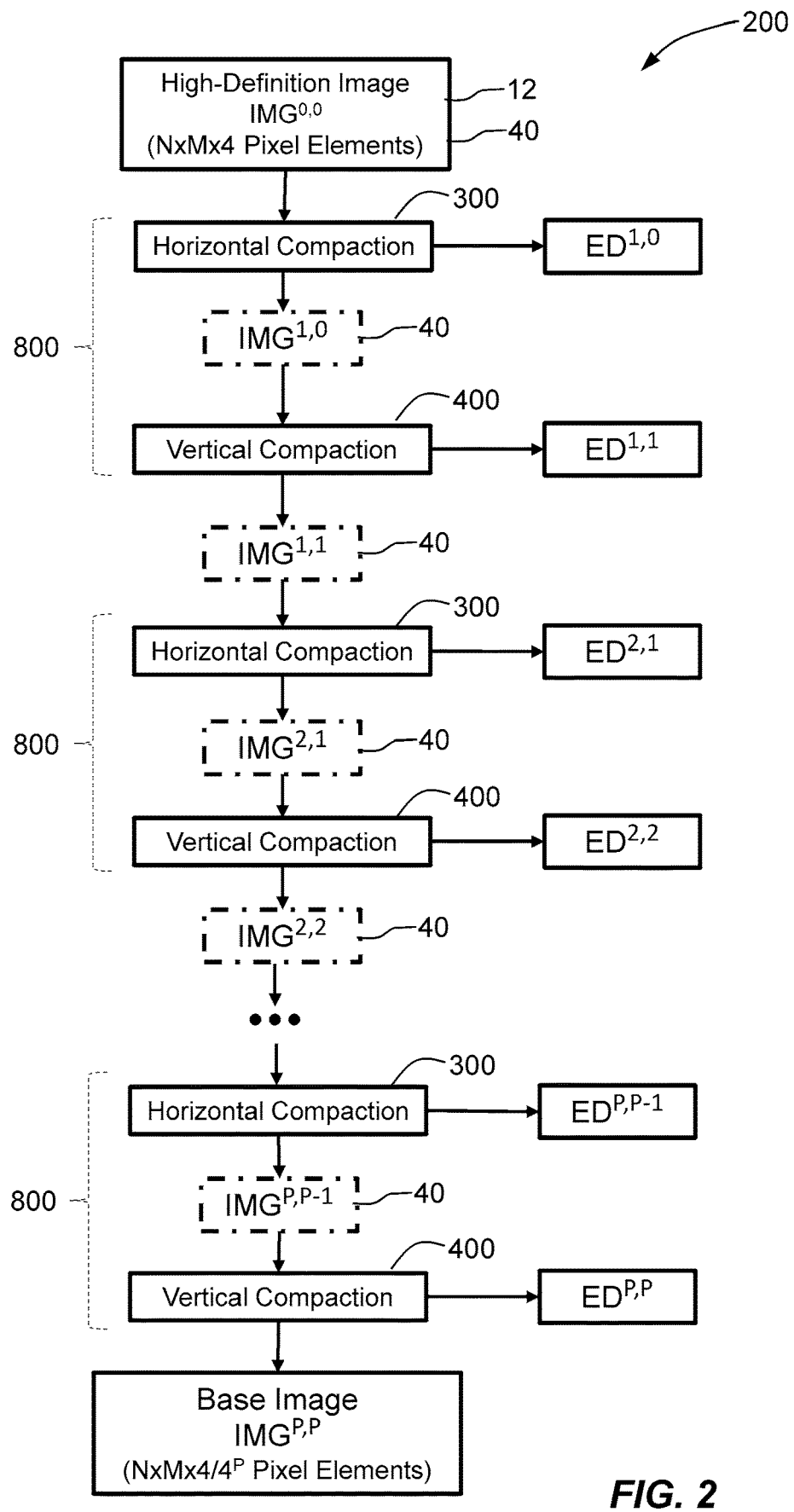
FIG. 2 illustrates a process for progressively compacting a high-definition image using successive horizontal and vertical compaction processes illustrated in FIGS. 3a-b and 4a-b, respectively, to form a corresponding reduced-resolution counterpart image and a plurality of associated extra-data images that, in combination with the reduced-resolution counterpart image, provide for losslessly reconstructing the high-definition image.

Referring to FIG. 1, an image processing system 10 provides for uploading a high-definition image 12 from a website proprietor 14, and sequentially compacting this into a losslessly-reconstructable set of image components 16 that can be readily transmitted from an internet server 18 to an associated internet client 20 at the request of a user 22 of an associated internet website 24 who wishes to display the high-definition image 12 on a display 26 of an internet-connected device 28. For example, in one set of embodiments, the high-definition image 12 is converted to losslessly-reconstructable form 16 by an image processing application 30 running either as a separate internet-based image server 32, on a computing device 34 of the website proprietor 14, or on the internet server 18.

The high-definition image 12 comprises a Cartesian array of M rows by N columns of pixels 36, wherein each pixel 36 comprises a pixel element R, G, B for each of the primary colors, red R, green G, and blue B, and possibly a pixel element α for transparency α, i.e. a total of four pixel elements R, G, B, α, each of which for example, comprises an $N_P$-bit unsigned integer that can range in value from 0 to γ. For example, in one set of embodiments, $N_P$=8, so that γ=255. Accordingly, the high-definition image 12, with four pixel elements R, G, B, α per pixel 36, comprises a total of N×M×4 pixel elements R, G, B, α, which for a large high-definition image 12 can require an unacceptably long period of time (from the standpoint of the user 22) to fully transmit if otherwise transmitted in original form directly over the internet 38 from the internet website 24 hosted by the internet server 18, to the internet-connected device 28 of the user 22 for presentation on the display 26 associated therewith.

For example, the internet-connected device 28 of the user 22 may comprise either a desktop or laptop personal computer (P.C.), a tablet device, a smart phone device, or a user-wearable device such as internet-connected eyewear, a virtual-reality display or a wrist-connected device, any of which might support functionality to provide for either panning or zooming images, either of which can pose additional demands on associated bandwidth for image transmission or display. Furthermore, internet websites are presently automatically ranked based at least in part on the speed at which associated webpages and associated images are displayed. Limitations in transmission bandwidth force digital images to be delivered either slowly with lossless compression to preserve quality or much more quickly with a compromise in that quality due to more lossy compression approaches. Historically, internet applications have almost universally adopted lossy compression approaches for delivering more complex, non-graphical images such as digital photographs because the delays of lossless approaches are unacceptable to most internet users and limitations in device displays often could not present the advantages of lossless compression anyway. However, as device displays increase in both pixel quantity and quality, and as user expectations for better images increase, especially as zooming in on images becomes an increasingly common practice, there is a greater demand for increased perceived image quality as long as there is not a significant perceived compromise in delivery and presentation speed.

Accordingly, there exists a need to provide the user 22 with perceived high-quality images at a perceived speed that is acceptably fast—or at least not unacceptably slow—culminating with a display of an essentially lossless reconstruction 12' of the original high-definition image 12, thereby confirming the perception of the high quality of the displayed image. To this end, the losslessly-reconstructable set of image components 16 includes a base image $IMG^{P,P}$ generated as a result of P stages of compaction in each of the horizontal (row) and vertical (column) directions of the original high-definition image 12, wherein each stage of compaction—for example, two to one compaction in an exemplary embodiment—completed in both directions results in a reduction in the number of pixel elements R, G, B, α by a factor of 4 in the exemplary embodiment. More particularly, in the superscript "P, P", the first "P" indicates the level of horizontal compaction of rows of the high-definition image 12, and the second "P" indicates the level of vertical compaction of columns of the high-definition image 12, wherein, following each level of compaction, the corresponding number of rows or columns in the resulting compacted image is half the corresponding number of rows or columns in the source image subject to that level of compaction. In the exemplary embodiment, each level of compaction reduces the corresponding number of rows or columns by half, with a given level of bidirectional compaction reducing the number of pixels 36 to 25% of the corresponding number of pixels 36 in the source image subject to that level of compaction. Accordingly, the total number of pixels 36 in the base image $IMG^{P,P}$ is less than the corresponding number of pixels 36 in the high-definition image 12 by a factor of $1/(4^P)$; for example, 1/256 for P=4 levels of compaction.

The losslessly-reconstructable set of image components 16 further includes a parameter β and a series of extra-data images ED—both of which are described more fully hereinbelow—that provide for substantially losslessly reconstructing the original high-definition image 12, i.e. a lossless reconstruction 12' that might differ from the original high-definition image 12 as a result of either truncation errors in the associated reconstruction calculations, or as the result of the effects of data compression or other artifacts that are introduced by the process of transmitting the losslessly-reconstructable set of image components 16 over the internet 38 from the internet server 18 to the internet client 20. The extra-data images ED, in cooperation with parameter β for some of the intermediate images, provide for successively reconstructing and displaying a series of intermediate reconstructed images with successively-improving quality and resolution, culminating with a display of the ultimate lossless reconstruction 12' of the high-definition image 12. Although the total number of pixel elements R, G, B, α in the losslessly-reconstructable set of image components 16 is the same as in the original high-definition image 12, the former are structured so as to provide for quickly displaying the base image $IMG^{P,P}$—thereby conveying the nature of the content thereof,—and then successively improving the quality of the displayed image, so as to thereby accommodate the link speed of the internet 38 without adversely affecting the perceived speed at which the image is displayed and the perceived quality thereof.

Figure 5:
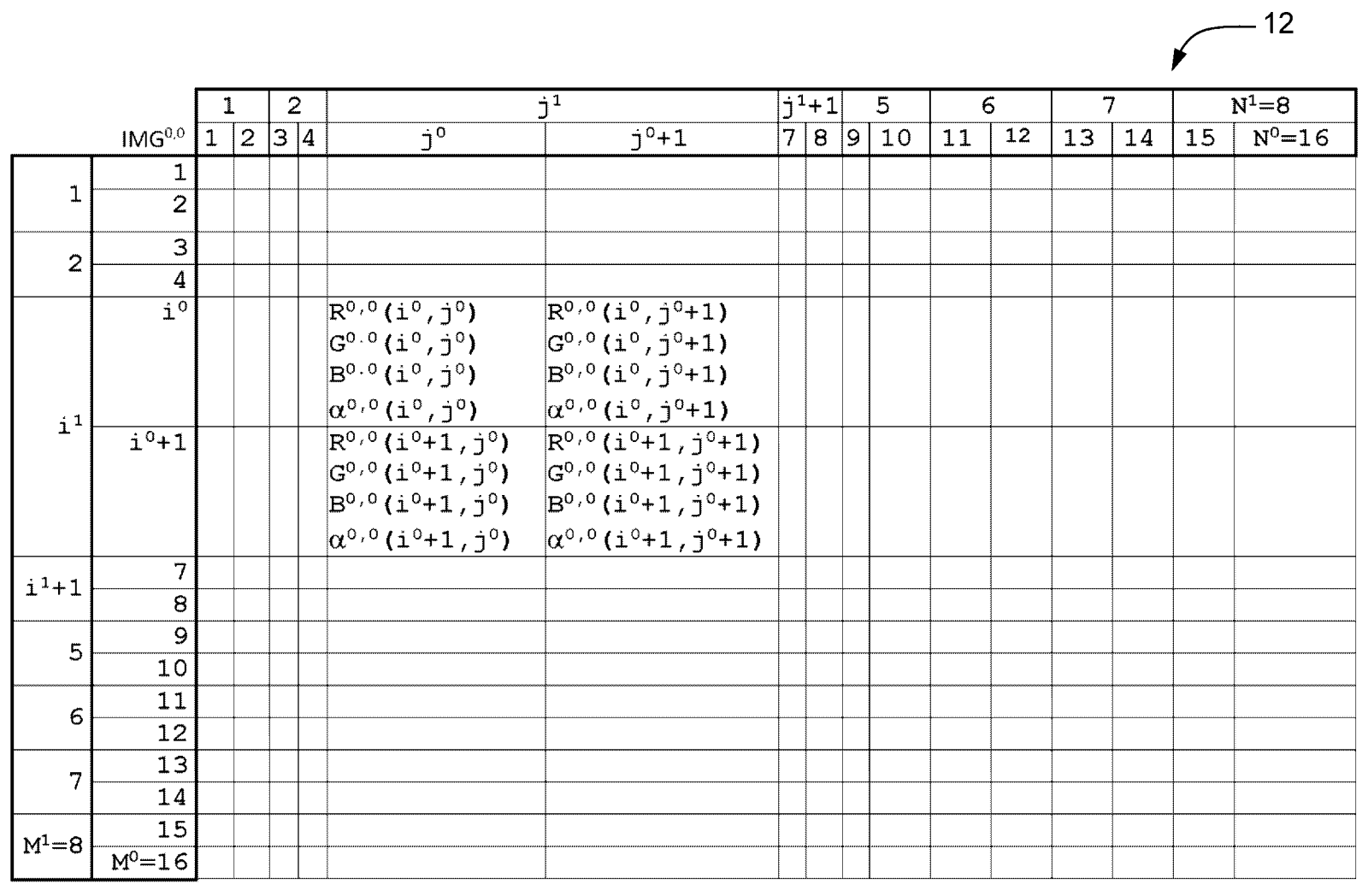
Figures 6A, 6B:
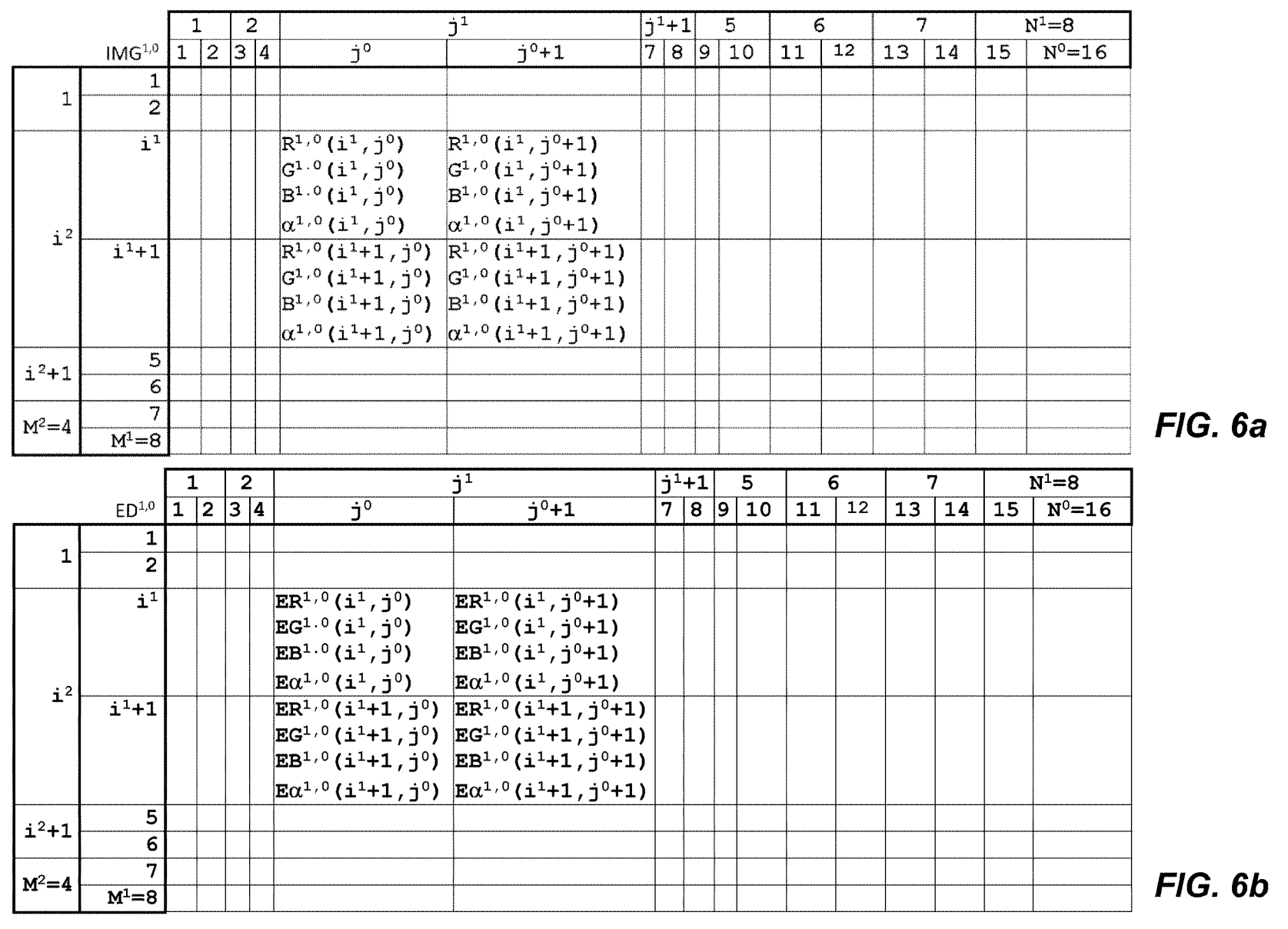

For example, referring to FIGS. 2, 3a-b and 4a-b, in one set of embodiments, in accordance with an associated image compaction process 200, the extra-data images ED, $ED^{1,0}$, $ED^{1,1}$, $ED^{2,1}$ $ED^{2,2}$, ..., $ED^{P,P-1}$, $ED^{P,P}$ and base image $IMG^{P,P}$ are generated as a result of P levels of successive horizontal and vertical compactions of the original high-definition image 12, $IMG^{0,0}$ and subsequent, successively-generated compacted intermediate images $IMG^{1,0}$, $IMG^{1,1}$, $IMG^{2,1}$, $IMG^{2,2}$, ..., $IMG^{P,P-1}$, finally leading to the generation of the base image $IMG^{P,P}$, which is stored, along with the extra-data images ED, $ED^{1,0}$, $ED^{1,1}$, $ED^{2,1}$, $ED^{2,2}$, ..., $ED^{P,P-1}$, $ED^{P,P}$ in the associated losslessly-reconstructable set of image components 16. More particularly, a first intermediate, compacted image $IMG^{1,0}$ and a corresponding first extra-data image $ED^{1,0}$ are first generated by a horizontal compaction process 300, CH{ } illustrated in FIGS. 3a-b. More particularly, FIG. 3a illustrates the equations used to compact a given pair of pixel element values $PV_{k,l}(i^k, j^l)$, $PV^{k,l}(i^k+1, j^l)$ of corresponding pixel elements R, G, B, α of a pair of vertically-adjacent pixels 36 in rows $i^k$ and $i^k+1$ and column $j^l$ of the corresponding source image 40, wherein for this first compaction process the source image 40 is the original, uncompacted high-definition image 12 for which k=0 and l=0. For example, FIG. 5 illustrates an example of a $M^0$=16×$N^0$=16 source image, with the rows indexed by row index $i^0$, and the columns indexed by column index $j^0$. The superscript "0" for each of these indices and the total numbers of rows $M^O$ and columns $N^O$ is indicative of the corresponding compaction level of 0. A horizontal compaction reduces the number of rows $M^1=8$ in the resulting first intermediate, compacted image $IMG^{1,0}$ to half the number of rows $M^O$ of the corresponding source image 40, i.e. the high-definition image 12, with the rows of the first intermediate, compacted image $IMG^{1,0}$ then indexed by a corresponding row index $i^1$ that ranges in value from 1 to $M^1$. For horizontal compaction, generally the relationship of the row indices $i^k$, $i^{k+1}$ of the source 40, $IMG^{k,l}$ and compacted $IMG^{k+1}$ images, respectively, is given by $i^{k+1} = (i^k+1)/2$. Accordingly, the horizontal compaction of the pair of pixel element values $PV^{k,l}(i^k, j^l)$, $PV^{k,l}(i^k+j^l)$ from the source image 40 results in a single pixel element value $PV^{k+1,l}(i^{k+1}, j^l)$ in the resulting compacted image $IMG^{k+1,l}$ and a corresponding extra-data image pixel element value $ED^{k+1,l}(i^k, j^l)$ in the corresponding extra-data image $ED^{k+1,l}$. For example, FIGS. 6a and 6b respectively illustrate the first intermediate, compacted image $IMG^{1,0}$ and the first extra-data image $ED^{1,0}$ resulting from the horizontal compaction of the high-definition image 12, $IMG^{0,0}$ illustrated in FIG. 5.

Following the horizontal compaction of the original high-definition image 12 to generate the first intermediate, compacted image $IMG^{1,0}$ and associated first extra-data image $ED^{1,0}$, the first intermediate, compacted image $IMG^{1,0}$— used as a source image 40—is vertically compacted by a vertical compaction process 400, CV{ } illustrated in FIGS. 4a-b to generate a corresponding second intermediate, compacted image $IMG^{1,1}$ and a corresponding second extra-data image $ED^{1,1}$. More particularly, FIG. 4a illustrates the equations used to compact a given pair of horizontally-adjacent pixel element values $PV^{k,l}(i^k, j^l)$, $PV^{k,l}(i^k, j^l+1)$ of corresponding pixel elements R, G, B, α of a pair of horizontally-adjacent pixels 36 in columns $j^l$ and $j^l+1$ and row $i^k$ of the corresponding source image 40. Accordingly, the vertical compaction of the pair of pixel element values $PV^{k,l}(i^k, j^l)$, $PV^{k,l}(i^k, j^l+1)$ from the source image 40 results in a single compacted pixel element value $PV^{k,l+1}(i^k, j^{l+1})$ in the resulting compacted image $IMG^{k,l+1}$ and a corresponding extra-data image pixel element value $ED^{k,l+1}(i^k, j^{l+1})$ in the corresponding extra-data image $ED^{k,l+1}$. For example, FIGS. 7a and 7b respectively illustrate the second intermediate, compacted image $IMG^{1,1}$ and the second extra-data image $ED^{1,1}$ resulting from the vertical compaction of the first intermediate, compacted image $IMG^{1,0}$ illustrated in FIG. 6a.

Referring to FIGS. 8a-b and 9a-b, alternatively, both the horizontal and vertical compactions can be accomplished with a simultaneous bidirectional compaction by a bidirectional compaction process 800, CB{ } illustrated in FIGS. 8a-b, in accordance with the equations illustrated in FIG. 8a for a quad of pixel element values $PV^{k,l}(i^k, j^l)$, $PV^{k,l}(i^k, j^l+1)$, $PV^{k,l}(i^k+1, j^l)$, $PV^{k,l}(i^k+1, j^l+1)$ illustrated in FIG. 8b, so as to provide for generating a single corresponding compacted pixel element value $PV^{k+1,l+1}(i^{k+1}, j^{l+1})$ in combination with three corresponding associated extra-data image pixel element values $ED^{k+1,l+1,1}(i^{k+1}, j^{l+1})$, $ED^{k+1,l+1,2}(i^{k+1}, j^{l+1})$, $ED^{k+1,l+1,3}(i^{k+1}, j^{l+1})$ wherein FIG. 9a illustrates the associated intermediate, compacted image $IMG^{1,1}$ generated directly from the high-definition image 12, $IMG^{0,0}$ using the equations illustrated in FIG. 8a, and FIG. 9b illustrates the corresponding associated extra-data image $ED^{1,1}$ resulting from this bidirectional compaction process.

Returning to FIG. 2, following the vertical compaction process 400 to generate the second intermediate, compacted image $IMG^{1,1}$, the second intermediate, compacted image $IMG^{1,1}$—as a source image 40—is then compacted using the horizontal compaction process 300 to generate a third intermediate, compacted image $IMG^{2,1}$ and a corresponding third extra-data image $ED^{2,1}$, respective examples of which are illustrated in FIGS. 10a and 10b, respectively. The third intermediate, compacted image $IMG^{2,1}$—as a source image 40—is then compacted using the vertical compaction process 400 to generate a fourth intermediate, compacted image $IMG^{2,2}$ and a corresponding fourth extra-data image $ED^{2,2}$, respective examples of which are illustrated in FIGS. 11a and 1b, respectively. The compaction process continues with successive alternations of horizontal and vertical compaction until the final application of the vertical compaction process 400 to generate the base image $IMG^{P,P}$ and the corresponding last extra-data image $ED^{P,P}$, Referring to FIGS. 12a-b, a lossless vertical reconstruction process 1200, RV{ } provides for losslessly reconstructing adjacent pixel element values $PV^{k,l}(i^k, j^l)$, $PV^{k,l}(i^k, j^l+1)$ from a corresponding compacted pixel element value $PV^{k,l+1}(i^k,j^{l+1})$ using the corresponding associated extra-data image pixel element value $ED^{k,l+1}(i^k, j^{l+1})$, both of which were generated by the vertical compaction process 400 of FIGS. 4a and 4b, wherein FIG. 12c illustrates the application of the equations of the lossless vertical reconstruction process 1200 illustrated in FIG. 12a to each of the associated pixel elements R, G, B, α, i.e. X=R, G, B, or α.

Referring to FIGS. 13a-b, a lossless horizontal reconstruction process 1300, RH{ } provides for losslessly reconstructing adjacent pixel element values $PV^{k,l}(i^k, j^l)$, $PV^{k,l}(i^k+1, j^l)$ from a corresponding compacted pixel element value $PV^{k+1,l}(i^{k+1}, j^l)$ using the corresponding associated extra-data image pixel element value $ED^{k+1,l}(i^{k+1}, j^l)$ both of which were generated by the horizontal compaction process 300 of FIGS. 3a and 3b, wherein FIG. 13c illustrates the application of the equations of the lossless horizontal reconstruction process 1300 illustrated in FIG. 13a to each of the associated pixel elements R, G, B, α, i.e. X=R, G, B, or α.

Referring to FIGS. 14a-b, a lossless bidirectional reconstruction process 1400, RB{ } provides for losslessly reconstructing a quad of pixel element values $PV^{k,l}(i^k, j^l)$ $PV^{k,l}(i^k, j^l+1)$, $PV^{k,l}(i^k+1, j^l)$, $PV^{k,l}(i^k+1, j^l+1)$ from a corresponding compacted pixel element value $PV^{k+1,l+1}(i^{k+1}, j^{l+1})$ using the corresponding associated extra-data image pixel element values $ED^{k+1,l+1,1}(i^{k+1}, j^{l+1})$, $ED^{k+1,l+1,2}(i^{k+1}, j^{l+1})$, $ED^{k+1,l+1,3}(i^{k+1}, j^{l+1})$ all of which were generated by the bidirectional compaction process 300 of FIGS. 8a and 8b, wherein FIG. 14c illustrates the application of the equations of the lossless bidirectional reconstruction process 1400 illustrated in FIG. 14a to each of the associated pixel elements R, G, B, α, i.e. X=R, G, B, or α.

Figure 15:
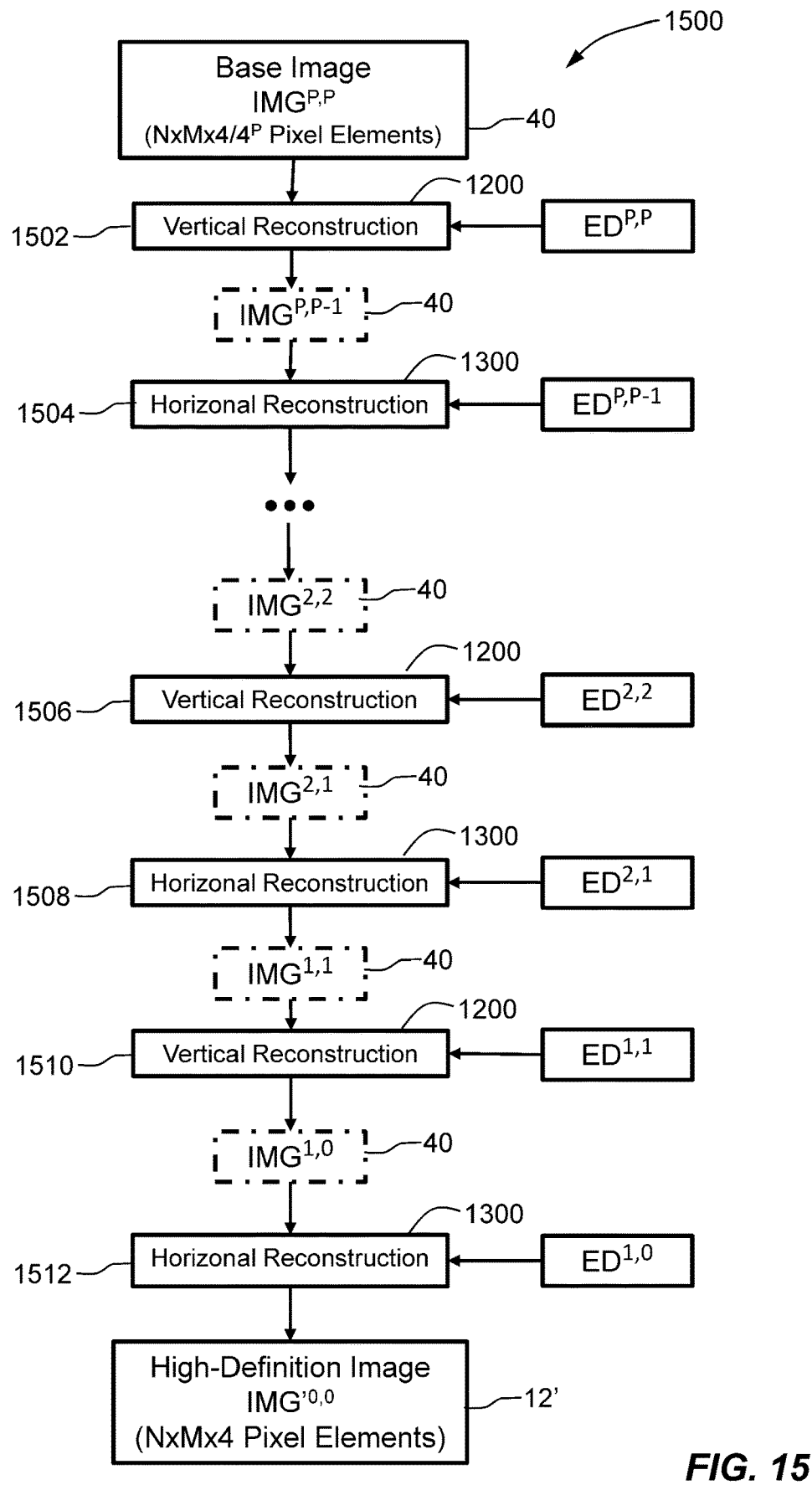
FIG. 15 illustrates a process for losslessly reconstructing a compacted image that was compacted in accordance with the process illustrated in FIG. 2, wherein the lossless reconstruction is in accordance with successive applications of the vertical and horizontal reconstruction processes illustrated in FIGS. 12a-12c and 13a-13c, respectively.

Referring to FIG. 15, a first aspect of an image reconstruction process 1500 provides for a substantially lossless reconstruction 12', $IMG^{0,0}$ of the high-definition image 12, $IMG^{0,0}$, beginning, in step (1502), with application of the lossless vertical reconstruction process 1200 to the base image $IMG^{P,P}$ to generate a first intermediate reconstructed image $IMG^{P,P-1}$, and then, in step (1504), application of the lossless horizontal reconstruction process 1300 to the first intermediate reconstructed image $IMG^{P,P-1}$ to generate a second intermediate reconstructed image $IMG^{P-1,P-1}$, continuing with successive alternating applications, in steps (1506) through (1512), of the lossless vertical 1200 and horizontal 1300 reconstruction processes to each previously-generated intermediate reconstructed image that is used as a source image 40 to the subsequent lossless reconstruction process, wherein each lossless reconstruction process, horizontal or vertical, is a counterpart to the corresponding compaction process, horizontal or vertical, that had been used to generate the associated compacted image and associated extra-data image that is being reconstructed. The extra-data images $ED^{P,P}$, $ED^{P,P-1}$, ..., $ED^{2,2}$, $ED^{2,1}$, $ED^{1,1}$, $ED^{1,0}$ are the same as those generated during the associated image compaction process 200 illustrated in FIG. 2.

Each pixel of the extra-data images $ED^{P,P}$, $ED^{P,P-1}$, ..., $ED^{2,2}$, $ED^{2,1}$, $ED^{1,1}$, $ED^{1,0}$ includes associated extra-data image pixel values for each of the associated pixel components R, G, B, α. Although this complete set of extra-data image pixel values for each of the associated pixel components R, G, B, α provides for the substantially lossless reconstruction 12', $IMG^{0,0}$ of the high-definition image 12, $IMG^{0,0}$, it has been found that a reconstruction of the high-definition image 12, $IMG^{0,0}$ using only one of the primary-color pixel components R, G, B from the associated extra-data images $ED^{P,P}$, $ED^{P,P-1}$, ..., $ED^{2,2}$, $ED^{2,1}$, $ED^{1,1}$, $ED^{1,0}$ for reconstruction of all primary-color components R, G, B provides for an approximate reconstruction of the high-definition image 12, $IMG^{0,0}$ that has sufficiently-high fidelity to be used as an intermediate reconstructed image, which can be made available for display more quickly that can the substantially lossless reconstruction 12', $IMG^{0,0}$ of the high-definition image 12, $IMG^{0,0}$, because the approximate reconstruction of the high-definition image 12, $IMG^{0,0}$ is dependent upon only one of the primary-color pixel components R, G, B, which requires only 25% of the extra-data as would be used for a lossless reconstruction 12', $IMG'^{0,0}$. Furthermore, it has been found that the fidelity of the approximate reconstruction of the high-definition image 12, $IMG^{0,0}$ can be dependent upon which of the primary-color pixel components R, G, B is selected for the approximate reconstruction, wherein the primary-color pixel component R, G, B that provides for the highest-fidelity approximate reconstruction is referred to as the lead-primary-color pixel component X, wherein X is one of R, G and B.

Figure 16:
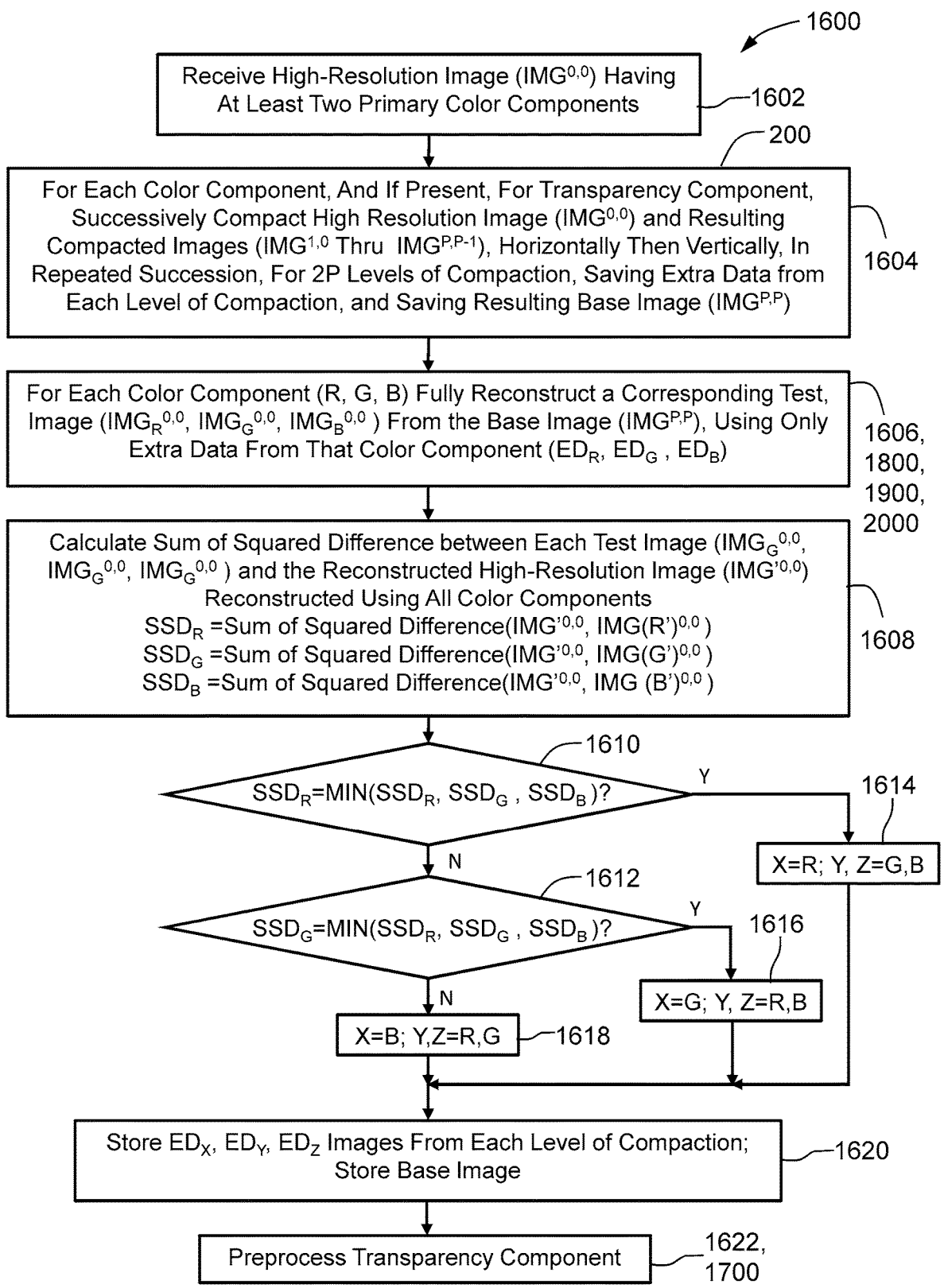
FIG. 16 illustrates a process for selecting a lead-primary-color extra-data image component to be used for approximately reconstructing a high-definition image.
Figure 18:
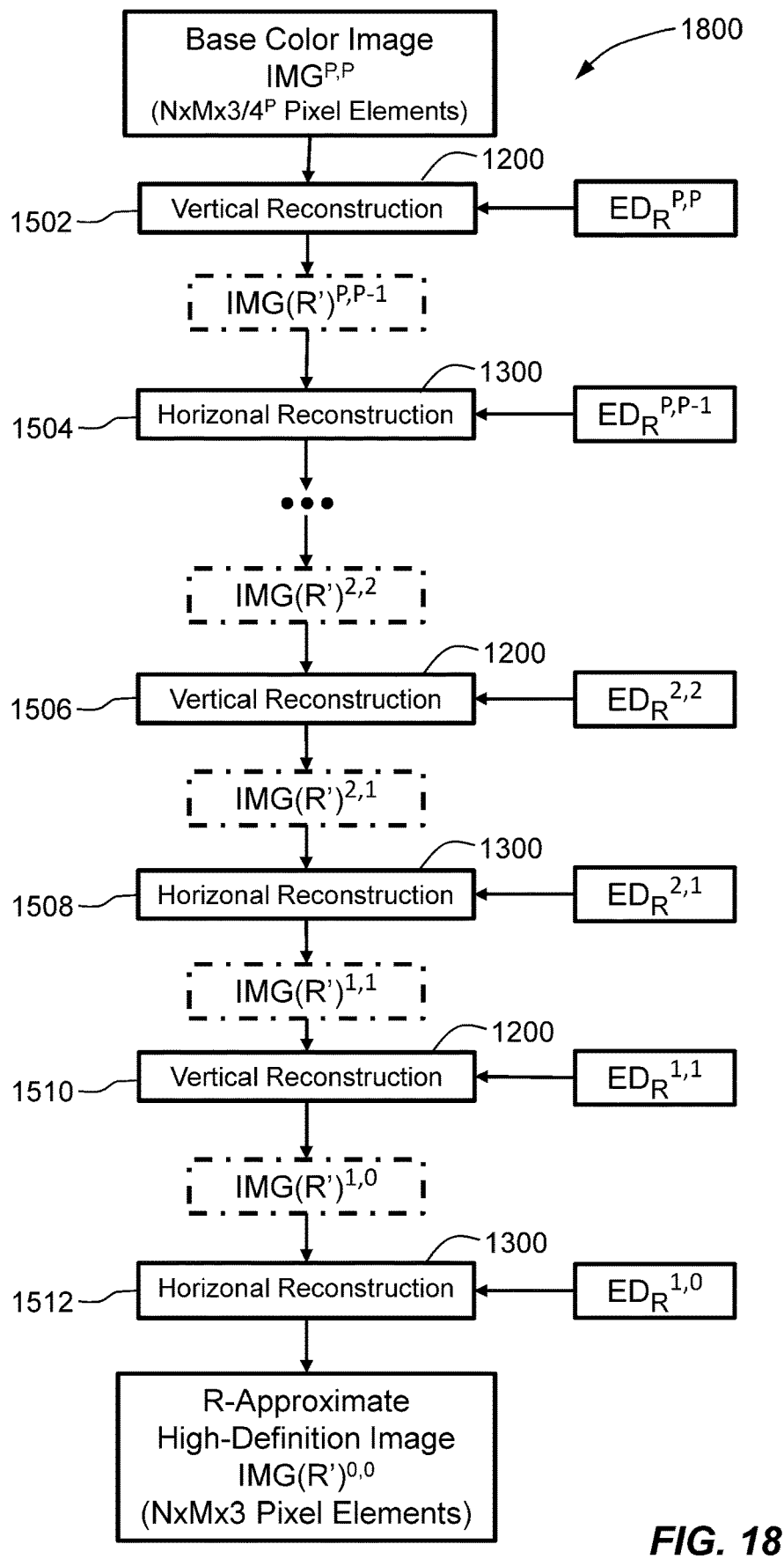
FIG. 18 illustrates a process—called from the process illustrated in FIG. 16—for approximately reconstructing primary-color pixel elements of a compacted image that was compacted in accordance with the process illustrated in FIG. 2, wherein the approximate reconstruction is in accordance with successive applications of the vertical and horizontal reconstruction processes illustrated in FIGS. 12a-12c and 13a-13c, respectively, but using only corresponding extra-data associated with the red extra-data pixel element data.
Figure 19:
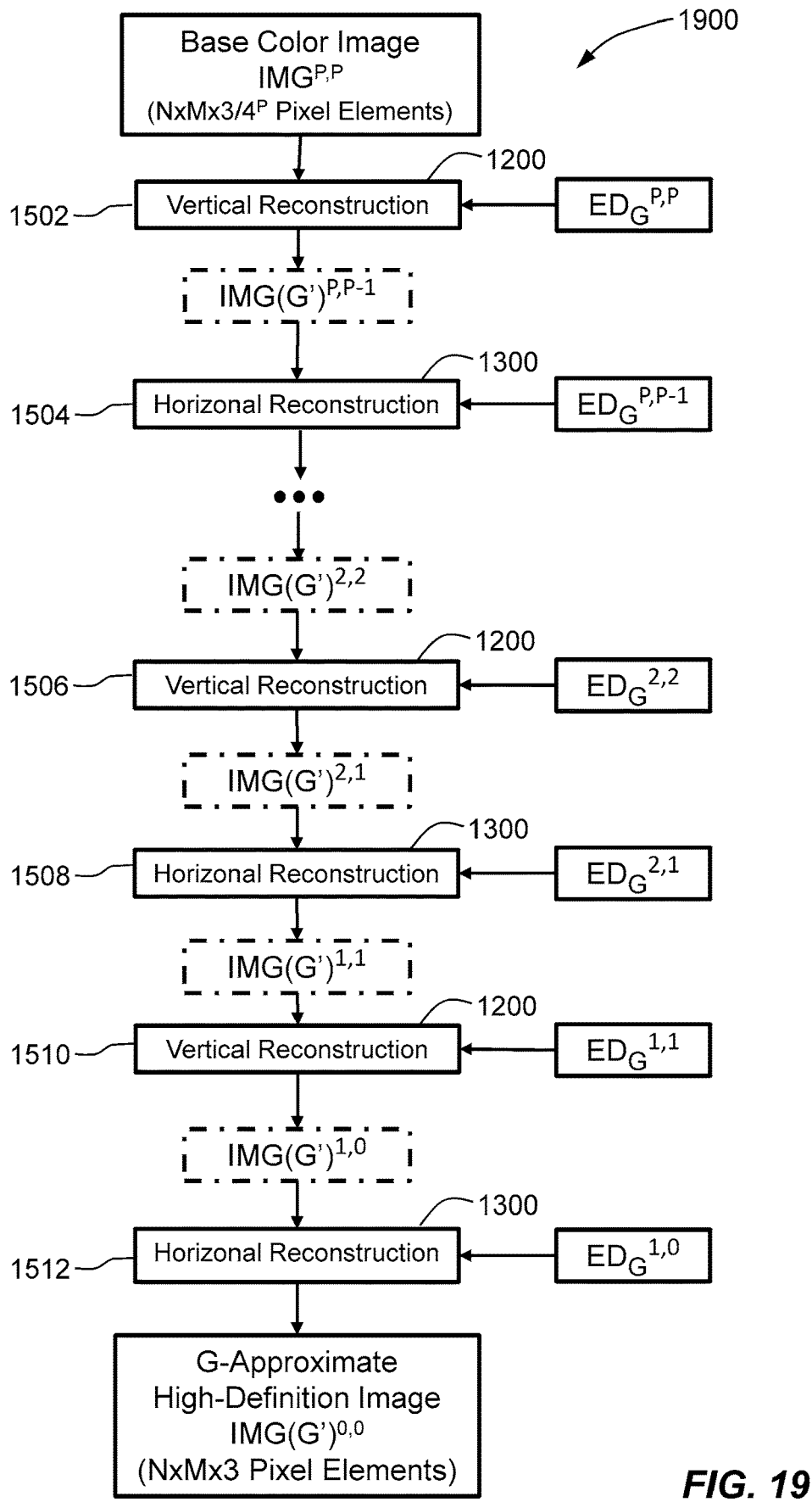
FIG. 19 illustrates a process—called from the process illustrated in FIG. 16—for approximately reconstructing primary-color pixel elements of a compacted image that was compacted in accordance with the process illustrated in FIG. 2, wherein the approximate reconstruction is in accordance with successive applications of the vertical and horizontal reconstruction processes illustrated in FIGS. 12a-12c and 13a-13c, respectively, but using only corresponding extra-data associated with the green extra-data pixel element data.
Figure 20:
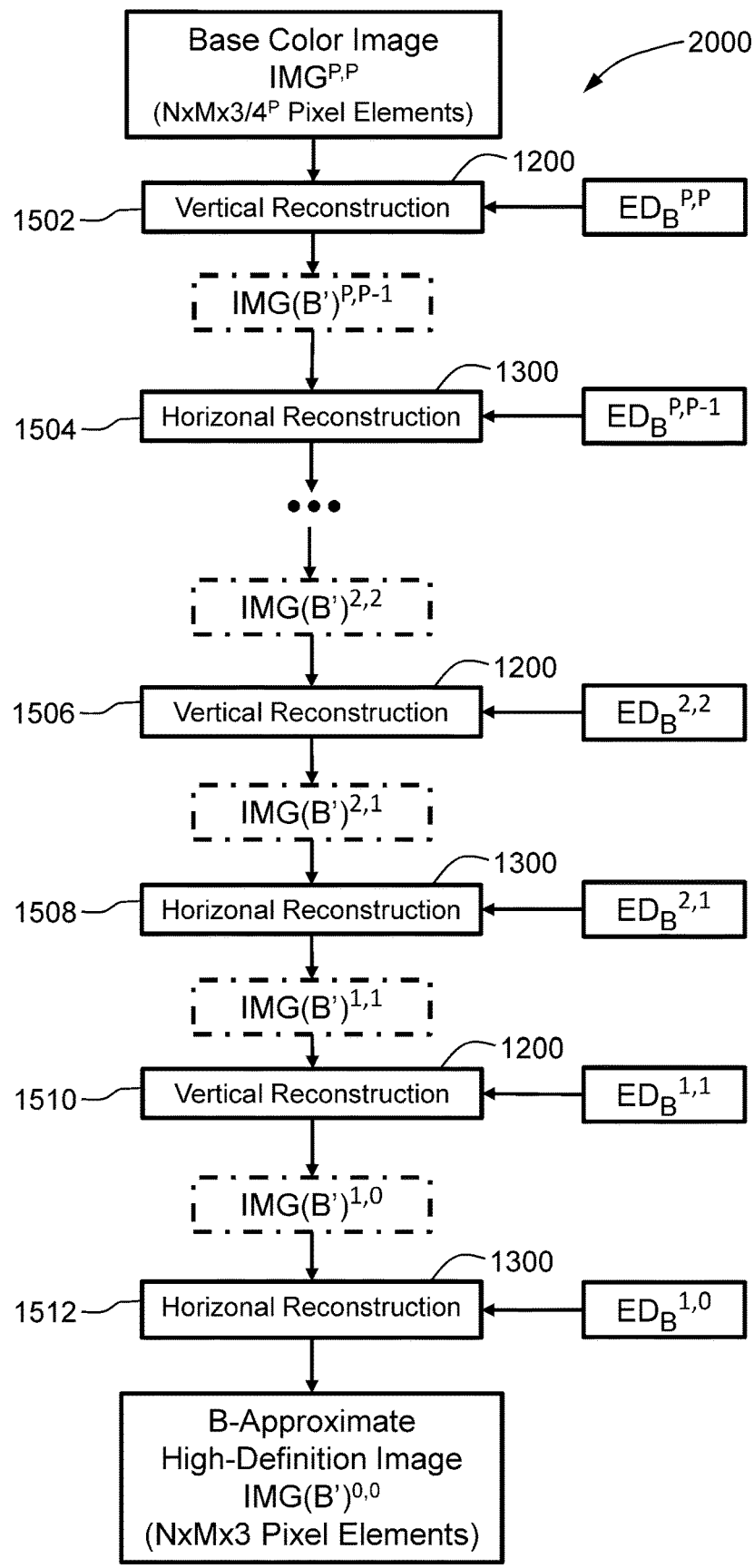
FIG. 20 illustrates a process—called from the process illustrated in FIG. 16—for approximately reconstructing primary-color pixel elements of a compacted image that was compacted in accordance with the process illustrated in FIG. 2, wherein the approximate reconstruction is in accordance with successive applications of the vertical and horizontal reconstruction processes illustrated in FIGS. 12a-12c and 13a-13c. respectively, but using only corresponding extra-data associated with the blue extra-data pixel element data.

Referring to FIG. 16, the lead-primary-color pixel component X is identified by a lead-primary-color identification process 1600. Beginning with step (1602), for a high-definition image 12 having at least two primary-color components, in step (1604), each of the pixel components R, G, B, α, of the associated pixel element data for each of the corresponding pixel elements R, G, B, α is compacted in accordance with the above-described image compaction process 200 to generate the base image $IMG^{P,P}$ and the associated extra-data images $ED^{P,P}$, $ED^{P,P-1}$, ..., $ED^{2,2}$, $ED^{2,1}$, $ED^{1,1}$, $ED^{1,0}$ of the losslessly-reconstructable set of image components 16. Then, in step (1606), for each primary-color pixel component R, G, B, the corresponding primary-color pixel component R, G, B of the extra-data images $ED^{P,P}$, $ED^{P,P-1}$, ..., $ED^{2,2}$, $ED^{2,1}$, $ED^{1,1}$, $ED^{1,0}$ is used exclusively to reconstruct an approximate image, i.e. a test image, containing all of the primary-color pixel components R, G, B from the base image $IMG^{P,P}$ and the associated intermediate images $IMG^{P,P-1}$, ..., $IMG^{2,2}$, $IMG^{2,1}$, $IMG^{1,1}$, $IMG^{1,0}$, but using corresponding extra-data images $ED^{P,P}$, $ED^{P,P-1}$, ..., $ED^{2,2}$, $ED^{2,1}$, $ED^{1,1}$, $ED^{1,0}$ of only the corresponding one of the primary-color pixel components R, G, B. More particularly, referring to FIG. 18, an R-approximate image $IMG(R')^{0,0}$ is generated by a red-approximate image reconstruction process 1800, which is the same as the image reconstruction process 1500 illustrated in FIG. 15, except that only the red-image component is used from the extra-data images $ED_R^{P,P}$, $ED_R^{P,P-1}$, ..., $ED_R^{2,2}$, $ED_R^{2,1}$, $ED_R^{1,1}$, $ED_R^{1,0}$ to reconstruct each of the corresponding pixel elements R, G, B, α from the base image $IMG^{P,P}$ and each of the associated intermediate images $IMG^{P,P-1}$, ..., $IMG^{2,2}$, $IMG^{2,1}$, $IMG^{1,1}$, $IMG^{1,0}$, i.e. for each of the associated primary-color pixel components R, G, B and for the associated transparency α component, regardless of color or transparency. Furthermore, referring to FIG. 19, a G-approximate image $IMG(G')^{0,0}$ is generated by a green-approximate image reconstruction process 1900, which is the same as the image reconstruction process 1500 illustrated in FIG. 15, except that only the green-image component is used from the extra-data images $ED_G^{P,P}$, $ED_G^{P,P-1}$, ..., $ED_G^{2,2}$, $ED_G^{2,1}$, $ED_G^{1,1}$, $ED_G^{1,0}$ to reconstruct each of the corresponding pixel elements R, G, B, α from the base image $IMG^{P,P}$ and each of the associated intermediate images $IMG^{P,P-1}$, ..., $IMG^{2,2}$, $IMG^{2,1}$, $IMG^{1,1}$, $IMG^{1,0}$, i.e. for each of the associated primary-color pixel components R, G, B and for the associated transparency α component, regardless of color or transparency. Yet further, referring to FIG. 20, a B-approximate image $IMG(B')^{0,0}$ is generated by a blue-approximate image reconstruction process 2000, which is the same as the image reconstruction process 1500 illustrated in FIG. 15, except that only the blue-image component is used from the extra-data images $ED_B^{P,P}$, $ED_B^{P,P-1}$, ..., $ED_B^{2,2}$, $ED_B^{2,1}$, $ED_B^{1,1}$, $ED_B^{1,0}$ to reconstruct each of the corresponding pixel elements R, G, B, α from the base image $IMG^{P,P}$ and each of the associated intermediate images $IMG^{P,P-1}$, ..., $IMG^{2,2}$, $IMG^{2,1}$, $IMG^{1,1}$, $IMG^{1,0}$, i.e. for each of the associated primary-color pixel components R, G, B and for the associated transparency α component, regardless of color or transparency. Then, returning to FIG. 16, in step (1608), each resulting approximate reconstructed image, i.e. separately, each of the R-approximate image $IMG(R')^{0,0}$, the G-approximate image $IMG(G')^{0,0}$, and the B-approximate image $IMG(B')^{0,0}$, is compared with the lossless reconstruction 12', $IMG'^{0,0}$ that was based upon the complete set of extra-data image elements for each of the pixel components R, G, B, α. More particularly, a sum-of-squared difference $SSD_R$, $SSD_G$, $SSD_B$—between the lossless reconstruction 12', $IMG'^{0,0}$ and the respective R-approximate image $IMG(R')^{0,0}$, G-approximate image $IMG(G')^{0,0}$ and B-approximate image $IMG(B')^{0,0}$, respectively—is calculated as sum of the square of the difference between the values of corresponding pixel elements R, G, B, α for each pixel elements R, G, B, α and for all pixels 36 of the respective images, i.e. $IMG'^{0,0}$ and $IMG(R')^{0,0}$, $IMG(G')^{0,0}$ or $IMG(B')^{0,0}$. Based upon comparisons in at least one of steps (1610) and (1612), in one of steps (1614) through (1618), the primary-color pixel component R, G, B associated with the smallest-valued sum-of-squared difference $SSD_R$, $SSD_G$, $SSD_B$ is then identified as the lead-primary-color pixel component X, and, in step (1620), the corresponding extra-data images $ED_X^{P,P}$, $ED_X^{P,P-1}$, ..., $ED_X^{2,2}$, $ED_X^{2,1}$, $ED_X^{1,1}$, $ED_X^{1,0}$ are saved, as are the extra-data images $ED_Y^{P,P}$, $ED_Y^{P,P-1}$, ..., $ED_Y^{2,2}$, $ED_Y^{2,1}$, $ED_Y^{1,1}$, $ED_Y^{1,0}$ and $ED_Z^{P,P}$, $ED_Z^{P,P-1}$, ..., $ED_Z^{2,2}$, $ED_Z^{2,1}$, $ED_Z^{1,1}$, $ED_Z^{1,0}$ for the remaining primary-color pixel components R, G, B. Accordingly if X=R, then {Y,Z}={G, B}; if X=G, then {Y,Z}={R, B}; and if X=B, then {Y,Z}={R, G}.

Figure 17:
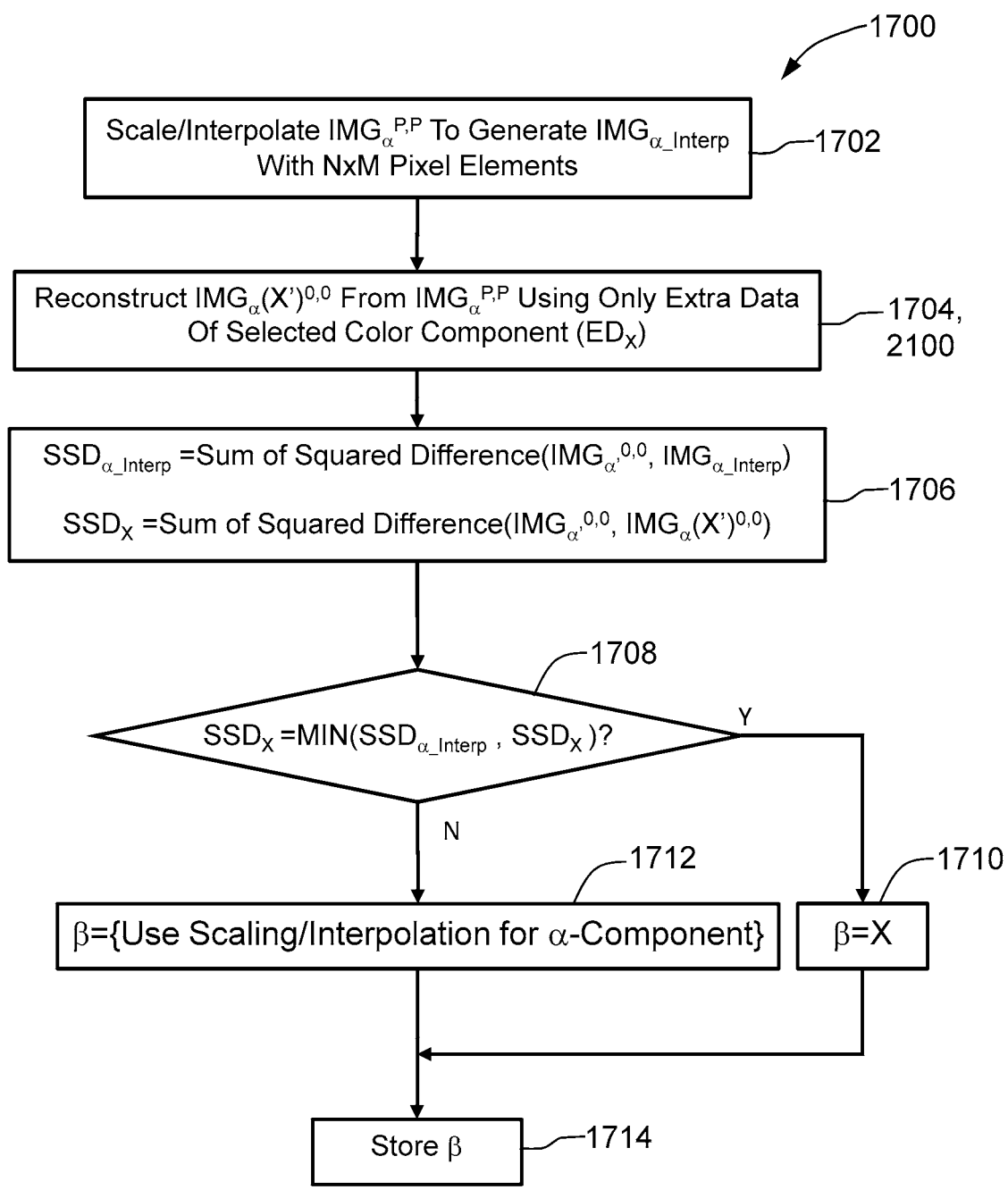
FIG. 17 illustrates a process for selecting a method for approximately reconstructing transparency pixel elements of a high-definition image.
Figure 21:
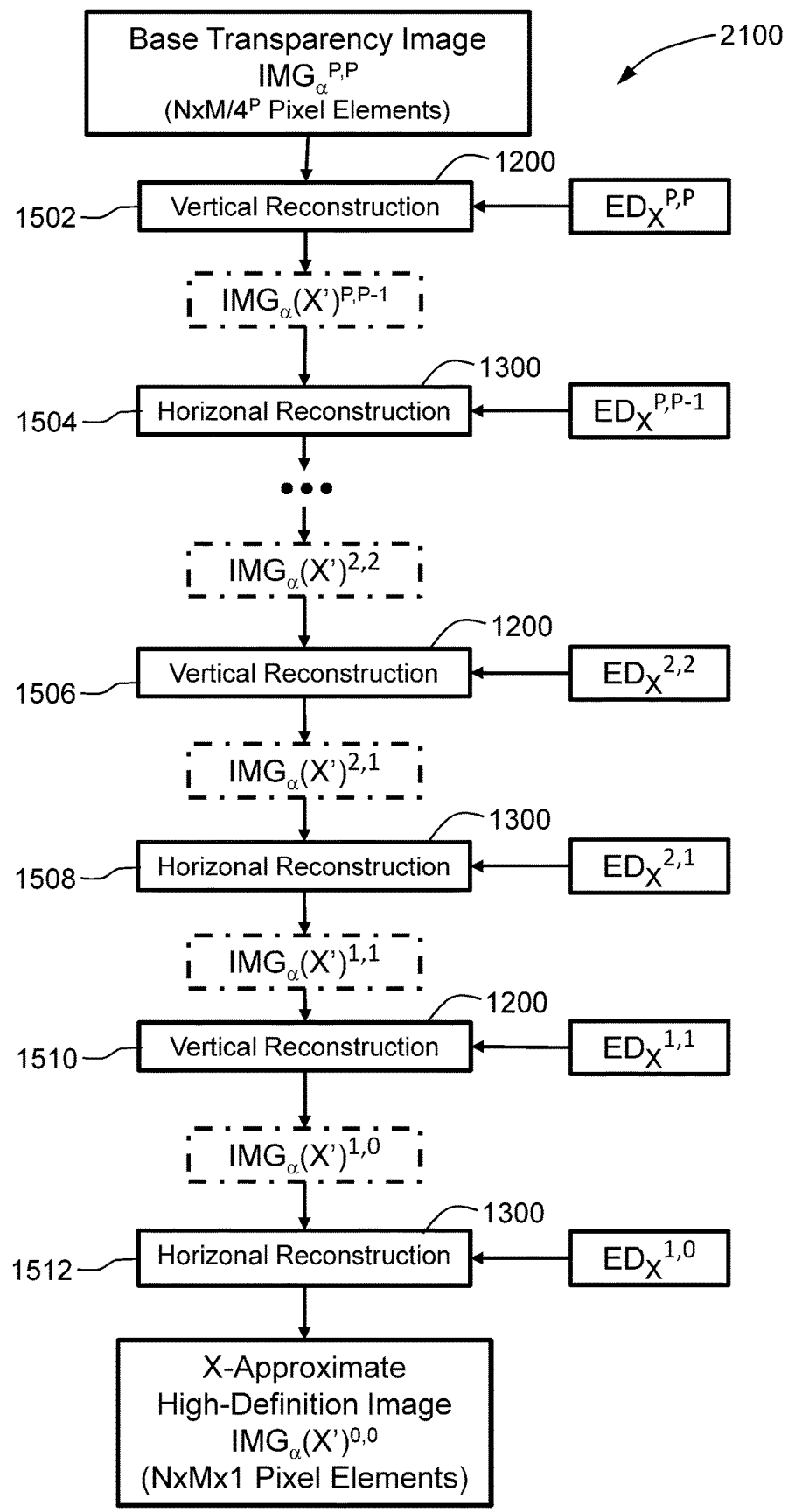
FIG. 21 illustrates a process—called from the process illustrated in FIG. 17—for approximately reconstructing transparency pixel elements of a compacted image that was compacted in accordance with the process illustrated in FIG. 2, wherein the approximate reconstruction is in accordance with successive applications of the vertical and horizontal reconstruction processes illustrated in FIGS. 12a-12c and 13a-13c, respectively, but using only corresponding extra-data associated with the lead-primary-color extra-data pixel element data that had been identified by the process illustrated in FIG. 16.

Referring to FIG. 17, following the identification of the lead-primary-color pixel component X by the lead-primary-color identification process 1600, from step (1622) thereof, a transparency-approximation-method-identification process 1700 is used to identify a method of approximating the transparency pixel element α when approximating the high-definition image 12 prior to receiving the complete set of extra-data images ED for the Y, Z and α pixel components. More particularly, in step (1702), the transparency component α of the base image $IMG_α^{P,P}$ is scaled or interpolated from that of the base image $IMG_\alpha^{P,P}$ to generate a scaled/interpolated image $IMG_{\alpha\_Interp}$ containing the same number of pixels—i.e. N×M—as the high-definition image 12, and in one-to-one correspondence therewith. Then, in step (1704), referring to FIG. 21, an X-approximate image $IMG_\alpha(X)'^{0,0}$ is generated by an X-approximate image reconstruction process 2100, which is the same as the image reconstruction process 1500 illustrated in FIG. 15, except that only the X-image component is used from the extra-data images $ED_X^{P,P}$, $ED_X^{P,P-1}$, ..., $ED_X^{2,2}$, $ED_X^{2,1}$, $ED_X^{1,1}$, $ED_X^{1,0}$ to reconstruct the transparency pixel element $\alpha$ from the base image $IMG_\alpha^{P,P}$ and each of the associated intermediate images $IMG_\alpha^{P,P-1}$, ..., $IMG_\alpha^{2,2}$, $IMG_\alpha^{2,1}$, $IMG_\alpha^{1,1}$, $IMG_\alpha^{1,0}$. Then, in step (1706), the sum-of-squared difference $SSD_{\alpha\_Interp}$ between the transparency $\alpha$ of the lossless reconstruction 12', $IMG_{\alpha'}^{0,0}$ and the scaled/interpolated image $IMG_{\alpha\_Interp}$ is calculated, as is the sum-of-squared difference $SSD_X$ between the transparency $\alpha$ of the lossless reconstruction 12', $IMG_{\alpha'}^{0,0}$ and the X-approximate image $IMG_\alpha(X)'^{0,0}$. If, in step (1708), the sum-of-squared difference $SSD_X$ based on the X-approximate image $IMG_\alpha(X)'^{0,0}$ is less than the sum-of-squared difference $SSD_{\alpha\_Interp}$ based on the scaled/interpolated image $IMG_{\alpha\_Interp}$, then, in step (1710), a parameter $\beta$ is set to cause the extra-data images $ED_X^{P,P}$, $ED_X^{P,P-1}$, ..., $ED_X^{2,2}$, $ED_X^{2,1}$, $ED_X^{1,1}$, $ED_X^{1,0}$ to be used to reconstruct approximate images of the transparency pixel elements $\alpha$ when the associated extra-data images $ED_\alpha^{P,P}$, $ED_\alpha^{P,P-1}$, ..., $ED_\alpha^{2,2}$, $ED_\alpha^{2,1}$, $ED_\alpha^{1,1}$, $ED_\alpha^{1,0}$ are not available for an associated lossless reconstruction. Otherwise, from step (1708), in step (1712), the parameter $\beta$ is set so as to cause the associated transparency pixel elements $\alpha$ to be scaled or interpolated when the associated extra-data images $ED_\alpha^{P,P}$, $ED_\alpha^{P,P-1}$, ..., $ED_\alpha^{2,2}$, $ED_\alpha^{2,1}$, $ED_\alpha^{1,1}$, $ED_\alpha^{1,0}$ are not available for an associated lossless reconstruction. Following steps (1712) or (1710), in step (1714), the parameter $\beta$ is stored for future use. The resulting associated approximate extra-data transparency images $ED_\beta^{P,P}$, $ED_\beta^{P,P-1}$, ..., $ED_\beta^{2,2}$, $ED_\beta^{2,1}$, $ED_\beta^{1,1}$, $ED_\beta^{1,0}$—whether approximated as the extra-data images $ED_X^{P,P}$, $ED_X^{P,P-1}$, ..., $ED_X^{2,2}$, $ED_X^{2,1}$, $ED_X^{1,1}$, $ED_X^{1,0}$; or scaled or interpolated from the base transparency image $IMG_\alpha^{P,P}$—are then used as described hereinbelow during the associated below-described reconstruction process.

Figure 22:
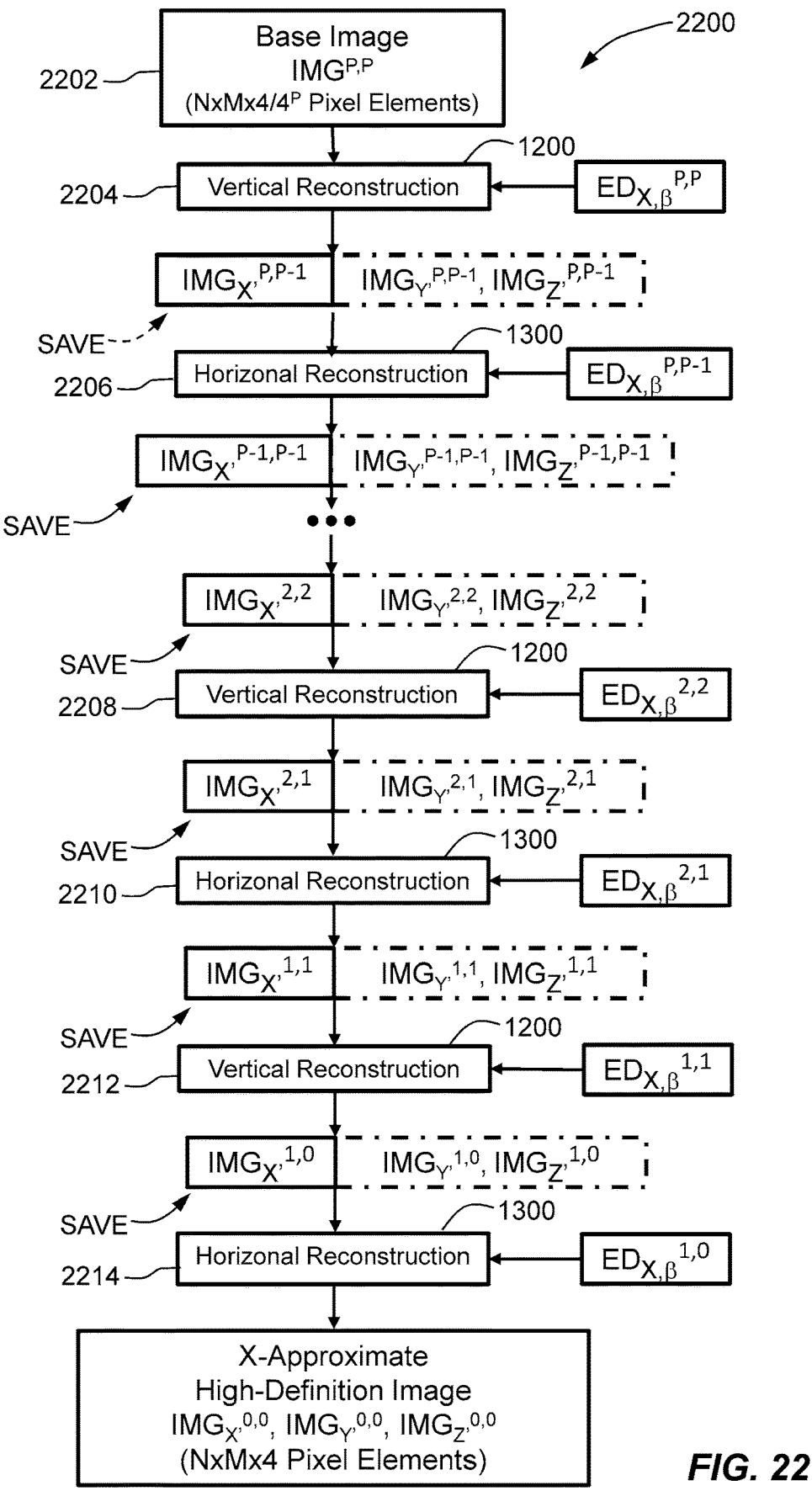
FIG. 22 illustrates a process—associated with the download and display of high-definition images in accordance with the image processing system illustrated in FIG. 1—for approximately reconstructing a high-definition image from a compacted image that was compacted in accordance with the process illustrated in FIG. 2, wherein the approximate reconstruction is in accordance with successive applications of the vertical and horizontal reconstruction processes illustrated in FIGS. 12a-12c and 13a-13c, respectively, but using only corresponding extra-data associated with the lead-primary-color extra-data pixel element data that had been identified by the process illustrated in FIG. 16, and using the method for approximately reconstructing transparency pixel elements that had been identified by the process illustrated in FIG. 17.

Referring to FIGS. 22-28, following the identification by the lead-primary-color identification process 1600 of the lead-primary-color pixel component X, and the identification by the transparency-approximation-method-identification process 1700 of the method of approximating the transparency pixel element $\alpha$, the losslessly-reconstructable set of image components 16 can be transmitted—in order of reconstruction—from the internet server 18 to the internet client 20 upon demand by the internet-connected device 28 under control of the user 22, and subsequently progressively displayed on the display 26 of the internet-connected device 28 as the various losslessly-reconstructable set of image components 16 are received. Referring to FIG. 22, in accordance with a first approximate image reconstruction process 2200, after initially receiving and displaying the base image $IMG^{P,P}$ in step (2202), following receipt of each extra-data images $ED_X^{P,P}$, $ED_X^{P,P-1}$, ..., $ED_X^{2,2}$, $ED_X^{2,1}$, $ED_X^{1,1}$, $ED_X^{1,0}$ for the lead-primary-color pixel component X, an X-approximate high-definition image ($IMG_{X'}^{0,0}$, $IMG_{Y'}^{0,0}$, $IMG_{Z'}^{0,0}$) is generated for each of the primary-color pixel components R, G, B, and for the transparency component $\alpha$, using the lead-primary-color pixel component X of the corresponding extra-data images $ED_X^{P,P}$, $ED_X^{P,P-1}$, ..., $ED_X^{2,2}$, $ED_X^{2,1}$, $ED_X^{1,1}$, $ED_X^{1,0}$ alone to progressively reconstruct the corresponding primary-color images ($IMG_{X'}^{P,P-1}$, $IMG_{Y'}^{P,P-1}$, $IMG_{Z'}^{P,P-1}$), ..., ($IMG_{X'}^{2,2}$, $IMG_{Y'}^{2,2}$, $IMG_{Z'}^{2,2}$), ($IMG_{X'}^{2,1}$, $IMG_{Y'}^{2,1}$, $IMG_{Z'}^{2,1}$), ($IMG_{X'}^{1,1}$, $IMG_{Y'}^{1,1}$, $IMG_{Z'}^{1,1}$), ($IMG_{X'}^{1,0}$, $IMG_{Y'}^{1,0}$, $IMG_{Z'}^{1,0}$), and ($IMG_{X'}^{0,0}$, $IMG_{Y'}^{0,0}$, $IMG_{Z'}^{0,0}$), and to reconstruct the transparency component $\alpha$—i.e. the approximate extra-data transparency images $ED_\beta^{P,P}$, $ED_\beta^{P,P-1}$, ..., $ED_\beta^{2,2}$, $ED_\beta^{2,1}$, $ED_\beta^{1,1}$, $ED_\beta^{1,0}$—in accordance with the transparency-approximation method identified by parameter $\beta$, wherein the resulting primary-color images $IMG_{X'}^{P,P-1}$, ..., $IMG_{X'}^{2,2}$, $IMG_{X'}^{2,1}$, $IMG_{X'}^{1,1}$, $IMG_{X'}^{1,0}$, $IMG_{X'}^{0,0}$ associated with the lead-primary-color pixel component X—having been losslessly reconstructed except for the effect of differences between the approximate extra-data transparency images $ED_\beta^{P,P}$, $ED_\beta^{P,P-1}$, ..., $ED_\beta^{2,2}$, $ED_\beta^{2,1}$, $ED_\beta^{1,1}$, $ED_\beta^{1,0}$ and the corresponding actual extra-data transparency images $ED_\alpha^{P,P}$, $ED_\alpha^{P,P-1}$, ..., $ED_\alpha^{2,2}$, $ED_\alpha^{2,1}$, $ED_\alpha^{1,1}$, $ED_\alpha^{1,0}$—are saved for subsequent image reconstruction. More particularly, in step (2204), the lossless vertical reconstruction process 1200 is applied to the base image $IMG^{P,P}$ to generate a first X-approximate intermediate reconstructed image ($IMG_{X'}^{P,P-1}$, $IMG_{Y'}^{P,P-1}$, $IMG_{Z'}^{P,P-1}$) using the corresponding associated approximate extra-data transparency image $ED_\beta^{P,P}$. If the actual extra-data transparency images $ED_\alpha^{P,P}$, $ED_\alpha^{P,P-1}$, ..., $ED_{\alpha 292}$, $ED_\alpha^{2,1}$, $ED_\alpha^{1,1}$, $ED_\alpha^{1,0}$ will not later be available during the subsequent reconstruction processes 2300-2800, then the X-component of the first X-approximate intermediate reconstructed image $IMG_{X'}^{P,P-1}$—which need not be further refined to account for the effect of transparency $\alpha$—is saved for later use in the second approximate image reconstruction process 2300 described hereinbelow. Then, in step (2206), the lossless horizontal reconstruction process 1300 is applied to the first X-approximate intermediate reconstructed image ($IMG_{X'}^{P,P-1}$, $IMG_{Y'}^{P,P-1}$, $IMG_{Z'}^{P,P}$) to generate a second X-proximate a intermediate reconstructed image ($IMG_{X'}^{P-1,P-1}$, $IMG_{Y'}^{P-1,P-1}$, $IMG_{Z'}^{P-1,P-1}$) using the corresponding associated approximate extra-data transparency image $ED_\beta^{PP1}$, wherein the X-component $IMG_{X'}^{P-1,P-1}$ of the second X-approximate intermediate reconstructed image ($IMG_{X'}^{P-1,P-1}$, $IMG_{Y'}^{P-1,P-1}$, $IMG_{Z'}^{P-1,P-1}$) is saved for later use in the second 2300 and third 2400 approximate image reconstruction processes. The first approximate image reconstruction process 2200 continues with alternate applications of the lossless vertical 1200 and horizontal 1300 reconstruction processes on the most-recently generated X-approximate intermediate reconstructed image ($IMG_{X'}$, $IMG_{Y'}$, $IMG_{Z'}$), for example, ultimately in steps (2208), (2210), (2212) and (2214) acting on corresponding associated X-approximate intermediate reconstructed images ($IMG_{X'}^{2,2}$, $IMG_{Y'}^{2,2}$, $IMG_{Z'}^{2,2}$), ($IMG_{X'}^{2,1}$, $IMG_{Y'}^{2,1}$, $IMG_{Z,2,1}$), ($IMG_{X'}^{1,1}$, $IMG_{Y'}^{1,1}$, $IMG_{Z'}^{1,1}$), ($IMG_{X'}^{1,0}$, $IMG_{Y'}^{1,0}$, $IMG_{Z'}^{1,0}$) using corresponding associated approximate extra-data transparency images $ED_\beta^{2,2}$, $ED_\beta^{2,1}$, $ED_\beta^{1,0}$, $ED_\beta^{1,0}$, so as to provide for ultimately reconstructing the final X-approximate intermediate reconstructed image ($IMG_{X'}^{0,0}$, $IMG_{Y'}^{0,0}$, $IMG_{Z'}^{0,0}$).

Figure 26:
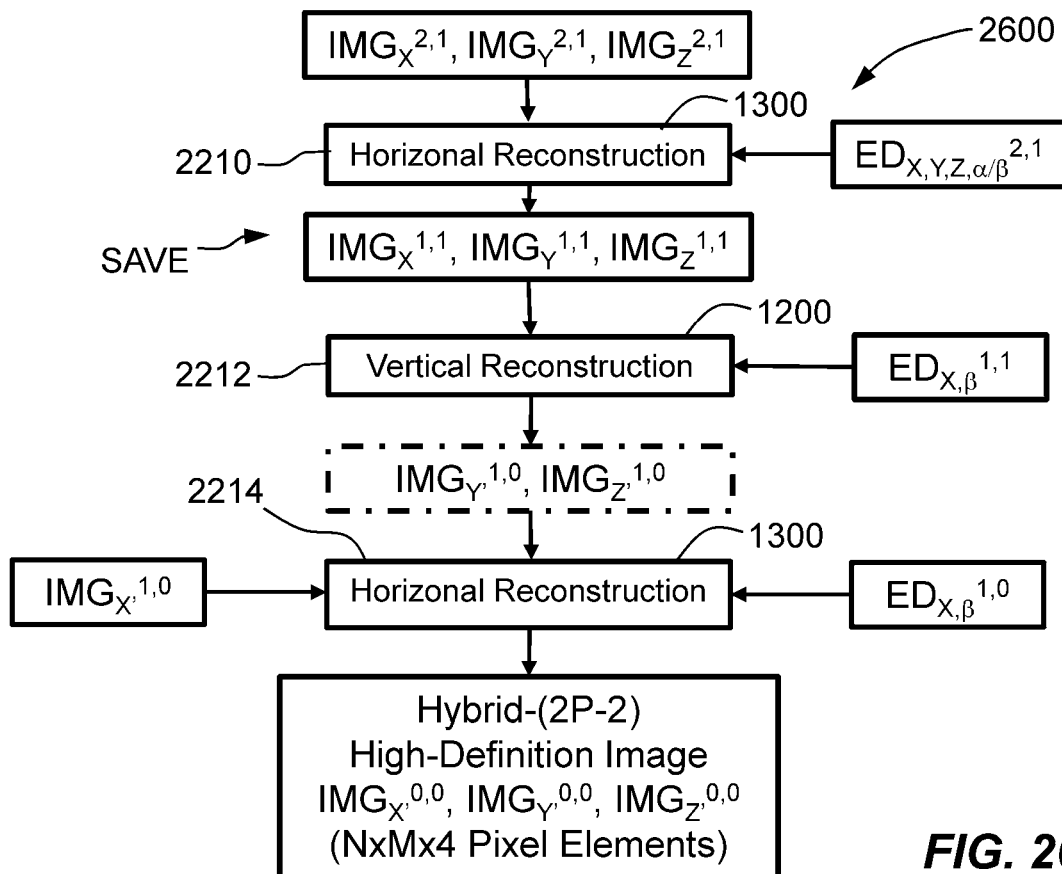
FIG. 26 illustrates a hybrid process—associated with the download and display of high-definition images in accordance with the image processing system illustrated in FIG. 1, following the process illustrated in FIG. 25—comprising a hybrid of the processes illustrated in FIGS. 15 and 25 for approximately reconstructing, but with higher fidelity than from the process illustrated in FIG. 25, a high-definition image from a compacted image that was compacted in accordance with the process illustrated in FIG. 2.
Figure 27:
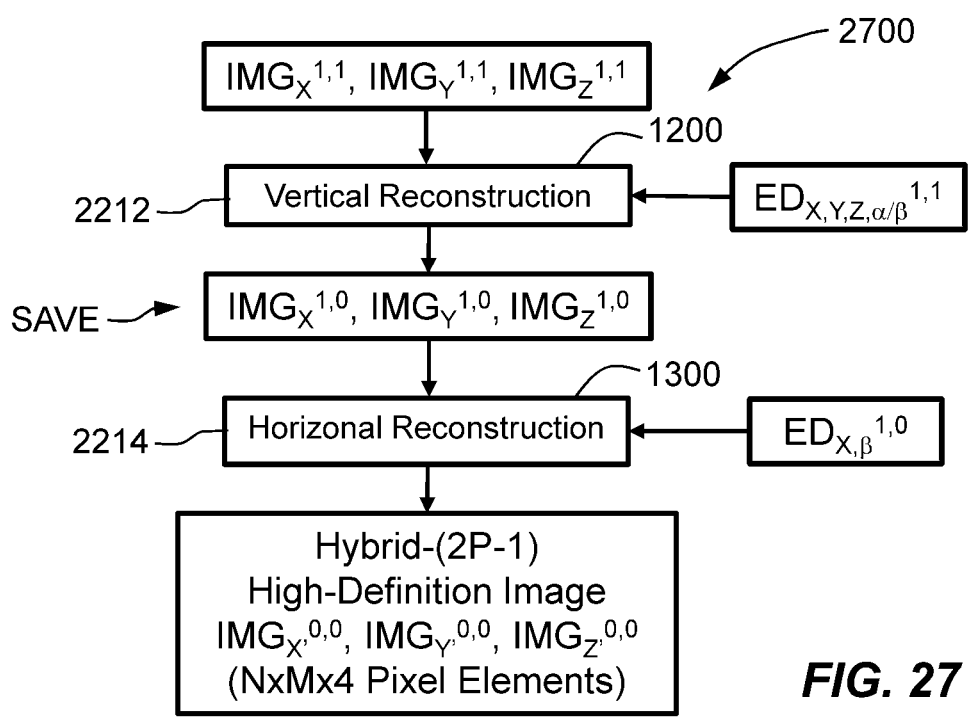
FIG. 27 illustrates a hybrid process—associated with the download and display of high-definition images in accordance with the image processing system illustrated in FIG. 1, following the process illustrated in FIG. 26—comprising a hybrid of the processes illustrated in FIGS. 15 and 26 for approximately reconstructing, but with higher fidelity than from the process illustrated in FIG. 26, a high-definition image from a compacted image that was compacted in accordance with the process illustrated in FIG. 2.
Figure 28:
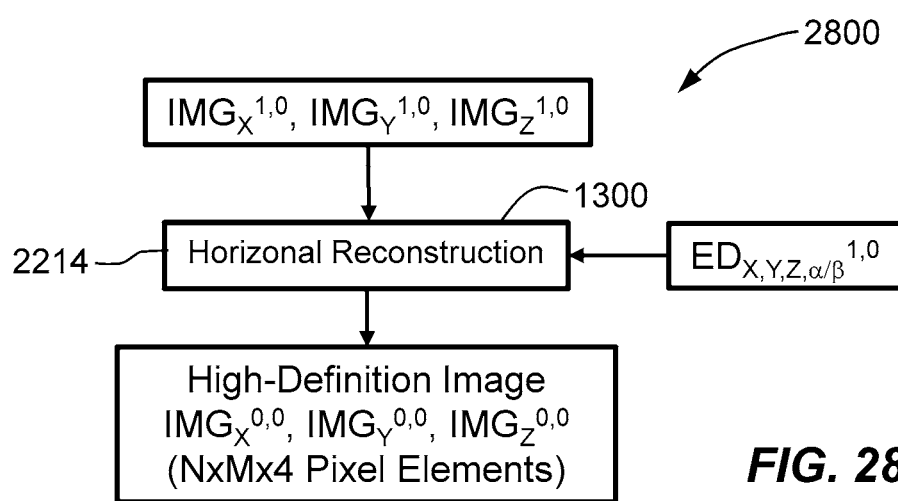
FIG. 28 illustrates a process—associated with the download and display of high-definition images in accordance with the image processing system illustrated in FIG. 1, following the process illustrated in FIG. 27—comprising a hybrid of the processes illustrated in FIGS. 15 and 26 for losslessly reconstructing a high-definition image from a compacted image that was compacted in accordance with the process illustrated in FIG. 2.

Then, referring to FIGS. 23-28, as the subsequent extra-data images $ED_Y^{P,P}$, $ED_Y^{P,P-1}$, ..., $ED_Y^{2,2}$, $ED_Y^{2,1}$, $ED_Y^{1,1}$, $ED_Y^{1,0}$ and $ED_Z^{P,P}$, $ED_Z^{P,P-1}$, ..., $ED_Z^{2,2}$, $ED_Z^{2,1}$, $ED_Z^{1,1}$, $ED_Z^{1,0}$ are received for the remaining primary-color pixel components Y,Z, and if the extra-data images $ED_\alpha^{P,P}$, $ED_\alpha^{P,P-1}$, ..., $ED_\alpha^{2,2}$, $ED_\alpha^{2,1}$, $ED_\alpha^{1,1}$, $ED_\alpha^{1,0}$ are received for the transparency component $\alpha$, then the remaining transparency image components ($IMG_\alpha^{P,P-1}$, $IMG_Y^{P,P-1}$, $IMG_Z^{P,P-1}$), ..., ($IMG_\alpha^{2,2}$, $IMG_Y^{2,2}$, $IMG_Z^{2,2}$), ($IMG_\alpha^{2,1}$, $IMG_Y^{2,1}$, $IMG_Z^{2,1}$) ($IMG_\alpha^{1,1}$, $IMG_Y^{1,1}$, $IMG_Z^{1,1}$), ($IMG_\alpha^{1,0}$, $IMG_Y^{1,0}$, $IMG_Z^{1,0}$), and ($IMG_\alpha^{0,0}$, $IMG_{Y'}^{0,0}$, $IMG_{Z'}^{0,0}$) are progressively replaced with corresponding losslessly-reconstructed image components and saved as needed for continual improvement of the reconstructed image, until, as illustrated in FIG. 28, the lossless reconstruction 12', $IMG'^{0,0}$ is ultimately generated and displayed. If the transparency image components ($IMG_\alpha^{P,P}$, $IMG_Y^{P,P}$, $IMG_Z^{P,P}$), ($IMG_\alpha^{P,P-1}$, $IMG_Y^{P,P-1}$, $IMG_Z^{P,P-1}$), . . . , ($IMG_\alpha^{2,2}$, $IMG_Y^{2,2}$, $IMG_Z^{2,2}$), ($IMG_\alpha^{2,1}$, $IMG_Y^{2,1}$, $IMG_Z^{2,1}$), ($IMG_\alpha^{1,1}$, $IMG_Y^{1,1}$, $IMG_Z^{1,1}$), ($IMG_\alpha^{1,0}$, $IMG_Y^{1,0}$, $IMG_Z^{1,0}$), and ($IMG_\alpha^{0,0}$, $IMG_Y^{0,0}$, $IMG_Z^{0,0}$) are available to replace the approximate extra-data transparency images $ED_\beta^{P,P}$, $ED_\beta^{P,P-1}$, . . . , $ED_\beta^{2,2}$, $ED_\beta^{2,1}$, $ED_\beta^{1,1}$, $ED_\beta^{1,0}$, then the X-components of the primary-color intermediate images ($IMG_{X'}^{P,P-1}$), . . . , ($IMG_{X'}^{2,2}$), ($IMG_{X'}^{2,1}$), ($IMG_{X'}^{1,1}$), ($IMG_{X'}^{1,0}$) will need to be regenerated, because the transparency component $\alpha$ affects each of the primary-color pixel components R, G, B.

Figure 23:
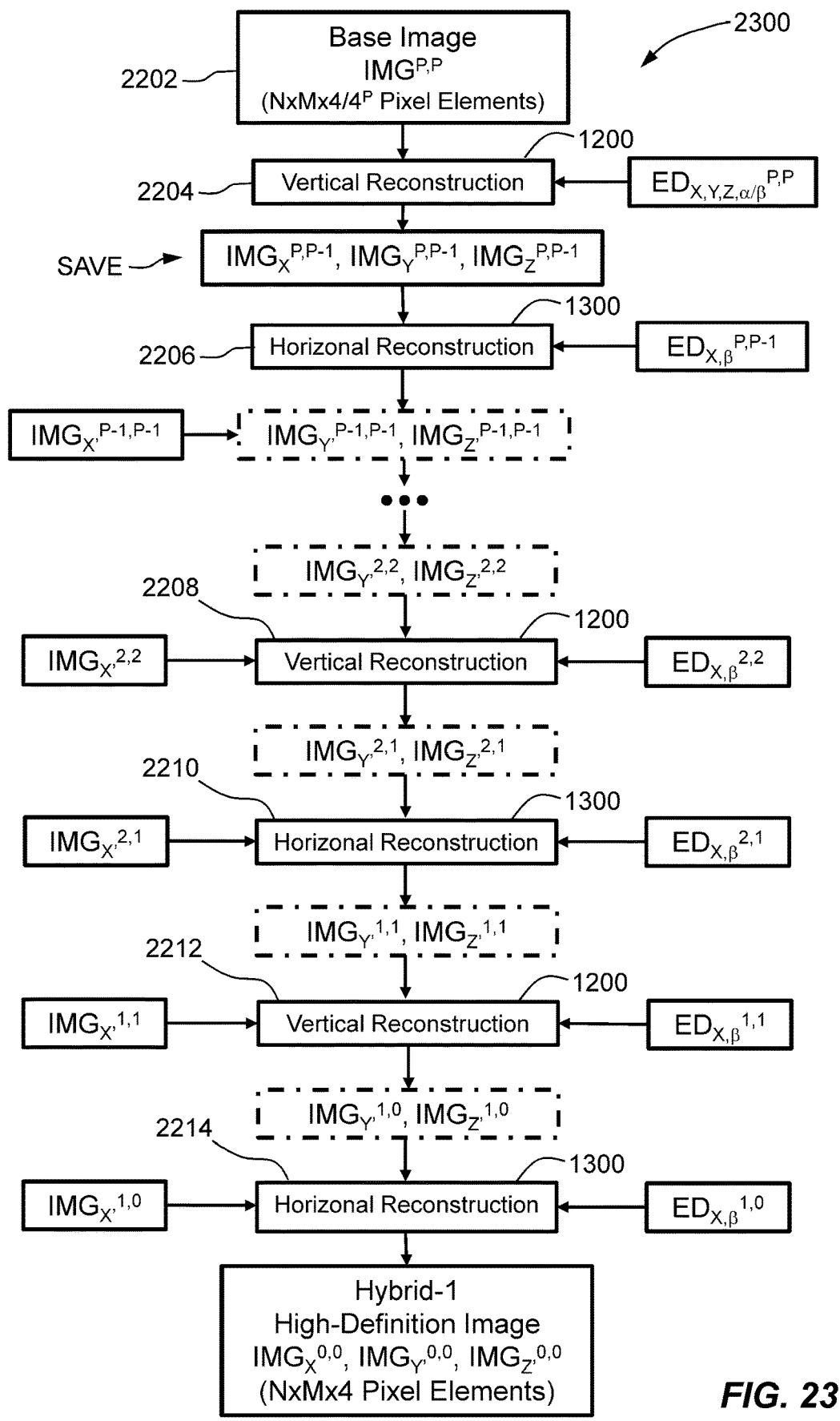
FIG. 23 illustrates a hybrid process—associated with the download and display of high-definition images in accordance with the image processing system illustrated in FIG. 1, following the process illustrated in FIG. 22—comprising a hybrid of the processes illustrated in FIGS. 15 and 22 for approximately reconstructing, but with higher fidelity than from the process illustrated in FIG. 22, a high-definition image from a compacted image that was compacted in accordance with the process illustrated in FIG. 2.

More particularly, following reconstruction of the X-approximate high-definition image ($IMG_X^{0,0}$, $IMG_{Y'}^{0,0}$, $IMG_{Z'}^{0,0}$),—and if the transparency image components ($IMG_\alpha^{P,P}$, $IMG_Y^{P,P}$, $IMG_Z^{P,P}$), ($IMG_\alpha^{P,P-1}$, $IMG_Y^{P,P-1}$, $IMG_Z^{P,P-1}$), . . . , ($IMG_\alpha^{2,2}$, $IMG_Y^{2,2}$, $IMG_Z^{2,2}$), ($IMG_\alpha^{2,1}$, $IMG_Y^{2,1}$, $IMG_Z^{2,1}$), ($IMG_\alpha^{1,1}$, $IMG_Y^{1,1}$, $IMG_Z^{1,1}$), ($IMG_\alpha^{1,0}$, $IMG_Y^{1,0}$, $IMG_Z^{1,0}$), and ($IMG_\alpha^{0,0}$, $IMG_Y^{0,0}$, $IMG_Z^{0,0}$) are not available, the exact reconstruction of the X-component $IMG_X^{0,0}$ of the high-definition image 12,—at the end of the first approximate reconstruction process 2200, referring to FIG. 23, in accordance with a second approximate image reconstruction process 2300, following receipt of the extra-data images $ED_Y^{P,P}$, $ED_Z^{P,P}$, and, if available, extra-data transparency image $ED_\alpha^{P,P}$, the image components $IMG_Y^{P,P-1}$, $IMG_Z^{P,P-1}$—and image component $IMG_X^{P,P-1}$ if the transparency image component $IMG_\alpha^{P,P}$ is available—are reconstructed exactly from the base image $IMG^{P,P}$ by the lossless vertical reconstruction process 1200, using the corresponding associated extra-data images $ED_Y^{P,P}$, $ED_Z^{P,P}$ $ED_{\alpha/\beta}^{P,P}$, after which the exactly-reconstructed image components $IMG_Y^{P,P-1}$, $IMG_Z^{P,P-1}$ are saved. Then, the remaining steps of the second approximate image reconstruction process 2300—the same as for the first approximate image reconstruction process 2200—are applied to the reconstruction of the remaining approximate image components $IMG_{Y'}^{k,l}$, $IMG_{Z'}^{k,l}$ for primary color components Y and Z. If the first transparency image component $IMG_\alpha^{P,P}$ is available, then, in step (2204), then the X-component $IMG_X^{P,P-1}$ of the associated intermediate image is regenerated responsive thereto.

Figure 24:
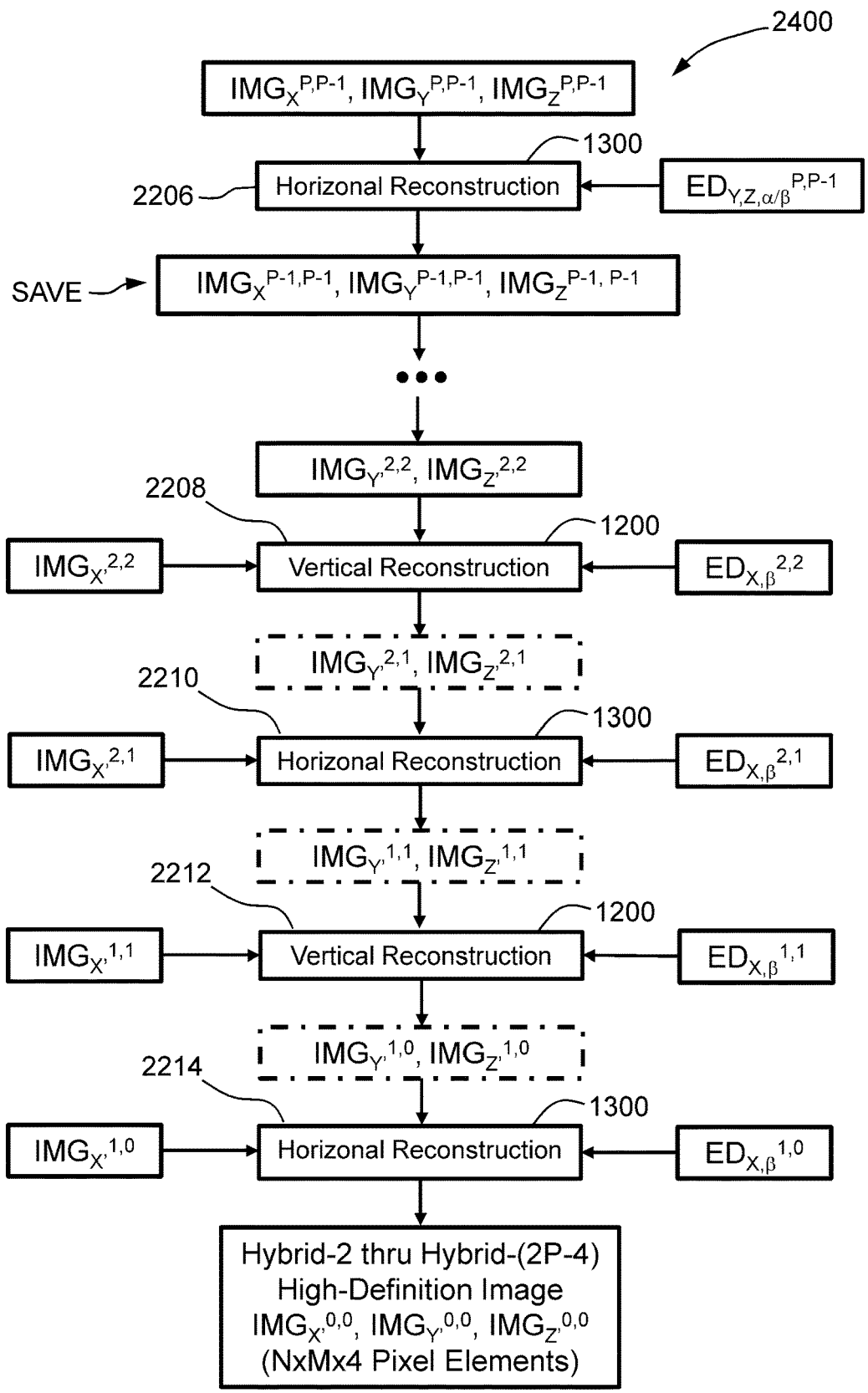
FIG. 24 illustrates a hybrid process—associated with the download and display of high-definition images in accordance with the image processing system illustrated in FIG. 1, following the process illustrated in FIG. 23—comprising a hybrid of the processes illustrated in FIGS. 15 and 23 for approximately reconstructing, but with higher fidelity than from the process illustrated in FIG. 23, a high-definition image from a compacted image that was compacted in accordance with the process illustrated in FIG. 2.

Following reconstruction of the X-approximate high-definition image ($IMG_X^{0,0}$, $IMG_{Y'}^{0,0}$, $IMG_{Z'}^{0,0}$) by the second approximate image reconstruction process 2300, referring to FIG. 24, in accordance with a third approximate image reconstruction process 2400, following receipt of the next set of remaining extra-data images $ED_Y^{P,P-1}$, $ED_Z^{P,P-2}$, and, if available, extra-data transparency image $ED_\alpha^{P,P-1}$, the image components $IMG_Y^{P-1,P-1}$, $IMG_Z^{P-1,P-1}$—and image component $IMG_X^{P-1,P-1}$ if the transparency image component $IMG_\alpha^{P,P-1}$ is available—are reconstructed exactly from the image components $IMG_Y^{P,P-1}$, $IMG_Z^{P,P-1}$ saved from the second approximate image reconstruction process 2300, by the lossless horizontal reconstruction process 1300 using the corresponding associated extra-data images $ED_Y^{P,P-1}$, $ED_Z^{P,P-2}$ $ED_{\alpha/\beta}^{P,P-1}$, after which the exactly-reconstructed image components $IMG_Y^{P-1,P-1}$, $IMG_Z^{P-1,P-1}$ are saved. Then, the remaining steps of the second approximate image reconstruction process 2300—the same as for the first 2200 and second 2300 approximate image reconstruction processes—are applied to the reconstruction of the remaining approximate image components $IMG_{Y'}^{k,l}$, $IMG_{Z'}^{k,l}$ for primary color components Y and Z. If the second transparency image component $IMG_\alpha^{P,P-1}$ is available, then, in step (2206), then the X-component $IMG_X^{P-1,P-1}$ of the associated intermediate image is regenerated responsive thereto.

The processes of vertical and horizontal reconstruction are successively repeated,—in each case with receipt of the next set of remaining extra-data images $ED_Y^{k,l}$, $ED_Z^{k,l}$ $ED_\alpha^{k,l}$, followed by reconstruction commencing with the highest-resolution previously-saved exactly-reconstructed image components $IMG_Y^{k,l}$, $IMG_Z^{k,l}$ for primary color components Y and Z,—so as to provide for exact reconstruction of the next image components $IMG_Y^{k+1,l}$, $IMG_Z^{k+1,l}$ or $IMG_Y^{k,l+1}$, $IMG_Z^{k,l+1}$.

Figure 25:
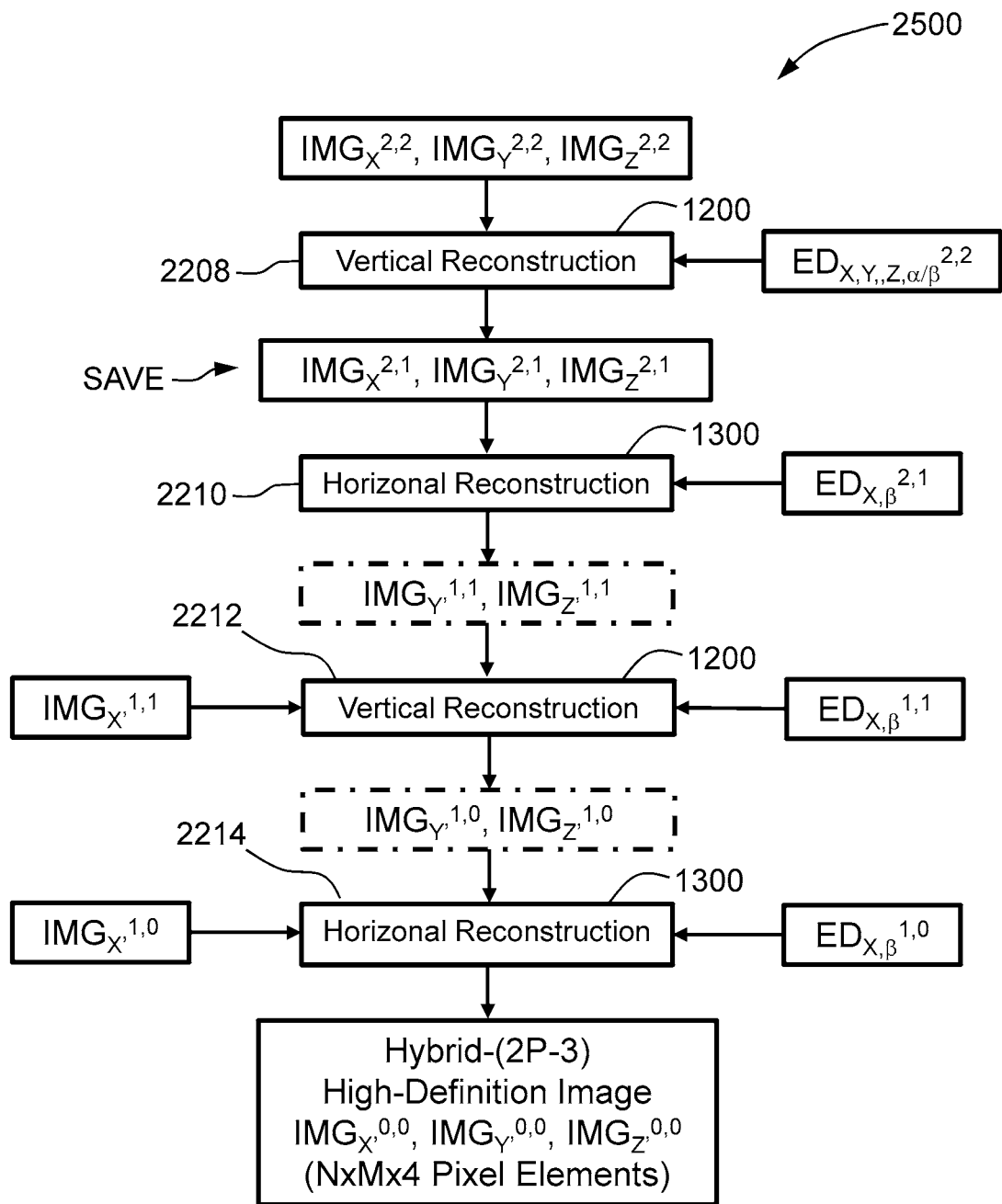
FIG. 25 illustrates a hybrid process—associated with the download and display of high-definition images in accordance with the image processing system illustrated in FIG. 1, following the process illustrated in FIG. 24—comprising a hybrid of the processes illustrated in FIGS. 15 and 24 for approximately reconstructing, but with higher fidelity than from the process illustrated in FIG. 24, a high-definition image from a compacted image that was compacted in accordance with the process illustrated in FIG. 2.

Eventually, referring to FIG. 25, in accordance with a fourth approximate image reconstruction process 2500, following receipt of the third next-to-last set of remaining extra-data images $ED_Y^{2,2}$, $ED_Z^{2,2}$ $ED_{\alpha/\beta}^{2,2}$, the image components $IMG_Y^{2,1}$, $IMG_Z^{2,1}$ are reconstructed exactly by vertical reconstruction from the image components $IMG_Y^{2,2}$, $IMG_Z^{2,2}$ saved from the most-recent horizontal reconstruction, using the corresponding associated extra-data images $ED_Y^{2,2}$, $ED_Z^{2,2}$ $ED_{\alpha/\beta}^{2,2}$, after which the exactly-reconstructed image components $IMG_Y^{2,1}$, $IMG_Z^{2,1}$ are saved. Then, the remaining steps of the fourth approximate image reconstruction process 2500—the same as for the previous approximate image reconstruction processes 2200, 2300, 2400—are applied to the reconstruction of the remaining approximate image components $IMG_{Y'}^{k,l}$, $IMG_{Z'}^{k,l}$ for primary color components Y and Z. If the associated transparency image component $IMG_{4\alpha}^{2,2}$ is available, then, in step (2208), then the corresponding X-component $IMG_X^{2,1}$ of the associated intermediate image is regenerated responsive thereto.

Then, referring to FIG. 26, in accordance with a fifth approximate image reconstruction process 2600, following receipt of the second next-to-last set of remaining extra-data images $ED_Y^{2,1}$, $ED_Z^{2,1}$ $EDW_{\alpha/\beta}^{2,1}$, the image components $IMG_Y^{1,1}$, $IMG_Z^{1,1}$ are reconstructed exactly by horizontal reconstruction from the image components $IMG_Y^{2,1}$, $IMG_Z^{2,1}$ saved from the fourth approximate image reconstruction process 2500, using the corresponding associated extra-data images $ED_Y^{2,1}$, $ED_Z^{2,1}$, $ED_{\alpha/\beta}^{2,1}$, after which the exactly-reconstructed image components $IMG_Y^{1,1}$, $IMG_Z^{1,1}$ are saved. Then, the remaining steps of the fifth approximate image reconstruction process 2600—the same as for the previous approximate image reconstruction processes 2200, 2300, 2400, 2500—are applied to the reconstruction of the remaining approximate image components $IMG_{Y'}^{k,l}$, $IMG_{Z'}^{k,l}$ for primary color components Y and Z. If the associated transparency image component $IMG_\alpha^{2,1}$ is available, then, in step (2210), then the corresponding X-component $IMG_X^{1,1}$ of the associated intermediate image is regenerated responsive thereto.

Then, referring to FIG. 27, in accordance with a sixth approximate image reconstruction process 2700, following receipt of the next-to-last set of remaining extra-data images $ED_Y^{1,1}$, $ED_Z^{1,1}$ $ED_{\alpha/\beta}^{1,1}$, the image components $IMG_Y^{1,0}$, $IMG_Z^{1,0}$ are reconstructed exactly by vertical reconstruction from the image components $IMG_Y^{1,1}$, $IMG_Z^{1,1}$ saved from the fifth approximate image reconstruction process 2600, using the corresponding associated extra-data images $ED_Y^{1,1}$, $ED_Z^{1,1}$ $ED_{\alpha/\beta}^{1,1}$, after which the exactly-reconstructed image components $IMG_Y^{1,0}$, $IMG_Z^{1,0}$ are saved. Then, the remaining step of the sixth approximate image reconstruction process 2700—the same as for the previous approximate image reconstruction processes 2200, 2300, 2400, 2500, 2600—is applied to the reconstruction of the remaining approximate image component $IMG_Y^{0,0}$, $IMG_Z^{0,0}$ for primary color components Y and Z. If the associated transparency image component $IMG_\alpha^{1,1}$ is available, then, in step (2212), then the corresponding X-component $IMG_X^{1,0}$ of the associated intermediate image is regenerated responsive thereto.

Finally, referring to FIG. 28, in accordance with a final image reconstruction process 2800, following receipt of the last set of remaining extra-data images $ED_Y^{1,0}$, $ED_Z^{1,0}$ $ED_{\alpha/\beta}^{1,0}$, the remaining final reconstructed high-definition image components $IMG_Y^{0,0}$, $IMG_Z^{0,0}$ are reconstructed exactly by horizontal reconstruction from the image components $IMG_Y^{1,0}$, $IMG_Z^{1,0}$ saved from the sixth approximate image reconstruction process 2700, using the corresponding associated extra-data images $ED_Y^{1,0}$, $ED_Z^{1,0}$ $ED_{\alpha/\beta}^{1,0}$, after which the exactly-reconstructed image components $IMG_Y^{0,0}$, $IMG_Z^{0,0}$ are displayed or saved. If the associated transparency image component $IMG_\alpha^{1,0}$ is available, then, in step (2214), the corresponding X-component $IMG_X^{0,0}$ of the associated high-definition image is regenerated responsive thereto.

It should be understood that the number of iterations of associated lossless vertical 1200 and horizontal 1300 reconstruction processes within the approximate image reconstruction processes 2200, 2300, 2400, 2500, 2600, 2700, 2800—i.e. the number of progressions in the associated progressive image—is not limiting, and that each of the associated reconstructed intermediate images need not necessarily be displayed on the display 26, but one or more of the intermediate images could instead be saved in memory for future display or processing. Furthermore, the associated storage of one or more associated intermediate images may be transitory, for example, only for a sufficiently long duration to enable a subsequent reconstruction of an associated relatively higher resolution image component. For example, one or more of the relatively-lowest resolution intermediate images might not be displayed, but could be used to reconstruct associated one or more relatively-higher resolution images, one or more of which are displayed. Intermediate images that are not needed—after the display thereof is refreshed with the display of a different image—for subsequently reconstructing a relatively-higher resolution image, need not be saved.

Figure 29:
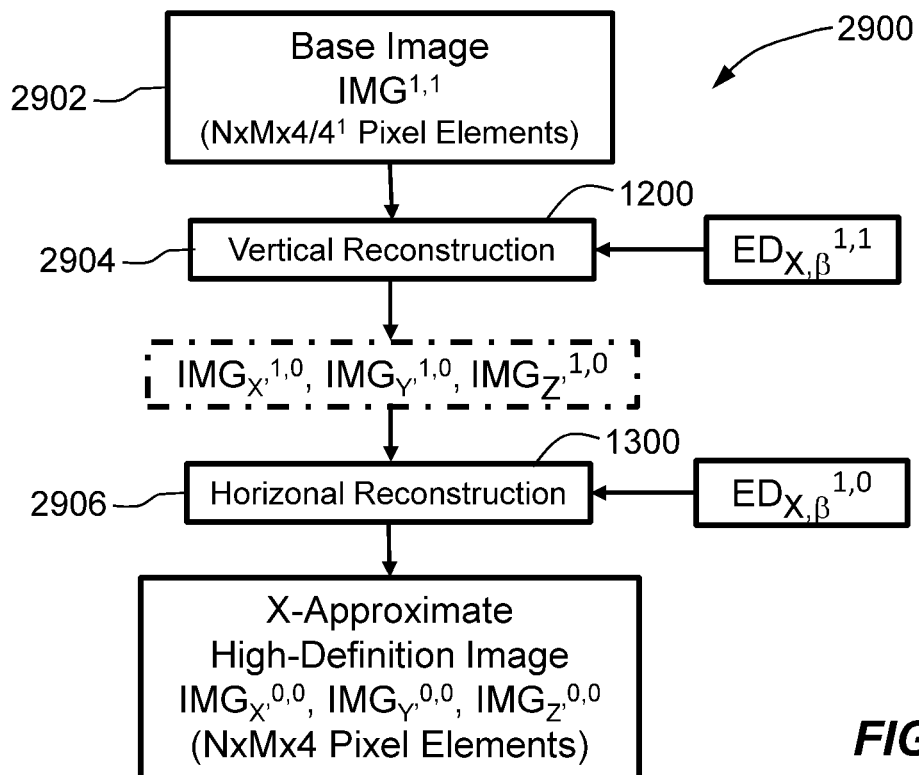
FIG. 29 illustrates the process of FIG. 22 as applied to the reconstruction of a high-definition image from a compacted image involving only a single level of horizontal and vertical compaction.

For example, referring to FIG. 29, a single-level X-approximate image reconstruction process 2900 commences in step (2902) with receipt of an associated base image $IMG^{1,1}$. Then, in step (2904), following receipt of an associated first lead-primary-color component extra-data image $ED_X^{1,1}$ and an associated approximate extra-data transparency image $ED_\beta^{1,1}$, the base image $IMG^{1,1}$ is transformed to a corresponding first X-approximate intermediate image $\{IMG_{X'}^{1,0}, IMG_{Y'}^{1,0}, IMG_{Z'}^{1,0}\}$ by application of the associated lossless vertical reconstruction process 1200. Then, in step (2906), following receipt of an associated second lead-primary-color component extra-data image $ED_X^{1,0}$, and an associated approximate extra-data transparency image $ED_\beta^{1,0}$, the first X-approximate intermediate image $\{IMG_{X'}^{1,0}, IMG_{Y'}^{1,0}, IMG_{Z'}^{1,0}\}$ is transformed to the resulting X-approximate high-definition image $\{IMG_{X'}^{0,0}, IMG_{Y'}^{0,0}, IMG_{Z'}^{0,0}\}$ by application of the associated lossless horizontal reconstruction process 1300.

Figure 30:
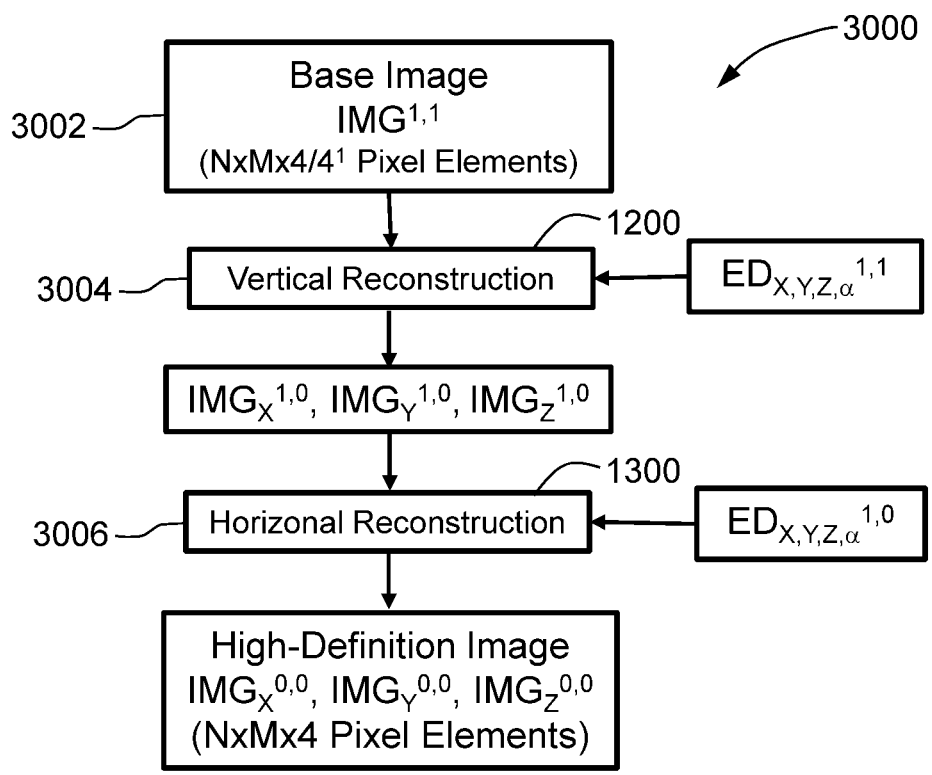
FIG. 30 illustrates a combination of the processes of FIGS. 27 and 28 as applied to the reconstruction of a high-definition image from a compacted image involving only a single level of horizontal and vertical compaction, which provides for a substantially lossless reconstruction of the high-definition image.
Figure 31:
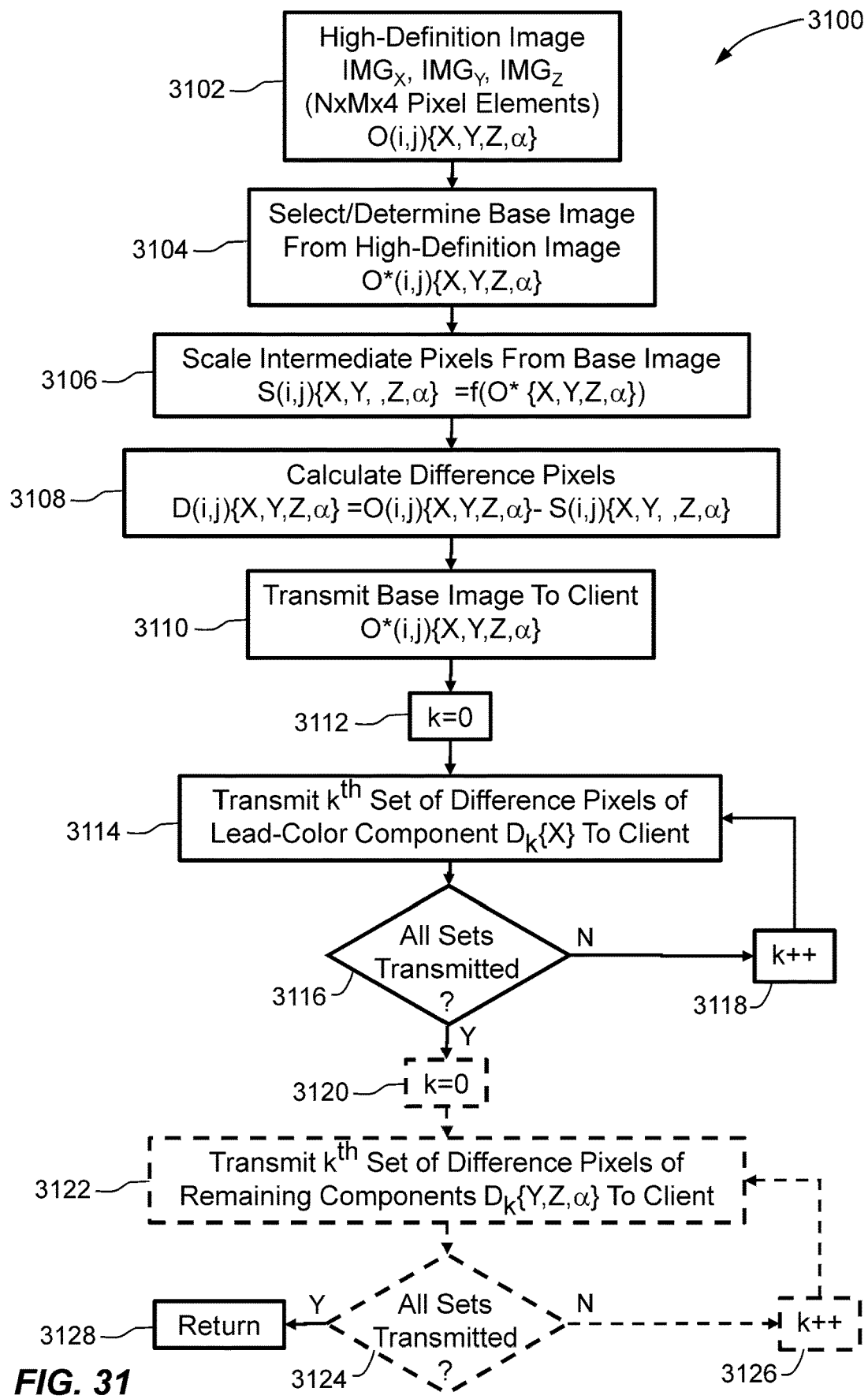
FIG. 31 illustrates an alternative progressive image generation process that provides for generating a base image and a series of difference images from a high-definition image, and that provides for transmitting those images to a client, wherein the difference images are relative to a scaled version of the base image, and the difference images include at least difference images associated with an associated lead-primary-color component.

Then, referring to FIG. 30, a single-level high-definition image reconstruction process 3000 commences in step (3002) with receipt of the associated base image $IMG^{1,1}$—the same as received in step (2902) and used in the single-level X-approximate image reconstruction process 2900. Then, in step (3004), following receipt of the associated first set of extra-data images $ED_X^{1,1}$, $ED_Y^{1,1}$, $ED_Z^{1,1}$, $ED_\alpha^{1,1}$ for each of the primary-color pixel components X, Y, Z and for the transparency component $\alpha$ (i.e. the remaining extra-data images $ED_Y^{1,1}$, $ED_Z^{1,1}$, $ED_\alpha^{1,1}$ that had not already been received), the base image $IMG^{1,1}$ is transformed to a corresponding first intermediate image $\{IMG_X^{1,0}, IMG_Y^{1,0}, IMG_Z^{1,0}\}$ by application of an associated lossless vertical reconstruction process 1200. Then, in step (3006), following receipt of an associated second set of extra-data images $ED_X^{1,0}$, $ED_Y^{1,0}$, $ED_Z^{1,0}$, $ED_\alpha^{1,0}$ for each of the primary-color pixel components X, Y, Z and for the transparency component $\alpha$ (i.e. the remaining extra-data images $ED_Y^{1,0}$, $ED_Z^{1,0}$, $ED_\alpha^{1,0}$ that had not already been received), the first intermediate image $\{IMG_X^{1,0}, IMG_Y^{1,0}, IMG_Z^{1,0}\}$ is transformed to the resulting high-definition image $\{IMG_X^{0,0}, IMG_Y^{0,0}, IMG_Z^{0,0}\}$ by application of the associated lossless horizontal reconstruction process 1300.

It should be understood that the order in which the complete set of losslessly-reconstructed pixel elements R, G, B, $\alpha$ are generated is not limiting. For example, this could be strictly in order of increasing image resolution (i.e. increasing total number of pixels 36); in order of pixel element R, G, B, $\alpha$, for example, completing all resolutions of each primary-color pixel component X, Y, Z before continuing with the next, followed by all resolutions of the transparency component $\alpha$; or a hybrid thereof.

Furthermore, the relative ordering of horizontal and vertical compaction, and resulting vertical and horizontal reconstruction, could be reversed, with the high-definition image 12 being initially vertically compacted rather than initially horizontally compacted.

The image processing system 10 is not limited to the illustrated 2:1 compaction ratio of rows or columns in the source image 40 to corresponding rows or columns in the compacted image. For example, the teachings of the instant application could also be applied in cooperation with the image processing systems disclosed in U.S. Pat. Nos. 8,855,195 and 8,798,136, each of which are incorporated herein by reference, wherein, in summary, an original, high-resolution image is sequentially compacted on a server device through a number of lower resolution levels or representations of the same image to a final low-resolution image, hereinafter referred to as the base image, while with each such compaction to a lower resolution image, extra-data values are also generated and thereafter stored with the base image on the server device so that, when later losslessly sent to a receiving device, the base image and extra-data values can be processed by the receiving device through reconstruction algorithms to losslessly reconstruct each sequentially higher resolution representation and to ultimately restore the original image, subject to minor truncation errors. This previous image transmission algorithm is applied independently to all color channels or components comprising the original high-resolution image such as, for example, primary colors of red, green, blue and as well as an alpha (transparency) component if present, so that the extra-data values are effectively generated and stored on the server device and, upon later demand, sent by the server device to the receiving device as extra-data images comprised of extra-data pixels, each pixel comprised of values for the same number of color components as the original image, and which together with all extra-data images from each level of compaction form a single set of extra-data images supporting the sequential reconstruction by the receiving device of progressively higher resolution images from the base to final image.

As another illustrative example, an original image having resolution of $M_0$ horizontal by $N_0$ vertical pixels—wherein, for convenience, $M_0$ and $N_0$ are evenly divisible by eight, with each image pixel having four color component values including red, green, blue and an alpha or transparency channel, each value having a minimum possible value of 0 and a maximum possible value of 255,—is sequentially compacted on a server device to progressively lower resolutions of half the previous resolution, three times in each direction, first horizontally then vertically each time, resulting in a base image resolution comprised of $M_0/8$ horizontal by $N_0/8$ vertical pixels, and an extra-data image for each of the six total compactions, with each of the base image and the extra-data images comprising pixels having values for all four components, i.e. R, G, B, and α, of the original image. Each such compaction to half resolution in a given direction is accomplished by calculating each Lower Resolution Pixel Value, LRPV, for each component of the lower resolution image as the average value of the corresponding, sequential pair of Higher Resolution Pixel Values, $HRPV_1$ and $HRPV_2$ in the prior higher resolution image that are adjacent in that direction, i.e.:

$$LRPV=(HRPV_1+HRPV_2)/2 \quad (1)$$

Each such operation on $HRPV_1$ and $HRPV_2$ is also accompanied by the calculation of a corresponding Extra-Data Pixel Value EDPV given by:

$$EDPV=(HRPV_1-HRPV_2+255)/2 \quad (2)$$

Therefore with each compaction in each direction of the relatively higher resolution image there is an extra-data pixel value calculated for each lower resolution pixel value calculated. Accordingly, the resolution (i.e. horizontal and vertical pixel count) of each extra-data image formed is equal to the resolution of the lower resolution image formed from the compacted higher resolution image. Such extra-data images can be treated as single images for purposes of storage and later use or they can be combined to abut other extra-data images to form larger extra-data images for additional efficiency, for example, each larger extra-data image including both extra-data images corresponding to the compaction of both directions of each progressively lower image resolution. In any case, all such extra-data images subsequently form a complete set of extra-data values for the receiving device to sequentially and progressively reconstruct from the base image in the reverse order of compaction up through each higher resolution until that of the original image is achieved. In each such reconstruction the corresponding pair of adjacent, higher resolution pixel values, $HRPV_1$ and $HRPV_2$, for each component are determined from each lower resolution pixel value, LRPV, and the corresponding extra-data pixel value, EDPV, through reconstruction derived from the above formulae:

$$HRPV_1=LRPV+EDPV-255/2 \quad (3)$$

$$HRPV_2=LRPV-EDPV+255/2 \quad (4)$$

In this particular example, compaction is shown to reduce every two adjacent pixels of a higher resolution image to one, representing a lower resolution image having half the resolution of the higher resolution image in the direction of compaction. Such formulae can be modified to support a variety of algorithms to achieve a variety of alternative compactions, such as, but not limited to, four pixels to three or three pixels to two, depending on the desired resolution of the relatively lower resolution images.

During compaction from each higher resolution image to the next lower resolution image representation, each pixel value of the extra-data image for each color component is fundamentally derived from the difference of two spatially adjacent pixel values of that color component from the higher resolution image. In many practical imaging applications, especially those involving high-resolution photography, the difference between two spatially adjacent pixel values of one primary color channel is often substantially similar to the difference between those same pixels for the other primary color channels. In fact, when all such extra-data pixel values of all primary colors from typical photographic images are displayed as a full color extra-data image, that image appears substantially like a grayscale image with only sparsely populated pixels of visually obvious non-gray values. For this reason, the color palette of extra-data pixel values necessary to represent the extra-data image typically contains significantly fewer colors than the color palette of the higher resolution image. Since many lossless compression algorithms rely on smaller color palettes for their effectiveness, one advantage of the previously referenced algorithm is that, when losslessly compressed, the total bandwidth required to transmit the lower resolution base image and the set of extra-data images combined is typically less than the bandwidth required to transmit the higher resolution image alone. Assuming the receiving device can rapidly execute the reconstruction algorithm, which is almost universally the case with today's devices due the simplicity of related computational operations, the image processing system 10 supports a significantly faster transmission and presentation of losslessly compressed images.

The image processing system 10 inherently provides multiple, progressively higher resolution representations of the high-resolution image prior to achieving the final original resolution. This allows a server device such as a web server to first send the base image as a relatively very small file followed by each respective extra-data image file so that a receiving and display device such as a web browser can quickly show the base image and then progressively improve the quality of that image through reconstruction as it receives the extra-data image files rather than waiting for a single high-resolution image file before showing it.

In accordance with the image processing system 10, an original image comprising an array of pixel values each having two or more color components is sequentially compacted—for example, on a server device—to one or more progressively lower resolution representations culminating in a lowest resolution base image, each such compaction resulting in an accompanying two dimensional array of extra-data pixels comprising extra-data values for each color component and therefore forming an extra-data image, with all of the extra-data images together forming a complete set of extra-data images, whereby the complete set of extra-data images can be used in a reconstruction process to reconstruct the base image into progressively higher resolution images culminating with the original image.

In accordance with one aspect of the image processing system 10 and an associated set of embodiments, reconstruction is then applied—for example, on the server device—to each of the primary color components of the base image to reconstruct a primary color test image of the same resolution as the original high-resolution image, but using the extra-data image pixel values of only that single primary color as a substitute for all extra-data image primary colors for that particular test image, and thereby, having done so for each single primary color, creating an intermediate test image for each. The pixel values of each primary color test image are then compared to all primary color pixel values of the original high-resolution image to determine which test image results in the best approximation of that original high-resolution.

Such best approximation can be based on any comparative process as would occur to one skilled in the art, including but not limited to a summation of the results of the least squared error between all pixel values of each primary color of the original and test image. That primary color component of the extra-data images resulting in the best approximation is referred to herein as the lead primary-color pixel component X.

The complete set of extra-data images can be divided into two subsets of extra-data images, wherein a first subset includes all the pixel values of the complete set for just the lead-primary-color pixel component X and a second subset that includes the pixel values of only the remaining primary-color pixel components Y,Z, the two subsets together effectively providing all pixel values of the complete set, and the two subsets thereafter stored on the server device with the base image which itself also includes a value indicating the lead primary color in its metadata.

If the original image—and therefore also the second subset of extra-data images—includes a non-primary color component to be treated as an alpha channel, then the server device further uses reconstruction of the component of the base image to reconstruct a first high-resolution test image using the first set of extra-data images. The server also creates a second high-resolution test image by simply scaling up the alpha channel of the base image to the same resolution as the original image using conventional scaling algorithms. Both such test images are then compared to the alpha channel component of the original high-resolution image to determine which method offers the best approximation in accordance with the same method used to determine the lead primary color. An indication to use either alpha channel scaling or reconstruction of the alpha channel with the first extra-data subset as a best approximation is then stored as an additional value in the metadata of the base image.

In further accordance with the image processing system 10, upon demand from a receiving device, the server sends the base image with its metadata (or uses an alternate means of communicating the lead primary color and method for alpha channel treatment) followed by the first subset of extra-data images comprising pixel values of the lead primary color, and thereafter, the server device sends the second subset of extra-data images for the remaining color components. While sequentially receiving the first subset of extra-data images, the receiving device applies reconstruction, through algorithms resident on the receiving device, or provided to the receiving device by the server device, for example, through the Hypertext Markup Language of a web page, to progressively reconstruct an intermediate image having the resolution of the original high-resolution image from the base image and the pixel values of the first subset of extra-data images, and using such pixel values as an estimate for all other extra-data primary color components. If an alpha or transparency component is also present on the receiving device, the receiving device, as instructed by the metadata of the base image, either scales that component up to the final resolution, or uses the first subset of extra-data image values for reconstruction as well. Since the base image includes all colors of the original high-resolution image, this process therefore creates an intermediate image with the full color and resolution of the original image, albeit with less than full fidelity due to the use of a single primary color of the extra-data images during reconstruction. Thereafter, and upon receiving the second subset set of extra-data images, the receiving device then performs progressive reconstruction using the base image and the pixel values of the remaining extra-data image components of the second subset, replacing the final image pixel values for the remaining primary color components and alpha channel (if present) with the reconstructed values when complete, and thereby fully and losslessly restoring the original image.

The intermediate image—i.e. the X-approximate high-definition image ($IMG_X^{0,0}$, $IMG_Y^{0,0}$, $IMG_Z^{0,0}$)—created by the image processing system 10 presents the full resolution of the final high-definition image 12 in much less time than required to directly display the high-definition image 12 because the reconstruction to that resolution only requires the transmission and reception of a single color component of the extra-data images (i.e. the first subset) instead of all color components of the complete set. While the fidelity of this intermediate image is very likely to be less than that of the final image, it will nonetheless be a very good representation if the pixel values of first subset of extra-data images are good estimates of the corresponding pixel values of all other primary colors. As mentioned hereinabove, compaction of typical images shows that extra-data images whose pixel values are primarily based on differences of spatially adjacent pixel values of the original image appear substantially as grayscale images. This implies that values for all primary-color pixel components R, G, B of such extra-data pixels are very similar to one another, and therefore that using one primary color value of the extra data is a reasonable estimate for all other primary color values of an extra-data pixel when used for reconstruction. Accordingly, in accordance with another aspect of the image processing system 10 and an associated set of embodiments, any of the primary-color pixel component R, G, B may be used as pixel component X instead of the lead-primary-color pixel component X for generating the X-approximate intermediate and high-definition images—i.e. without the determination of the lead-primary-color pixel component X by the above-described lead-primary-color identification process 1600—in the associated approximate image reconstruction processes 2200, 2300, 2400, 2500, 2600, 2700 so as to provide for losslessly restoring the original high-definition image 12, notwithstanding that a lead-primary-color pixel component X selected using the above-described lead-primary-color identification process 1600 would typically provide for the best quality associated intermediate images to be generated by the associated approximate image reconstruction processes 2200, 2300, 2400, 2500, 2600, 2700.

Notwithstanding that the similarities of extra-data pixels for different primary-color pixel components R, G, B, generally justify the use of any primary color R, G, B as that estimate, it should be understood that the above-described lead-primary-color identification process 1600 may be used to determine and select the lead-primary-color pixel component X that provides for the highest fidelity approximate reconstruction of the X-approximate high-definition image ($IMG_X^{0,0}$, $IMG_Y^{0,0}$, $IMG_Z^{0,0}$).

In accordance with another aspect, a progressive imaging process first scales an original image down to relatively-lower resolution using conventional scaling algorithms to create a base image of smaller file size for faster transmission. The base image includes each of the associated color components, and possibly a transparency component. Then, in preparation for later delivery, each color component, and if available, the transparency component, of that relatively-lower resolution image is then scaled back up to the size of—i.e. the same number of pixels as—the original image, for example, by interpolation of pixel values at pixel locations between the corresponding locations of the base image, wherein the resulting upscaled image has lower fidelity than the original image. Each of the color components, and if available, the transparency component, of the upscaled image is then differenced with the corresponding components of the original image to generate an associated extra-data difference image that can be used to reconstruct the original image from the upscaled image.

The base image, information describing the aforementioned process or algorithm used to upscale the base image to an upscaled image, and the extra-data difference image is then delivered to a client system, wherein the described upscaling process is used to convert the base image to an upscaled image. The extra-data difference image is then applied to correct each color-component, and if available, the transparency component, of the up-scaled image using an associated inverse differencing process—i.e. the inverse of the differencing process used to generate the extra-data difference image—to reconstruct the original image. Although the up-scaled image is only an approximation of the original image, the pixel color-component values thereof are sufficiently similar to those of the original image so that the associated extra-data difference image appears substantially as a grayscale image (i.e. wherein each of the color-component values of each pixel of the extra-data difference image are very similar to one another). Accordingly, a single color-component of the extra-data difference image can be used as an estimate for the extra data of other colors in the extra data difference image, to reconstruct an intermediate image of higher quality than the up-scaled image. The remaining primary color components of the extra data image can then be subsequently delivered to reconstruct the remaining colors in the final image with original fidelity. It should be understood that this approach can be applied to either lossy or lossless progressive delivery depending on the process of generating the base and extra data images and the degree to which all colors of extra data are applied during reconstruction.

The relatively-smaller base image can therefore be transmitted rapidly and then up-scaled by a receiving device to the original resolution, followed by the transmission of the extra-data image which is subsequently used by the receiving device to correct the up-scaled image using the inverse differencing process to reconstruct the original image pixel values.

Generally, this approach of using a single color component of extra data to reconstruct other color components of a relatively-higher fidelity image can be used in accordance with any imaging method employing difference data between two pixels with an expectation that the values of the associated difference data will be similar for different color components. Such differences may be between values of spatially adjacent pixels, between original pixels and approximations to those pixels, and even between a particular pixel value and the value of that pixel in a future frame of a sequential motion video display of images based on a prediction of where that pixel value is most likely to be in a future frame. For example, such a prediction could suggest the future pixel value to be in the same image location as the original. However, that location may also be predicted to change to a new location in the future frame based on a variety of known motion estimation, prediction and encoding methods.

Figure 34:
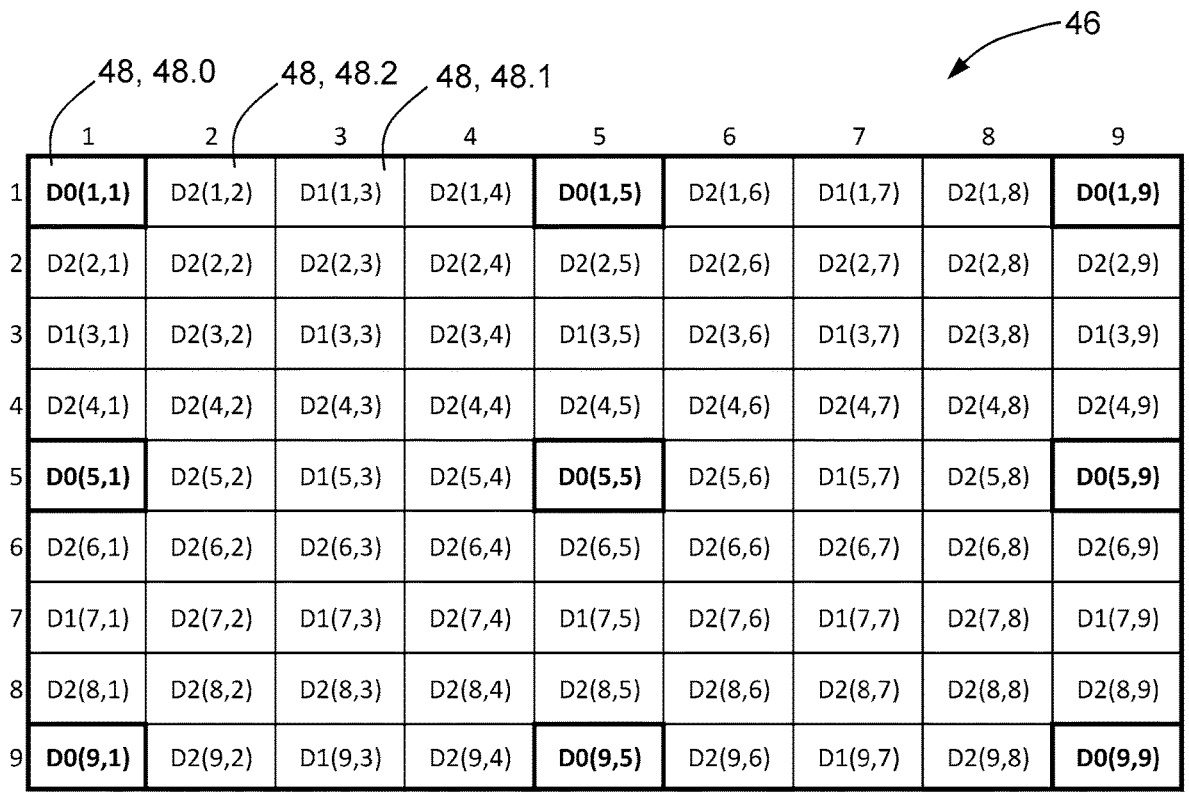
FIG. 34 illustrates a difference image generated as the difference between the high-definition image illustrated in FIG. 32 and the scaled image illustrated in FIG. 33.
Figure 35:
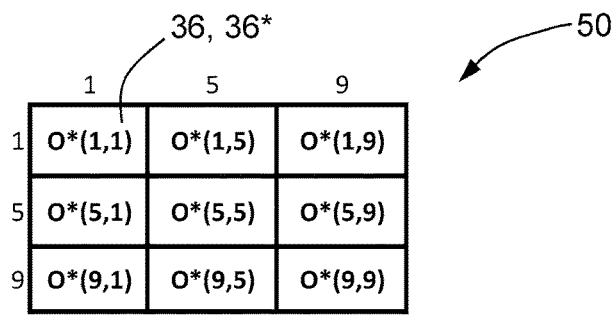
FIG. 35 illustrates the base image associated with the images illustrated in FIGS. 32-34.

For example, referring to FIGS. 31-37, an alternative progressive image generation and transmission process 3100—for example, operating on the internet server 18—commences in step (3102) with receipt of a high-definition image 12, i.e. what is also referred to as an original high-definition image 12, O, an example of which is illustrated in FIG. 32, comprising a plurality of pixels 36, O(i,j), each of which includes a plurality of primary-color pixel components R, G, B and possibly also a transparency component α. In accordance with one set of embodiments, the high-definition image 12 includes a sparse subset of base-image pixels 36, 36* that provide for representing the high-definition image 12, O, but at a relatively lower definition and with relatively-fewer pixels 36 that can be transmitted relatively-more quickly than the entire high-definition image 12, O. This sparse subset of base-image pixels 36, 36*, O(i,j) can be created from the high-definition image 12, O—associated with corresponding base-image-pixel locations 36' within the high-definition image 12, O,—by any arbitrary method such as down-sampling through scaling methods—possibly resulting in values of the pixel components R, G, B, α that are different from those of the corresponding original image pixels—or even sampling of the original image pixels 36, O(i,j). In step (3104), the base-image pixels 36, 36*, O*(i,j) are selected from the high-definition image 12, O, or otherwise determined, so as to define an associated base image 50, O*, for example, as illustrated in FIG. 35 and described further hereinbelow. Then, referring also to FIG. 33, in step (3106), a corresponding scaled image 42, S—having same number of pixels as the high-definition image 12, O and in one-to-one correspondence therewith—is determined from the values and locations 36' of the base-image pixels 36, 36* in the high-definition image 12, O. The scaled image 42, S comprises a plurality of scaled image pixels 44, S(i,j) in combination with the associated base-image pixels 36, 36*, with each scaled image pixel 44, S(i,j) containing the same components R, G, B, α as the corresponding base-image pixels 36, 36*, wherein the value of each component R, G, B, α of each scaled image pixel 44, S(i,j) is determined from the corresponding values of the relatively-proximate associated base-image pixels 36, 36*, for example, by interpolation, for example, bilinear interpolation, polynomial interpolation or spline interpolation, which may be independent of any scaling method that might be used in step (3104) to determine the associated base-image pixels 36, 36*, O*(i,j) as an alternative to sampling the original image pixels 36, O(i,j), which accounts for both the values of the associated components R, G, B, α of the base-image pixels 36, 36*, and the locations 36' of those values within the scaled image 42, S.

Then, referring also to FIG. 34, in step (3108), a corresponding difference image 46, D—having same number of pixels as the high-definition image 12, O and the scaled image 42, S, and in one-to-one correspondence with each—is determined by subtracting the scaled image 42, S from the high-definition image 12, O. More particular, each difference pixel 48, Dk(i,j) is given by:

$$Dk(i,j)\{R,G,B,\alpha\}=O(i,j)\{R,G,B,\alpha\}-S(i,j)\{R,G,B,\alpha\} \quad (5)$$

wherein k represents an interleave level that is described hereinbelow and which identifies a corresponding subset of difference pixel 48, Dk(i,j), and each component R, G, B, α is determined separately. If the base-image pixels 36, 36*, O*(i,j) are sampled from the original image pixels 36, O(i,j), then the corresponding difference pixels 48, Dk(i,j) will be zero-valued.

Following step (3108) of the alternative progressive image generation and transmission process 3100, referring again to FIG. 35, in step (3110), the base image 50, O* is transmitted to a client, for example, for either display on an associated display 26, or for subsequent processing in favor of the display of an associated relatively-higher-definition image. Then, in step (3112), a counter k—used to account for corresponding associated sets of difference image pixels 48, Dk(i,j)—is initialized to a value of zero, and then, in step (3114), the lead-primary-color pixel component X (or more generally, pixel component X which need not be the "best" primary-color) of the $k^{th}$ set of difference image pixels 48, Dk(i,j){X} is transmitted to the client for use in reconstructing a relatively-higher-fidelity image, i.e. an image that is of higher fidelity than the most-recently reconstructed image, wherein the lead-primary-color pixel component X—if used—is selected as described hereinabove. In one set of embodiments, referring to FIG. 36, for k=0, the $0^{th}$ set—i.e. a base set—of difference image pixels 48, 48.0, D0($i,j$) of an associated base difference image 46.0 correspond to, and provide for correcting, the base image 50, O*. Furthermore, the subsequent sets of difference image pixels 48, 48.$k$, Dk(i,j) of each set k are interleaved and medially located with respect to the previously-transmitted sets k of difference image pixels 48, Dk(i,j). Furthermore, referring to FIG. 37, a first set of non-base difference image pixels 48, 48.1, D1($i,j$) of an associated first-interleave difference image 46.1, D1 are interleaved and medially located with respect to the base-image pixels 36, 36*, and, referring to FIG. 38, a second set of non-base difference image pixels 48, 48.2, D2($i,j$) of an associated second-interleave difference image 46.2, D2 are interleaved and medially located with respect to both the base-image pixels 36, 36* and the first set of non-base difference image pixels 48, 48.1, D1($i,j$). Following step (3114), if, in step (3116), the lead-primary-color pixel components X of all of the sets of difference image pixels 48, Dk(i,j){X} have not been transmitted to the client, then, in step (3118), the counter k is incremented, and the process repeats with step (3114).

Otherwise, from step (3116), if the lead-primary-color pixel components X of all of the sets of difference image pixels 48, Dk(i,j){X} have been transmitted to the client, and if the client requests to further refine the reconstruction of the image, then, the above steps (3112) through (3118) are repeated as described above, but as corresponding steps (3120) through (3126), but instead of transmitting only the lead-primary-color pixel components X—or generally, pixel components X—of all sets of difference image pixels 48, Dk(i,j){X}, the remaining primary-color pixel components Y, Z, and if available, the transparency component α, all sets of difference image pixels 48, Dk(i,j){Y,Z, α} are sequentially transmitted to the client. Then, following step (3116) if only the lead-primary-color pixel components X—or generally, pixel components X—are transmitted, or following step (3124) if all the primary-color pixel components X, Y, Z are transmitted, in step (3128), the alternative progressive image generation and transmission process 3100 returns control to await the next high-definition image 12, O to be processed.

Figure 39:
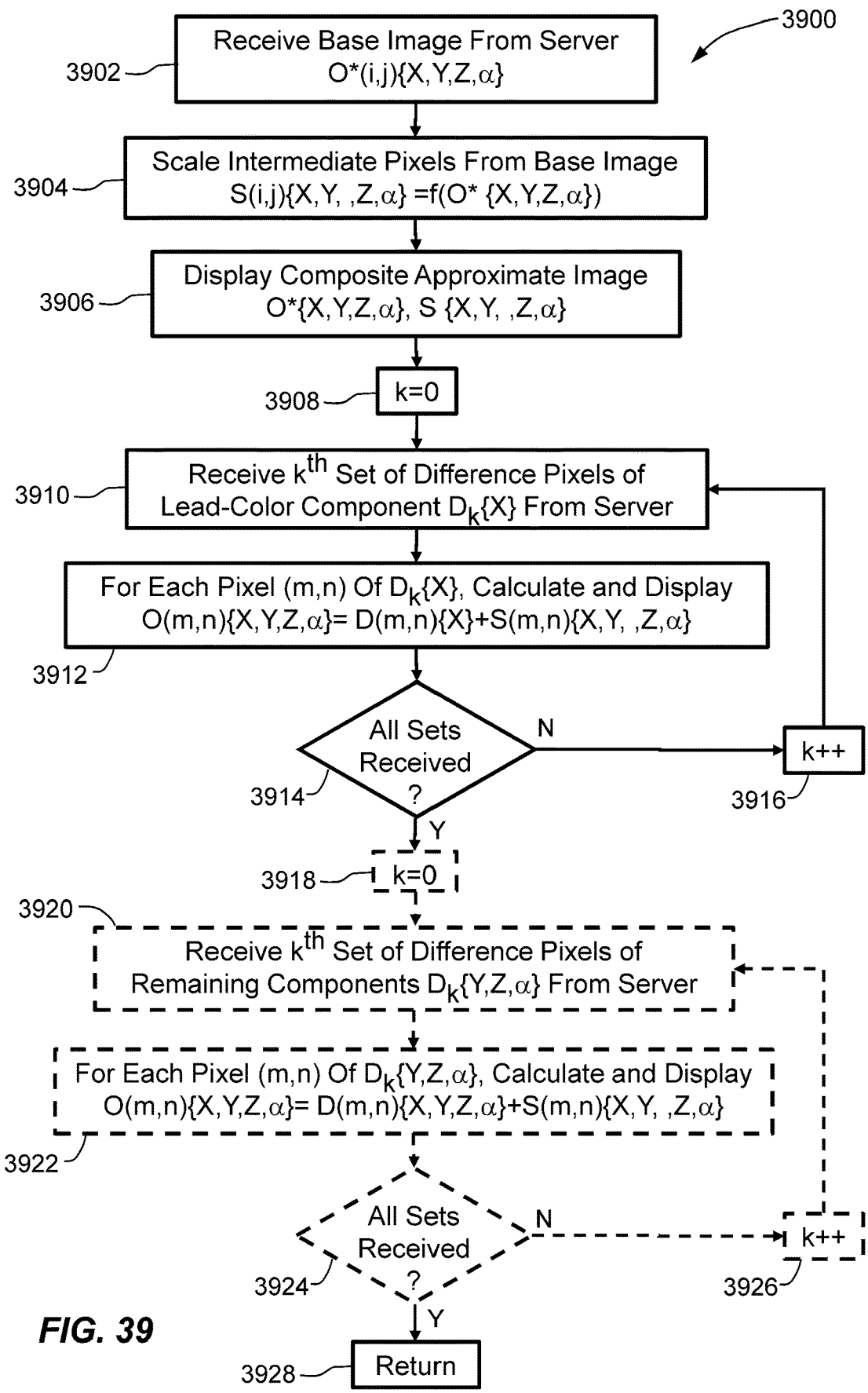
FIG. 39 illustrates an alternative progressive image reconstruction process that is a counterpart to the alternative progressive imaging process illustrated in FIG. 31, wherein the counterpart process provides for receiving and displaying the base image, internally generating the associated scaled image, and then receiving at least the lead-color components of the difference images to provide for reconstructing at least an approximation of the high definition image by inverse differencing the scaled image using the difference image components.

Referring to FIG. 39, from the perspective of the internet client 20, in accordance with an alternative progressive image reconstruction process 3900, in step (3902), the base image 50, O* transmitted by step (3110) of the above-described transmission process 3100 is received, and in step (3904), a corresponding scaled image 42, S is generated from the base image 50, O* using the same methodology as used in step (3106) of the above-described generation process 3100. Then, in step (3906), a composite of the base image 50, O* and the scaled image 42, S—an example of which is illustrated in FIG. 33, and which is referred to herein collectively as the scaled image 42, S—is displayed on the display 26 of the internet client 20. Then, in step (3908), a counter k—used to account for corresponding associated sets of difference image pixels 48, Dk(i,j)—is initialized to a value of zero, and then, in step (3910), the lead-primary-color pixel component X of the $k^{th}$ set of difference image pixels 48, Dk(i,j){X}— as transmitted in step (3114) of the above-described transmission process 3100—is received, after which in step (3912), for each primary-color pixel components X, Y, Z of each difference image pixel 48, Dk(i,j), an approximation of each of the corresponding original, high-definition image pixels 36, O(i,j) is reconstructed using only the lead-primary-color pixel component X—or generally, pixel component X—of the $k^{th}$ set of the corresponding difference image pixels 48, Dk(i,j){X}, as follows:

$$O(ij)\{R,G,B,\alpha\}=S(ij)\{R,G,B,\alpha\}+Dk(i,j)\{X\}. \quad (6)$$

Following step (3912), if, in step (3914), the lead-primary-color pixel components X—or generally, pixel components X—all of the sets of difference image pixels 48, Dk(i,j){X} have not been received and processed, then, in step (3916), the counter k is incremented, and the process repeats with step (3910).

Otherwise, from step (3914), if the lead-primary-color pixel components X all of the sets of difference image pixels 48, Dk(i,j){X} have been received and processed, and if further image refinement is desired, then the above steps (3908) through (3916) are repeated as described above, but as corresponding steps (3918) through (3926), but instead of receiving only the lead-primary-color pixel components X—or generally, pixel components X—of all sets of difference image pixels 48, Dk(i,j){X}, the remaining primary-color pixel components Y, Z, and if available, the transparency component α, all remaining sets of difference image pixels 48, Dk(i,j){Y,Z, α} are sequentially received and processed. More particularly, in step (3922), each of the corresponding original, high-definition image pixels 36, O(i,j) is reconstructed substantially losslessly, as follows:

$$O(i,j)\{R,G,B,\alpha\}=S(i,j)\{R,G,B,\alpha\}+Dk(i,j)\{R,G,B,\alpha\}. \quad (7)$$

Then, following step (3914) if only the lead-primary-color pixel components X—or generally, pixel components X—are received, or following step (3924) if all the primary-color pixel components X, Y, Z are received, in step (3928), the alternative progressive image reconstruction process 3900 returns control to await the next imaged to be received and processed.

Alternatively, rather than progressively transmitting sub-sets 46.0, 46.1, 46.2 of the difference image 46, D in step (3114) and possibly step (3122), and receiving those subsets 46.0, 46.1, 46.2 of the difference image 46, D in step (3910) and possibly step (3920), the entire difference image 46, D may be transmitted as a single block of data in step (3114) and possibly step (3122), following transmission of the base image 50, O* in step (3110), and received as single block of data in step (3910) and possibly step (3920), following the generation of the scaled image 42, S in step (3904).

In accordance with yet another aspect and an associated set of embodiments, the image processing system 10 could provide for the delivery of an image that is relatively lossy in comparison with the original image, but at a rate of delivery that is substantially faster otherwise possible when otherwise transmitted substantially losslessly—subject to the precision of the associated mathematical operations—restored in accordance with the above-described approximate image reconstruction processes 2200, 2300, 2400, 2500, 2600, 2700 followed by the above-described final image reconstruction process 2800. For example, in accordance with one set of embodiments, an approximate, relatively lossy, intermediate image may be reconstructed by only the first approximate image reconstruction process 2200 using only the lead-primary-color pixel component X—or generally, pixel component X—of extra-data images $ED_X$ to reconstruct each of the color components of the reconstructed image, wherein the lead-primary-color pixel component X may be determined in accordance with the above-described lead-primary-color identification process 1600, or, alternatively as described hereinabove, pixel component X may be selected arbitrarily. Accordingly, the reconstruction of a relatively lossy image using only the lead-primary-color pixel component $ED_X$—or generally, pixel component X—precludes the need for receiving and processing the remaining primary-color pixel components $ED_{Y,Z}$, thereby providing for displaying the reconstructed final lossy image substantially more quickly than otherwise possible when losslessly reconstructing the original image. Furthermore, the base image $IMG^{P,P}$ and associated extra-data images $ED_X^{P,P}$, $ED_X^{P,P-1}$, ..., $ED_X^{2,2}$, $ED_X^{2,1}$, $ED_X^{1,1}$, $ED_X^{1,0}$ created during the image compaction process 200 may be further processed using known minimization and/or compression steps—for example, JPEG compression—to reduce their file sizes—and therefore, their associated transmission times,—resulting in faster delivery, but with an inherent further loss of image quality in the corresponding resulting reconstructed images.

The similarities amongst different color components of the extra-data images cannot necessarily be extended to an alpha or transparency channel because such a component often has spatial characteristics far different from those of the primary color channels. In fact, in typical images, alpha channel content likely has a spatial structure that is smoothly varying (for example, to support gradient blending), and therefore simple scaling to the higher resolution can be both simple and sufficient for the alpha channel of an intermediate image. In any case, the aforementioned testing on the server device of such scaling compared to reconstruction of the alpha component using the lead primary color extra data will provide the best guidance for which method should be used by the receiving device for the intermediate image.

All color components of the extra-data images are still contained in the combination of the first and second subsets. Such extra-data images are simply sent as a first subset of essentially grayscale images representing the chosen first subset primary color component, for example, green, while the second subset contains the remaining color component values, for example, red, blue and alpha. In other words, such extra-data images fundamentally comprise the same amount of total data, whether sent as the complete, full color image, or as the two subsets of the compacted image and associated extra data. Accordingly, from that perspective, there is no additional bandwidth required by the image processing system 10 to transmit and receive the complete extra-data image values relative to transmitting a high-definition image 12 in its entirety. Assuming the additional reconstruction processing by the receiving device adds negligible time, the image processing system 10 therefore provides for the transmission and display of the final, high-resolution image in substantially the same time as might otherwise be required to display the high-definition image 12 while also providing for a high-resolution approximation to that high-definition image in significantly less time than if the high-definition image 12 were otherwise directly received and displayed.

From the perspective of the internet server 18, for example, acting as webserver, the image processing system 10 initially receives and preprocess a high-definition image 12, i.e. a high-resolution image, having at least two primary color components. The high-definition image 12 is progressively decimated in width and height while also creating a set of extra-data images comprising extra-data pixel values for all color components or channels, resulting in the creation and storage of a lower resolution base image, in such a way that the reverse decimation process can be used, beginning with the base image, to losslessly reconstruct the original high-resolution image. Then, for each primary color, reverse decimation is used to reconstruct a high-resolution test image from the base image, using the extra-data image pixel values for that primary color, for all primary colors of the test image. Then, the internet server 18/webserver determines which reconstructed primary color test image produces the least total mean squared error between all primary color pixel values of the test image and those of the original high-resolution image, and indicates this least mean squared error color as the "lead" color in the base image metadata. Then, a first extra-data image subset is created and stored from the extra-data images having pixel values only for this lead color, and a second extra-data image subset is also created and stored from the extra-data images having pixel values excluding this color, but including all remaining colors of the set of extra-data images. If the high-definition image 12 includes an alpha or transparency channel as one of the color channels, the internet server 18/webserver uses reverse decimation to reconstruct that channel of the high-resolution image from the alpha channel of the base image using the first extra-data image subset to create a first alpha channel test image, and uses conventional scaling algorithms to scale up the alpha channel of the base image to the resolution of the original high-resolution image to create a second alpha channel test image. Then the internet server 18/webserver determines which of either the first alpha channel test image or second alpha channel test image produces the least total mean squared error between such image and the alpha channel of the original high-resolution image, and as a result, indicates the associated method as a value in the metadata of the base image metadata. Then, upon demand from a receiving device of an internet client 20, i.e. an internet-connected device 28, the internet server 18/webserver communicates thereto the base image (with metadata) and the first extra-data image subset followed by the second extra-data image subset, so as to provide for the substantially lossless reconstruction of the high-definition image 12.

The present invention may be applied to single images or individually to each of a mosaic array of smaller area images comprising a larger area image according to the visibility of each said smaller image in a given application. For example, a display device may display a particular area of an image which has been improved with extra resolution data only for that particular area and possibly it's immediate surround without requiring the download of extra resolution data for remaining non-displayed areas. As a user interacts with the display device for the purpose of displaying new areas of the larger image, such as by panning, the extra resolution data for those new areas can then be downloaded to improve the newly displayed areas.

Figures 40, 41:
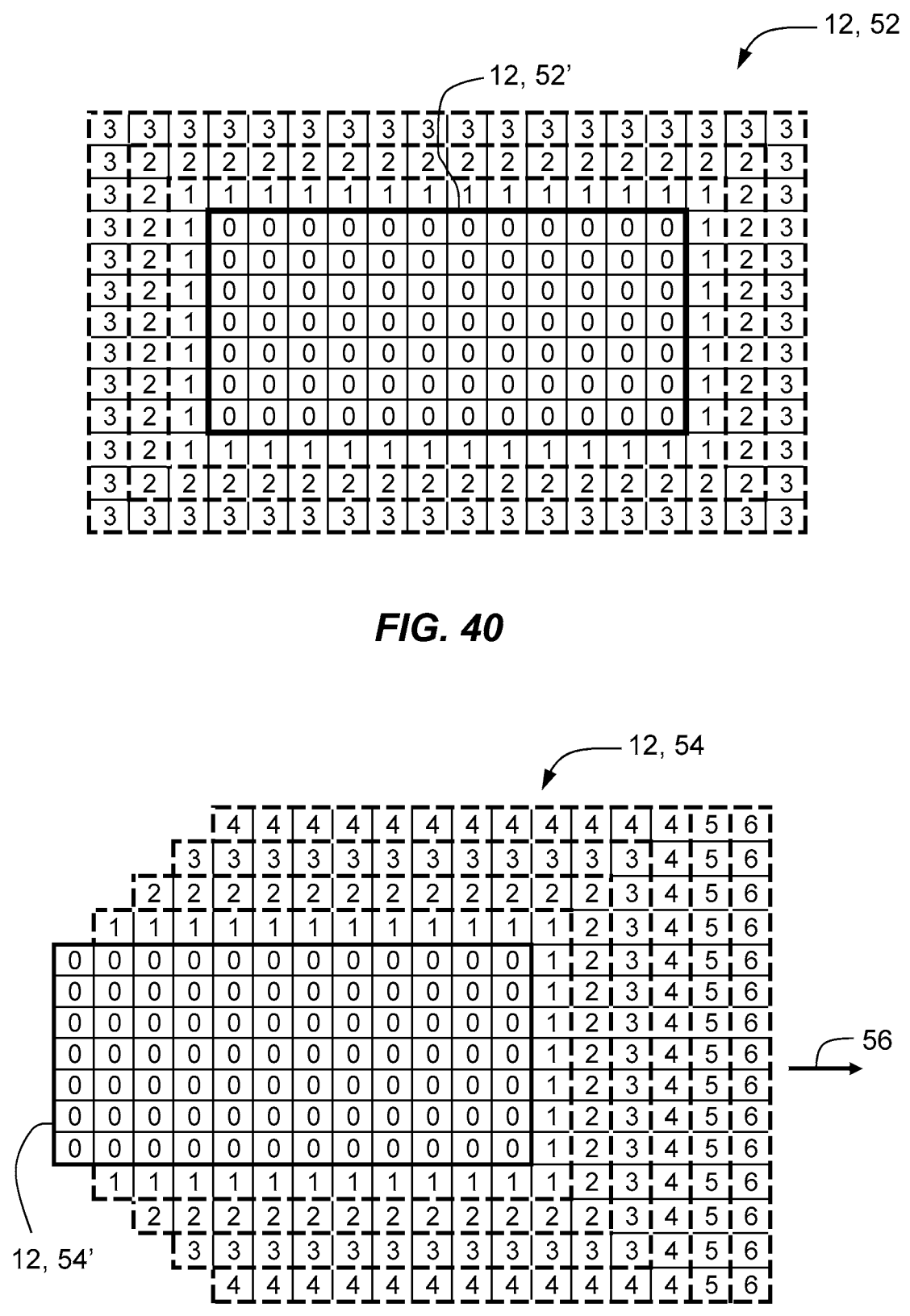

For example, referring to FIG. 40, a displayed-portion of stationary image 12, 52' is a portion within a larger, but stationary image 12, 52 that is received, processed and displayed in accordance with any of the above-described image reconstruction processes 2200-3000, 3900. In anticipation of a prospective panning of the displayed-portion of stationary image 12, 52' within the stationary image 12, 52, the corresponding above-described image reconstruction processes 2200-3000, 3900 can be applied to reconstruct non-displayed pixels in advance, for example, in the order of establishing bands of reconstructed pixels that are concentric with respect to the displayed-portion of stationary image 12, 52', for example, in the order indicated by the number associated the illustrated image pixels, i.e. 0 through 3, wherein the pixels of the displayed-portion of stationary image 12, 52' are each indicated as "0". Referring to FIG. 41, when what had been a stationary image 12, 52 undergoes panning, the resulting displayed-portion 12, 54' of an associated panned image 12, 54 moves within the panned image 12, 54 in an associated pan direction 56, and in anticipation of this movement, the corresponding above-described image reconstruction processes 2200-3000, 3900 can be applied to reconstruct non-displayed pixels in advance of the movement so as to mitigate against delays associated with non-displayed pixels that will need to be displayed as the displayed-portion 12, 54' of the panned image 12, 54 moves in the pan direction 56. Accordingly, the order in which the non-displayed pixels are reconstructed is inversely related to the likely time delay before that pixel will likely be displayed, so that the sooner the pixel is expected to be displayed, the sooner that pixel will be reconstructed in advance of that display.

For example, FIG. 41 illustrates a prospective ordering of reconstruction based upon the illustrated pan direction 56, with the order indicated by the number associated the illustrated image pixels, i.e. 0 through 6, wherein the pixels of the displayed-portion 12, 54' of the panned image 12, 54 each indicated as "0".

Figure 42:
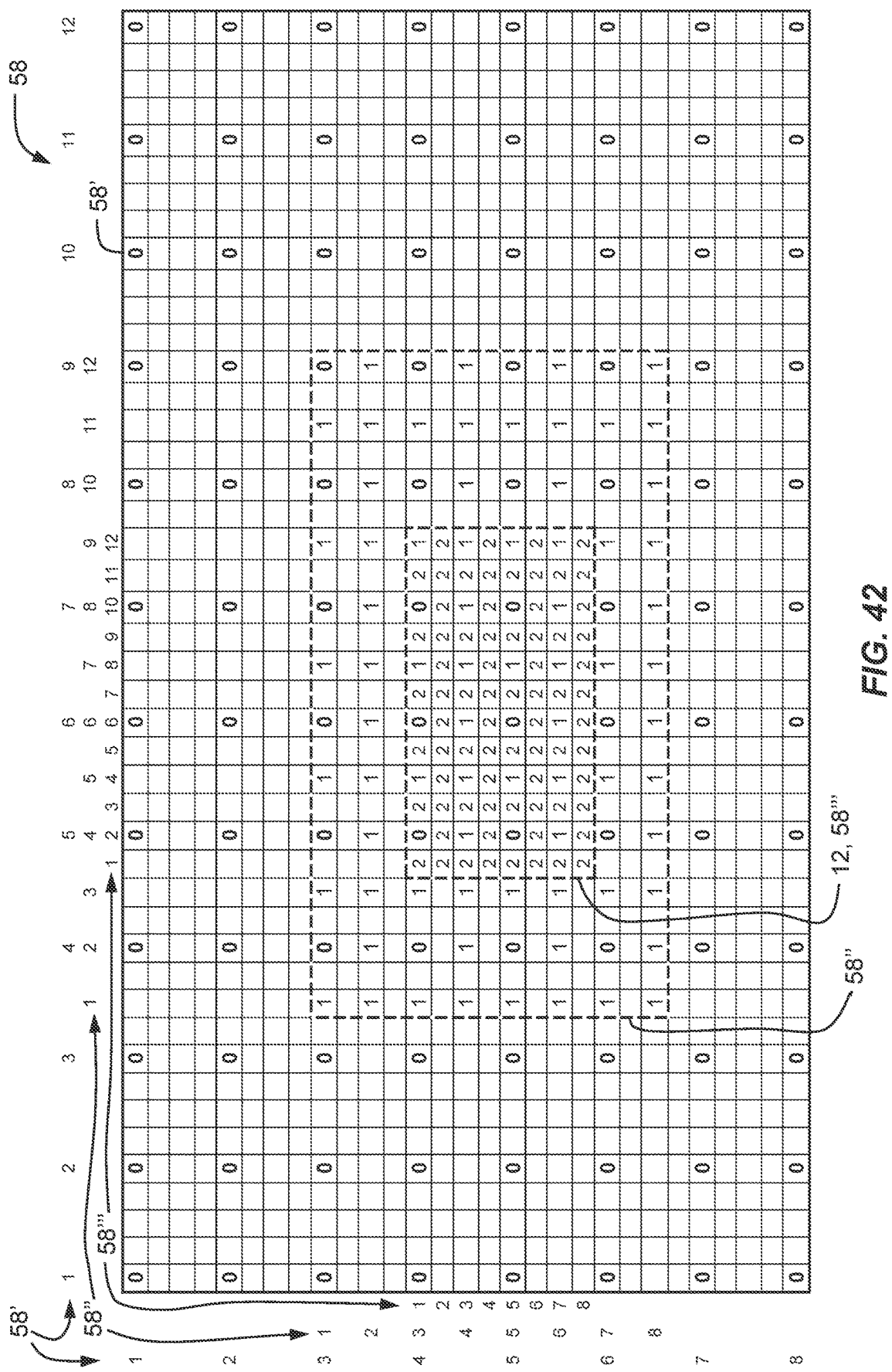
FIG. 42 illustrates a portion of an image including a first portion that is being displayed on a display in accordance with the process illustrated in FIG. 22-28, 29-30, or 39 of reconstructing a high-definition image from a compacted image that had been compacted in accordance with the process illustrated in FIG. 2, and remaining portions that are surrounded by the first portion and that are sequentially processed in accordance with the process illustrated in FIG. 22-28, 29-30, or 39, for a display that is being zoomed by the user viewing the display, wherein the remaining portions of the image are of successively higher resolution than the first portion of the image.

Furthermore, as another example, the above-described image reconstruction processes 2200-3000, 3900 can be applied in advance to non-displayed pixels that are anticipated to be displayed as a result of an image-zooming operation. For example, referring to FIG. 42, a zoomed image 58 is illustrated including a first displayed portion of zoomed image 58' that is initially displayed, and associated second 58'' and third 58''' prospective displayed portions of the zoomed image 58 that could be displayed responsive to the user zooming the display. Following display of the first displayed portion of zoomed image 58'—with pixels identified in FIG. 42 with "0", the pixels identified in FIG. 42 with "1" are reconstructed in advance using the above-described image reconstruction processes 2200-3000, 3900 in anticipation of displaying the second displayed portion of zoomed image 58'', and the pixels identified in FIG. 42 with "2" are then reconstructed in advance using the above-described image reconstruction processes 2200-3000, 3900 in anticipation of displaying the third displayed portion of zoomed image 12, 58''', wherein each of the first 58', second 58'' and third 58''' displayed portions each have the same number of pixels in total.

The image processing system 10 therefore provides for the transmission and display of a high-resolution image by producing an intermediate image having the same resolution as the final high-resolution image, albeit with lower intermediate fidelity, but in a much faster time than the presentation of that final image and with virtually no increase in the bandwidth required for the delivery and display of that final image. This relatively much faster presentation of this high-resolution intermediate image therefore significantly accelerates the user's perception of how fast the image content appears, thereby supporting the transmission and display of high-resolution images without otherwise excessive perceived delay.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. Furthermore, it should also be understood that the indefinite articles "a" or "an", and the corresponding associated definite articles "the" or "said", are each intended to mean one or more unless otherwise stated, implied, or physically impossible. Yet further, it should be understood that the expressions "at least one of A and B, etc.", "at least one of A or B, etc.", "selected from A and B, etc." and "selected from A or B, etc." are each intended to mean either any recited element individually or any combination of two or more elements, for example, any of the elements from the group consisting of "A", "B", and "A AND B together", etc. Yet further, it should be understood that the expressions "one of A and B, etc." and "one of A or B, etc." are each intended to mean any of the recited elements individually alone, for example, either A alone or B alone, etc., but not A AND B together. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth of the appended claims, and any and all equivalents thereof.

What is claimed is:

1. A method of processing an image, comprising:
   a. receiving from an image server, all color components of a lowest-resolution image of a plurality of successively-higher-resolution images;
   b. displaying said lowest-resolution image on a display; and
   c. for each remaining image of said plurality of successively-higher-resolution images, in order of increasing resolution:
      i. receiving from said image server, a single color component of a corresponding set of extra data of each of a plurality of corresponding sets of extra data;
      ii. reconstructing a next-higher-resolution image from a combination of a previous image and said single color component of said corresponding set of said extra data, wherein said previous image comprises said lowest-resolution image for a first set of said extra data, and otherwise comprises a next-lower-resolution reconstructed image;
iii. displaying said next-higher-resolution image on said display; and
iv. at least temporarily saving a color component of said next-higher-resolution image, wherein said color component corresponds to said single color component of said corresponding set of said extra data.

2. A method of processing an image as recited in claim 1, further comprising:
a. receiving from said image server, remaining components of said extra data of a corresponding set of extra data associated with a candidate image, wherein said candidate image is the lowest-resolution image of said plurality of successively-higher-resolution images that has not been substantially-losslessly-reconstructed;
b. substantially-losslessly reconstructing a successively-higher-resolution substantially-losslessly-reconstructed image responsive to a combination of said candidate image and said remaining components of said extra data;
c. displaying said successively-higher-resolution substantially-losslessly-reconstructed image; and
d. at least temporarily saving said successively-higher-resolution substantially-losslessly-reconstructed image.

3. A method of processing an image as recited in claim 1, further comprising receiving from said image server, a color-component indicator that identifies said single color component.

4. A method of processing an image as recited in claim 1, further comprising:
a. receiving from said image server, a transparency-component indicator; and
b. prior to displaying said next-higher-resolution image:
i. if said transparency-component indicator indicates a first state, scaling or interpolating a transparency component of said lowest-resolution image to form a transparency component of said next-higher-resolution image in one-to-one pixel correspondence with said next-higher-resolution image; and
ii. if said transparency-component indicator indicates a second state, reconstructing said transparency component of said next-higher-resolution image from said previous image in combination with said single color component of said corresponding set of said extra data.

5. A method of processing an image, comprising:
a. receiving at least two color components of a first resolution image, wherein each color component of said at least two color components is associated with a different primary color;
b. receiving a first portion of extra data associated with said first resolution image, wherein said first portion of extra data provides for generating a second resolution image corresponding to said first resolution image, said second resolution of said second resolution image is greater than said first resolution of said first resolution image, said first resolution image is derivable from a common underlying image having a corresponding resolution that is relatively higher than said first resolution, said second resolution image is either derivable from or substantially equivalent to said common underlying image, said first portion of extra data includes a subset of color components corresponding to at least one of said at least two color components of said first resolution image, and said subset of color components contains fewer said color components than said at least two color components of said first resolution image;
c. generating said second resolution image from said first resolution image using at least one color component of said first portion of extra data; and
d. providing for displaying on a display or storing in a memory, an image selected from the group consisting of said second resolution image and a further processed image based upon said second resolution image.

6. A method of processing an image as recited in claim 5, further comprising displaying said second resolution image on said display.

7. A method of processing an image as recited in claim 5, further comprising displaying both said first and second resolution images in succession on said display.

8. A method of processing an image as recited in claim 5, wherein said first resolution image and said first portion of extra data are received from an image server.

9. A method of processing an image as recited in claim 5, wherein said first portion of extra data comprises a plurality of extra-data values, and each extra-data value of said plurality of extra-data values is responsive to difference between corresponding associated adjacent pixels in said second resolution image.

10. A method of processing an image as recited in claim 5, further comprising:
a. receiving a first portion of extra data associated with said second resolution image, wherein said first portion of extra data associated with said second resolution image provides for generating a third resolution image corresponding to said first and second resolution images, said third resolution of said third resolution image is greater than said second resolution, said third resolution images is derivable from or substantially equivalent to said common underlying image, and said first portion of extra data associated with said second resolution image includes said subset of color components corresponding to said at least one of said at least two color components of said first resolution image; and
b. generating said third resolution image from said second resolution image using said at least one color component of said first portion of extra data associated with said second resolution image, wherein said further processed image includes an image selected from the group consisting of said third resolution image and a yet further processed image based upon said third resolution image.

11. A method of processing an image as recited in claim 10, further comprising displaying said third resolution image on said display.

12. A method of processing an image as recited in claim 10, further comprising displaying at least two images selected from the group consisting of said first resolution image, said second resolution image and said third resolution image in succession on said display.

13. A method of processing an image as recited in claim 10, further comprising:
a. receiving at least one additional portion of extra data associated with said second resolution image, wherein said at least one additional portion of extra data associated with said second resolution image provides for generating a corresponding supplemental second resolution image, and said at least one additional portion of extra data associated with said second resolution image includes at least one additional color component associated with said first resolution image that was not included in said first portion of extra data;

b. generating said supplemental second resolution image from said second resolution image using said at least one additional color component of said at least one additional portion of extra data associated with said second resolution image, wherein said further processed image includes an image selected from the group consisting of said supplemental second resolution image and a yet further processed image based upon said supplemental second resolution image.

14. A method of processing an image as recited in claim 13, further comprising displaying at least two images selected from the group consisting of said first resolution image, said second resolution image, said third resolution image and said supplemental second resolution image, in succession on said display.

15. A method of processing an image as recited in claim 5, further comprising:

a. receiving at least one additional portion of extra data associated with said second resolution image, wherein said at least one additional portion of extra data associated with said second resolution image provides for generating a corresponding supplemental second resolution image, and said at least one additional portion of extra data associated with said second resolution image includes at least one additional color component associated with said first resolution image that was not included in said first portion of extra data;

b. generating said supplemental second resolution image from said second resolution image using said at least one additional color component of said at least one additional portion of extra data associated with said second resolution image, wherein said further processed image includes an image selected from the group consisting of said supplemental second resolution image and a yet further processed image based upon said supplemental second resolution image.

16. A method of processing an image as recited in claim 15, further comprising displaying said supplemental second resolution image on said display.

* * * * *